United States Patent

Takizawa et al.

(10) Patent No.: US 9,067,744 B2
(45) Date of Patent: Jun. 30, 2015

(54) ROBOT SYSTEM, ROBOT, AND SORTED ARTICLE MANUFACTURING METHOD

(75) Inventors: Katsumi Takizawa, Fukuoka (JP); Taro Namba, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 509 days.

(21) Appl. No.: 13/491,600

(22) Filed: Jun. 8, 2012

(65) Prior Publication Data

US 2013/0096713 A1    Apr. 18, 2013

(30) Foreign Application Priority Data

Oct. 17, 2011  (JP) ................... 2011-228286
Oct. 17, 2011  (JP) ................... 2011-228287
Dec. 22, 2011  (JP) ................... 2011-281236

(51) Int. Cl.

| G06F 7/00 | (2006.01) |
|---|---|
| B65G 61/00 | (2006.01) |
| B07C 5/00 | (2006.01) |
| B25J 15/06 | (2006.01) |
| B25J 19/02 | (2006.01) |
| G05B 19/418 | (2006.01) |

(52) U.S. Cl.
CPC . *B65G 61/00* (2013.01); *B07C 5/00* (2013.01); *B25J 15/0616* (2013.01); *B25J 19/021* (2013.01); *G05B 19/4183* (2013.01); *G05B 2219/31312* (2013.01); *G05B 2219/40078* (2013.01)

(58) Field of Classification Search
None
See application file for complete search history.

(56) References Cited

U.S. PATENT DOCUMENTS

2004/0040975 A1 * 3/2004 Hunter et al. ................... 221/92
2010/0017407 A1   1/2010 Beniyama et al.

FOREIGN PATENT DOCUMENTS

| JP | 01-177984 | 7/1989 |
|---|---|---|
| JP | 03-162320 | 7/1991 |
| JP | 03-192026 | 8/1991 |
| JP | 06-099382 | 4/1994 |
| JP | 06-241719 | 9/1994 |
| JP | 07-088791 | 4/1995 |
| JP | 07-291450 | 11/1995 |

(Continued)

OTHER PUBLICATIONS

Japanese Office Action for corresponding JP Application No. 2011-281236, Oct. 8, 2013.

(Continued)

*Primary Examiner* — Yolanda Cumbess
(74) *Attorney, Agent, or Firm* — Mori & Ward, LLP

(57) ABSTRACT

A robot system includes a first loading portion, a plurality of second loading portions provided for each sorting destination, and a robot configured to sort the plurality of articles loaded onto the first loading portion, and to transfer the articles to the second loading portions. The robot includes a robot arm, a tool, a first sensor configured to acquire distance information, an article identifying portion configured to identify the article loaded onto the first loading portion, a second sensor configured to acquire outer shape information, and to acquire sorting destination information, a first calculating portion configured to calculate a shape and size of the article, a sorting destination determining portion configured to determine a sorting destination, and a first operation control portion configured to control the robot arm and the tool so that the article is stacked onto the identified second loading portion.

38 Claims, 40 Drawing Sheets

(56) References Cited

FOREIGN PATENT DOCUMENTS

| | | |
|---|---|---|
| JP | 09-255158 | 9/1997 |
| JP | 10-071441 | 3/1998 |
| JP | 2005-262325 | 9/2005 |
| JP | 2005-306497 | 11/2005 |
| JP | 2006-143344 | 6/2006 |
| JP | 2006-264914 | 10/2006 |
| JP | 2007-038370 | 2/2007 |
| JP | 2007-254128 | 10/2007 |
| JP | 2010-006510 | 1/2010 |

OTHER PUBLICATIONS

Japanese Office Action for corresponding JP Application No. 2011-228287, Aug. 19, 2013.

Chinese Office Action for corresponding CN Application No. 201210252731.6, Aug. 15, 2014.

* cited by examiner

ROBOT SYSTEM, ROBOT, AND SORTED ARTICLE MANUFACTURING METHOD

CROSS-REFERENCE TO RELATED APPLICATION

The present application claims priority from Japanese Patent Application No. 2011-228286, which was filed on Oct. 17, 2011, Japanese Patent Application No. 2011-228287, which was filed on Oct. 17, 2011, and Japanese Patent Application No. 2011-281236, which was filed on Dec. 22, 2011, the disclosures of which are incorporated herein by reference in its entirety.

FIELD OF THE INVENTION

The present disclosure relates to a robot system, robot, and sorted article manufacturing method.

BACKGROUND OF THE INVENTION

In Japanese patent laid-open 2005-306497 there is disclosed a technique related to a sorting and storage system.

On the other hand, in Japanese patent laid-open H07-291450 there is disclosed a technique for de-palletizing palletized boxes using a palletizing robot.

SUMMARY OF THE INVENTION

According to one aspect of the disclosure, there is provided a robot system, including a first loading portion onto which a plurality of articles of sorting targets is loaded, a plurality of second loading portions provided for each sorting destination, and a robot configured to sort the plurality of articles loaded onto the first loading portion in accordance with the sorting destination, and to transfer the plurality of articles to the plurality of second loading portions. The robot includes a robot arm, a tool capable of lifting the article, provided to the robot arm, a first sensor configured to acquire distance information to each top side of the plurality of articles loaded onto the first loading portion, provided to the robot arm, an article identifying portion configured to identify the article of the plurality of articles loaded onto the first loading portion which includes the top side that exists at a highest position, based on acquisition results of the first sensor, a second sensor configured to attempt to acquire outer shape information of the identified article identified by the article identifying portion, and to acquire sorting destination information of the identified article provided to the identified article, the second sensor being provided to the robot arm, a first calculating portion configured to calculate a shape and size of the identified article based on the outer shape information of the identified article acquired by the second sensor, a sorting destination determining portion configured to determine an identified sorting destination corresponding to the identified article based on the sorting destination information of the identified article acquired by the second sensor, and a first operation control portion configured to control an operation of the robot arm and the tool so that the identified article is lifted by the tool and stacked onto the identified second loading portion of the plurality of second loading portions which corresponds to the identified sorting destination, in accordance with the shape and the size of the identified article calculated by the first calculating portion.

According to another aspect of the disclosure, there is provided a robot system, including a first supply-side loading portion configured to supply a plurality of articles to be sorted related to defined sorting destinations, a first robot configured to transport the plurality of articles to be sorted that is loaded onto the first supply-side loading portion, one or more first delivery-side loading portions arranged around the first robot, a second supply-side loading portion configured to supply a plurality of the articles to be sorted, a second robot configured to transport the plurality of articles to be sorted that is loaded onto the second supply-side loading portion, one or more second delivery-side loading portions arranged around the second robot, a first controller apparatus configured to control a plurality of robots which includes the first robot and the second robot, and a sorting destination acquisition portion configured to acquire the respective sorting destination information of the plurality of articles to be sorted. The first controller apparatus includes a correspondence information storage portion configured to store correspondence information that associates each of a plurality of the sorting destinations with any one of the one or more first delivery-side loading portions and the one or more second delivery-side loading portions, and a second operation control portion configured to control an operation of the first robot and second robot so that the first robot and second robot transfer the plurality of articles to be sorted to each of the corresponding first delivery-side loading portions and second delivery-side loading portion in coordination in accordance with the sorting destination information acquired by the sorting destination acquisition portion based on the correspondence information stored in the correspondence information storage portion.

According to another aspect of the disclosure, there is provided a robot system including a robot configured to include a tool capable of lifting an article and configured to lift and transport the article by the tool, and a second controller apparatus configured to control an operation of the robot so that at least a part of the article lifted by the tool passes through an area for detecting a height direction dimension of the article.

DESCRIPTION OF THE EMBODIMENTS

Embodiments will now be described with reference to accompanying drawings.

First, first embodiment will be described with reference to FIG. 1 to FIG. 23. This embodiment is an example in which a robot system is applied to a truck terminal of a delivery service provider. Then, articles are sorted as part of the article loading/unloading task. Further, this embodiment is an example of a case where the truck terminal is provided with a single sorting space where a robot that performs sorting is arranged as existing equipment, and the areas affiliated with delivery destinations that serve as the sorting destinations of a plurality of articles to be sorted are defined as the six areas of "Area A," "Area B," "Area C," "Area D," "Area E," and "Area F."

Figure 1:
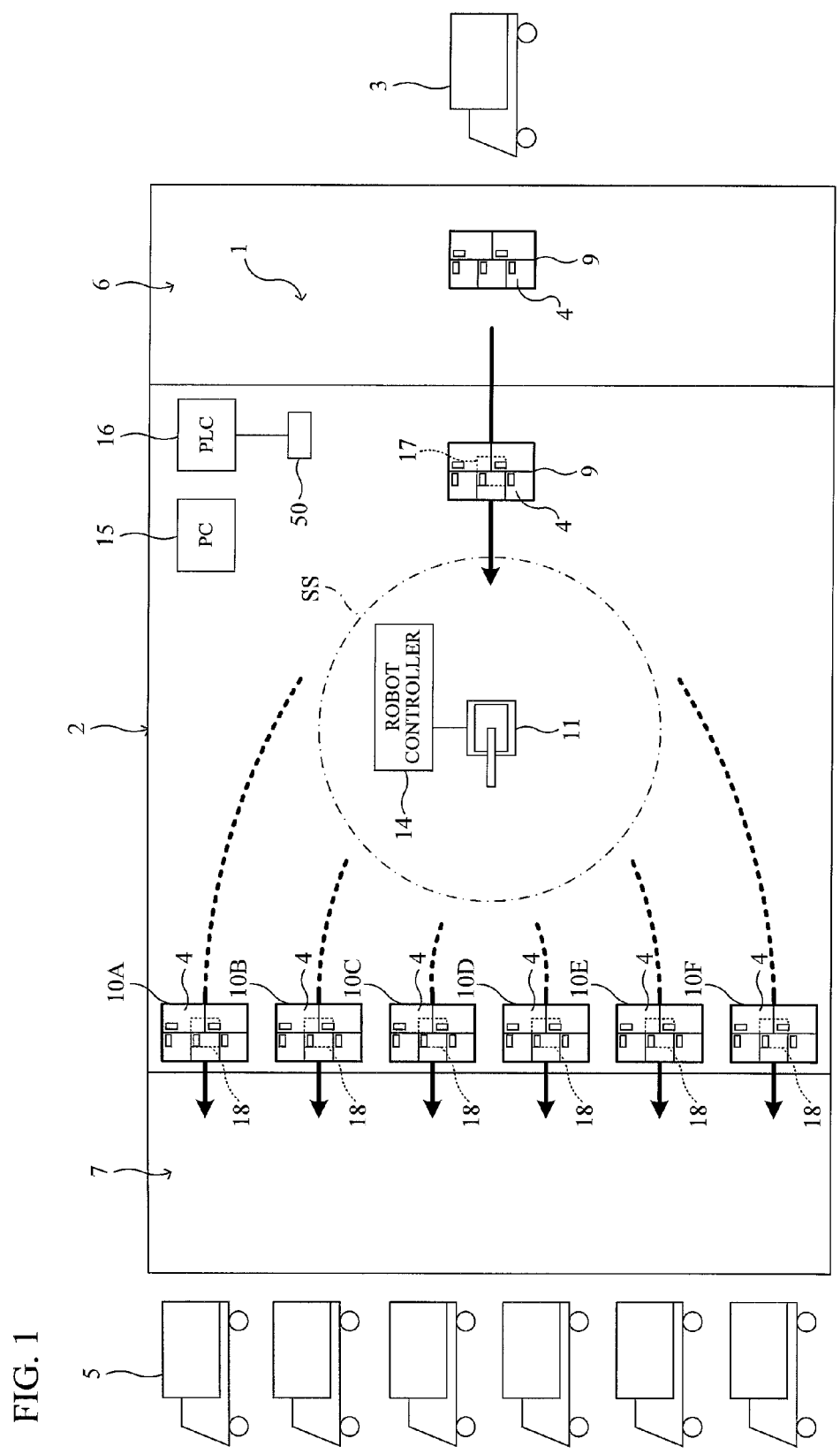
FIG. 1 is a system schematic conceptually illustrating the overall configuration of the robot system of first embodiment.

As shown in FIG. 1, a robot system 1 of this embodiment is provided to a truck terminal 2 of a delivery service provider. The truck terminal 2 is a distribution facility for sorting a plurality of goods 4 (articles; articles to be sorted) of a box shape as a sorting target received from a receiving-side truck 3 and defined in terms of delivery destination (link to sorting destination) in accordance with areas affiliated with the delivery destinations (hereinafter, suitably and simply referred to as "delivery destination areas") to the six delivery destination areas of "Area A," "Area B," "Area C," "Area D," "Area E," and "Area F," and transferring these as the sorted goods 4 of the respective areas "Area A" to "Area F" to a sending-side truck 5. Note that the sorted goods 4 link to the sorted article. This truck terminal 2 is provided with a receiving-side berth 6 for receiving a plurality of the goods 4 received by the receiving-side truck 3, and a sending-side berth 7 for sending out the sorted goods 4 to a sending-side truck 5.

Figure 2:
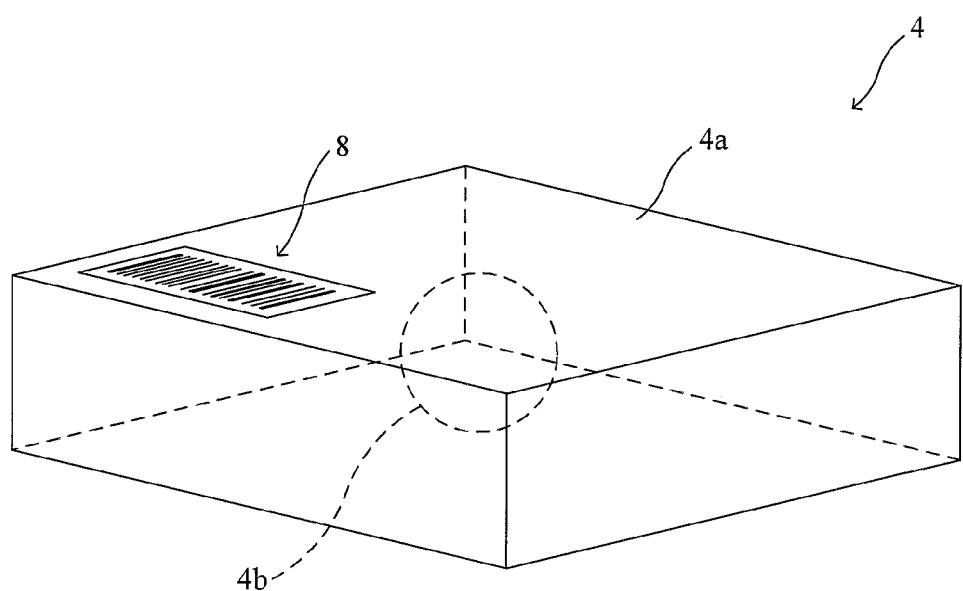
FIG. 2 is a perspective view schematically illustrating the goods.

The plurality of goods 4 received from the receiving-side truck 3 consists of a mixture of the goods 4 of different external dimensions (that is, dimensions of a box 4a described later). Each of the goods 4, as shown in FIG. 2, comprises the box 4a (a cardboard box, for example) constituting the outer shape, and an object 4b to be delivered that is housed inside the box 4a. The top surface of the box 4a of each of the goods 4 is provided with a barcode 8 on which is recorded (associated) delivery destination information (link to sorting destination information), which includes information such as the delivery destination address, and dimensional information of the box 4a, which includes the length, width, and height direction dimensional information, etc., of the box 4a. The top surface of the box 4a of the goods 4 is hereinafter suitably and simply referred to as "top surface of the goods 4."

Figure 3:
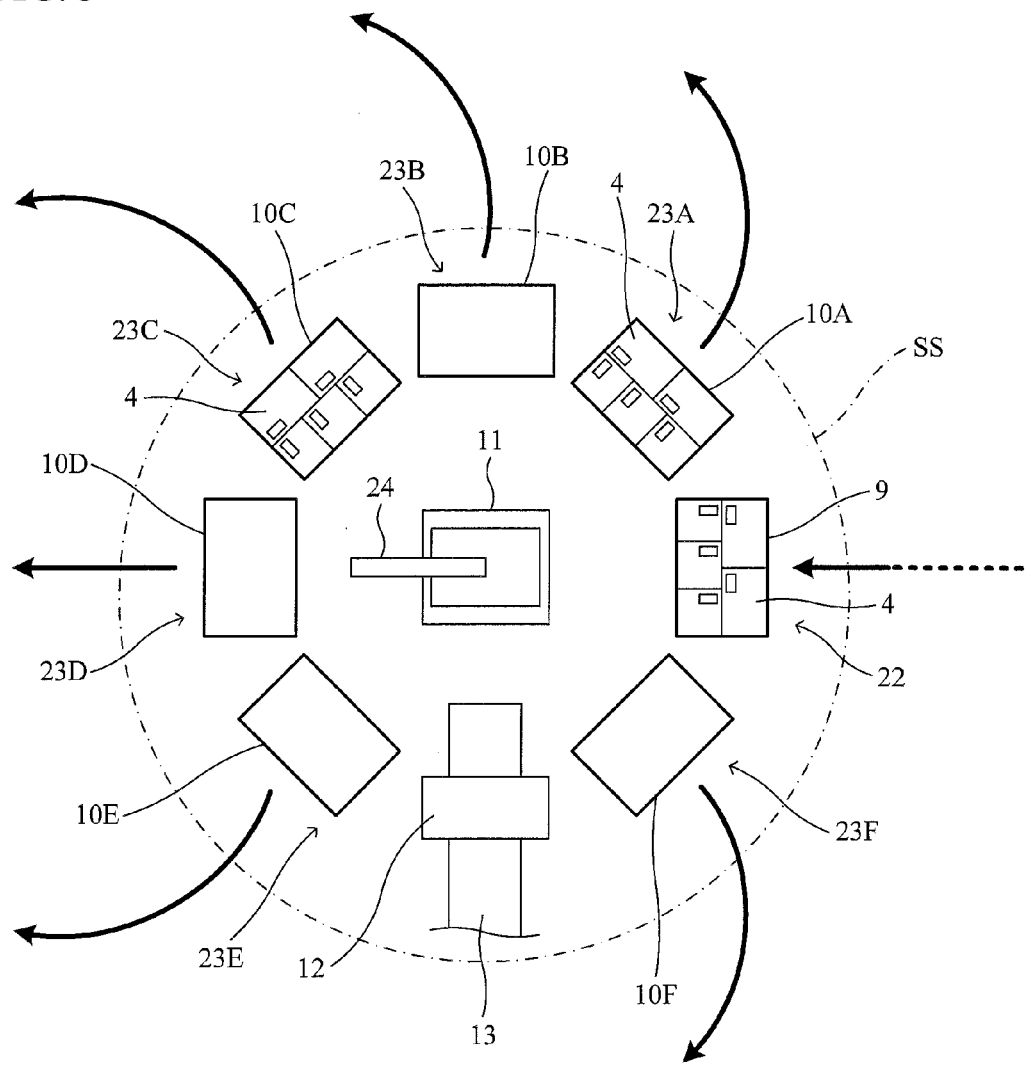
FIG. 3 is a top view schematically illustrating the sorting space interior.

As shown in FIG. 1 and FIG. 3, the robot system 1 comprises a receiving-side cargo 9 (first loading portion; first supply-side loading portion; fifth loading portion; supply apparatus), sending-side cargos 10A, 10B, 10C, 10D, 10E, and 10F (second loading portion; sixth loading portion; hereinafter suitably referred to as "sending-side cargo 10" in cases where the two are not distinguished), a sorting space SS, a receiving-side cargo transport cart 17 (first transport cart), a sending-side cargo transport cart 18 (second transport cart), a PLC (Programmable Logic Controller) 16, and a PC (Personal Computer) 15.

The PLC 16 comprises a storage device (correspondence information storage portion; parameter storage portion; not shown), such as RAM (Random Access Memory) or flash memory, for example. Further, a user interface 50 (operating device), such as a keyboard and mouse that enable operation information input by a manual operation performed by an operator, is connected to the PLC 16. The storage device of the PLC 16 stores the quantity information of the goods 4 and the quantity information of the goods 4 per delivery destination area (information such as, for example, "Area A": 200 units, "Area B": 100 units, "Area C": 300 units . . . , etc.) as the sorting parameter information related to the goods 4. Note that, in place of the quantity information of the goods 4 per delivery destination area, the storage device may store quantity ratio information of the goods 4 per delivery destination area (information such as, for example, "Area A": "Area B": "Area C": . . . =2:1:3: . . . , etc.).

Figure 4A:
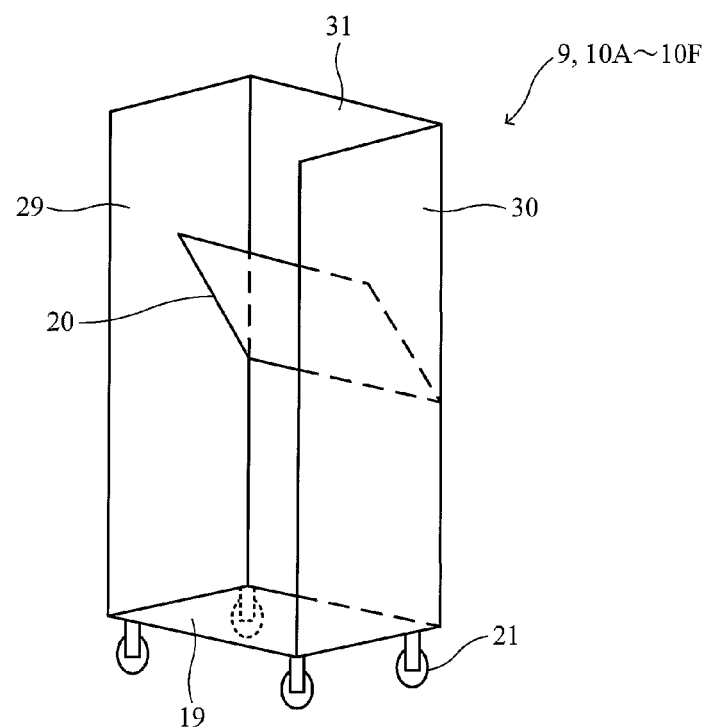
FIG. 4 is a perspective view schematically illustrating the cargo.
Figure 4B:
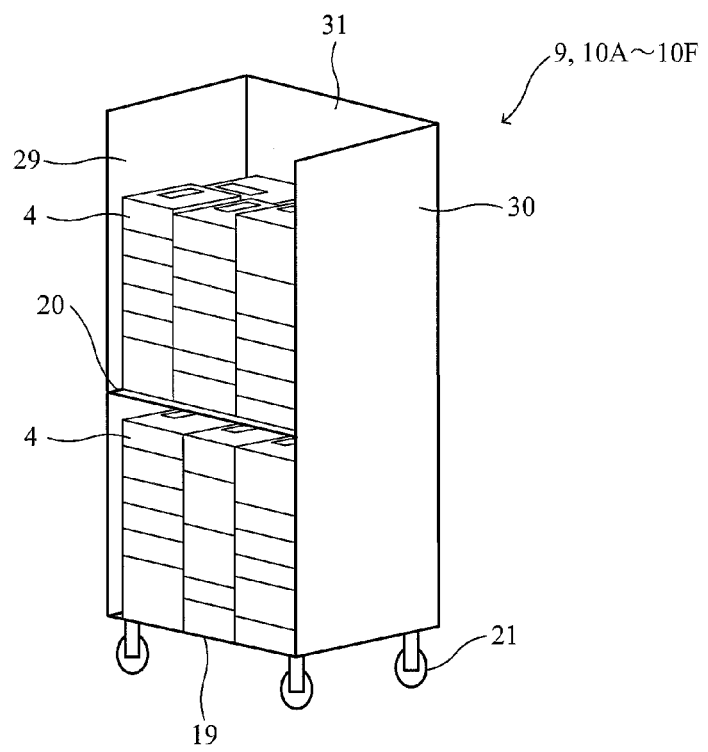

The receiving-side cargo 9 and the sending-side cargos 10A to 10F each have the same structure and, as shown in FIGS. 4A and 4B, comprise side walls 29 and 30, a rear wall 31, and a lower shelf 19 (first loading surface portion) for loading the goods 4, and a flip-up type upper shelf 20 (second loading surface portion) provided above the lower shelf 19 for loading the goods 4. A caster 21 is installed in each of the four corners of the bottom surface of the lower shelf 19, and the receiving-side cargo 9 and the sending-side cargos 10A to 10F are each configured to move freely. Note that only the lower shelf 19 is used when the upper shelf 20 is not. Hereinafter, in such a case, the lower shelf 19 is suitably and simply referred to as the "shelf 19."

A plurality of the goods 4 received from the receiving-side truck 3 is loaded (stacked) in a plurality of stacks onto the lower shelf 19 and the upper shelf 20 of the receiving-side cargo 9 so that the top surface side on which the barcode 8 is provided is facing upward.

The sending-side cargos 10A to 10F are provided for each delivery destination area, and each of the areas of "Area A," "Area B," "Area C," "Area D," "Area E," and "Area F" is associated with one of these sending side cargos 10A to 10F, based on the sorting parameter information (quantity information of the goods 4, and the quantify information of the goods 4 per delivery destination area) stored in the storage device of the PLC 16. In this example, each of the areas "Area A," "Area B," "Area C," "Area D," and "Area E" is respectively associated with the sending-side cargos 10A, 10B, 10C, 10D, 10E, and 10F. The sorted goods 4 of the corresponding delivery destination areas are loaded (stacked) in a plurality of stacks onto the lower shelf 19 and the upper shelf 20 of these sending-side cargos 10A to 10F.

In reference to FIG. 1 and FIG. 3 once again, a robot 11 comprising an arm 24 (robot arm), a preliminary loading table 12 (third loading portion), a conveyor 13, and a robot controller 14 are arranged in the sorting space SS. The robot 11 and the robot controller 14 are communicably connected, and the robot controller 14, the PLC 16, and the PC 15 are communicably connected. Note that, in FIG. 3, the robot controller 14 is omitted to prevent complexities in illustration. Further, the robot 11, the robot controller 14, and the PC 15 link to the robot. The area around the robot 11 of this sorting space SS is provided with a receiving-side cargo arrangement area 22 (first arrangement area) for arranging the receiving-side cargo 9 received from the receiving-side berth 6, and sending-side cargo arrangement areas 23A, 23B, 23C, 23D, 23E, and 23F (second arrangement areas) for respectively arranging the sending-side cargos 10A, 10B, 10C, 10D, 10E, and 10F received from a predetermined area.

Further, in the sorting space SS, the receiving-side cargo 9 and the sending-side cargos 10A to 10F are arranged so that they form a radial shape around the substantial circumference of a circle formed around the base end portion of the arm 24 of the robot 11, i.e., so that the front surface (the surface opposite the rear wall 31) faces the base end portion side of the arm 24. Further, according to this embodiment, the sending-side cargo 10 corresponding to the delivery destination area (link to the first sorting destination) having a relatively high quantity of the goods 4 (a relative high quantity ratio of the goods 4) detected based on the sorting parameter information stored in the storage device of the PLC 16 (the sending-side cargos 10A and 10F corresponding to "Area A" and "Area F" in this example) is arranged closer to the receiving-side cargo 9 than the sending-side cargo 10 corresponding to the other delivery destination areas (link to the second sorting destination; the sending-side cargos 10B, 10C, 10D, and 10E corresponding to the "Area B," "Area C," "Area D," and "Area E" in this example). That is, in this example, the "Area A" and "Area F" are each link to the first sorting destination, and the other areas "Area B," "Area C," "Area D," and "Area E" each link to the second sorting destination.

The robot 11 transfers the plurality of goods 4 loaded onto the receiving-side cargo 9 arranged in the receiving-side cargo arrangement area 22 by sorting the same into the "Area A," "Area B," "Area C," "Area D," "Area E," and "Area F" in accordance with delivery destination areas, and transporting them to the sending-side cargos 10A to 10F respectively arranged in the sending-side cargo arrangement areas 23A to 23F. That is, the robot 11 sorts the plurality of goods 4 loaded onto the receiving-side cargo 9 into the sorted goods 4 of the "Area A," the sorted goods 4 of the "Area B," the sorted goods 4 of the "Area C," the sorted goods 4 of the "Area D," the sorted goods 4 of the "Area E," and the sorted goods 4 of the "Area F," and transfers them to the sending-side cargo 10 corresponding to the delivery destination area.

Specifically, of the plurality of goods 4 loaded onto the receiving-side cargo 9, the robot 11 transfers the goods 4 for which the delivery destination is affiliated with the "Area A" to the sending-side cargo 10A corresponding to the "Area A" as the sorted goods 4 of the "Area A." The robot 11 transfers the goods 4 for which the delivery destination is affiliated with the "Area B" to the sending-side cargo 10B corresponding to the "Area B" as the sorted goods 4 of the "Area B." The robot 11 transfers the goods 4 for which the delivery destination is affiliated with the "Area C" to the sending-side cargo 10C corresponding to the "Area C" as the sorted goods 4 of the "Area C." The robot 11 transfers the goods 4 for which the delivery destination is affiliated with the "Area D" to the sending-side cargo 10D corresponding to the "Area D" as the sorted goods 4 of the "Area D." The robot 11 transfers the goods 4 for which the delivery destination is affiliated with the "Area E" to the sending-side cargo 10E corresponding to the "Area E" as the sorted goods 4 of the "Area E." The robot 11 transfers the goods 4 for which the delivery destination is affiliated with the "Area F" to the sending-side cargo 10F corresponding to the "Area F" as the sorted goods 4 of the "Area F."

Figure 5:
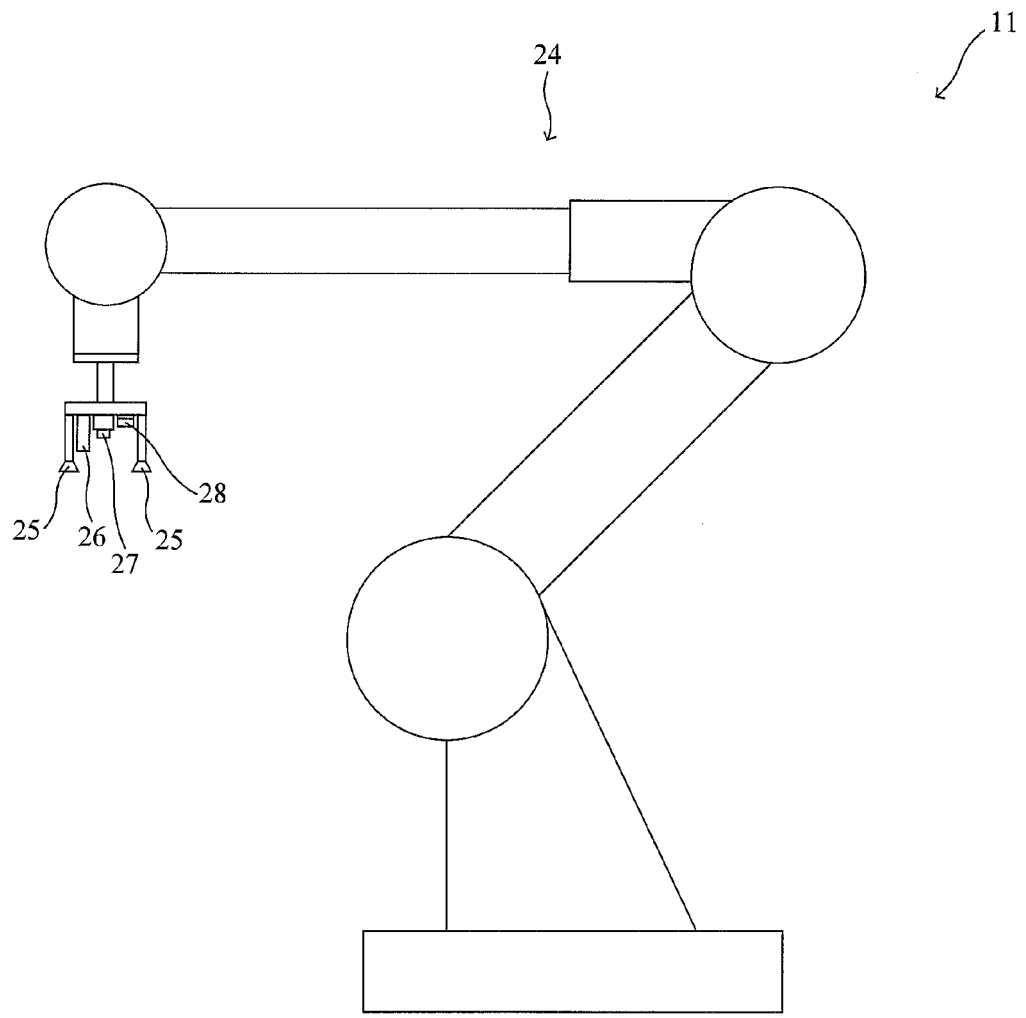
FIG. 5 is a side view schematically illustrating the robot configuration.
Figure 6:
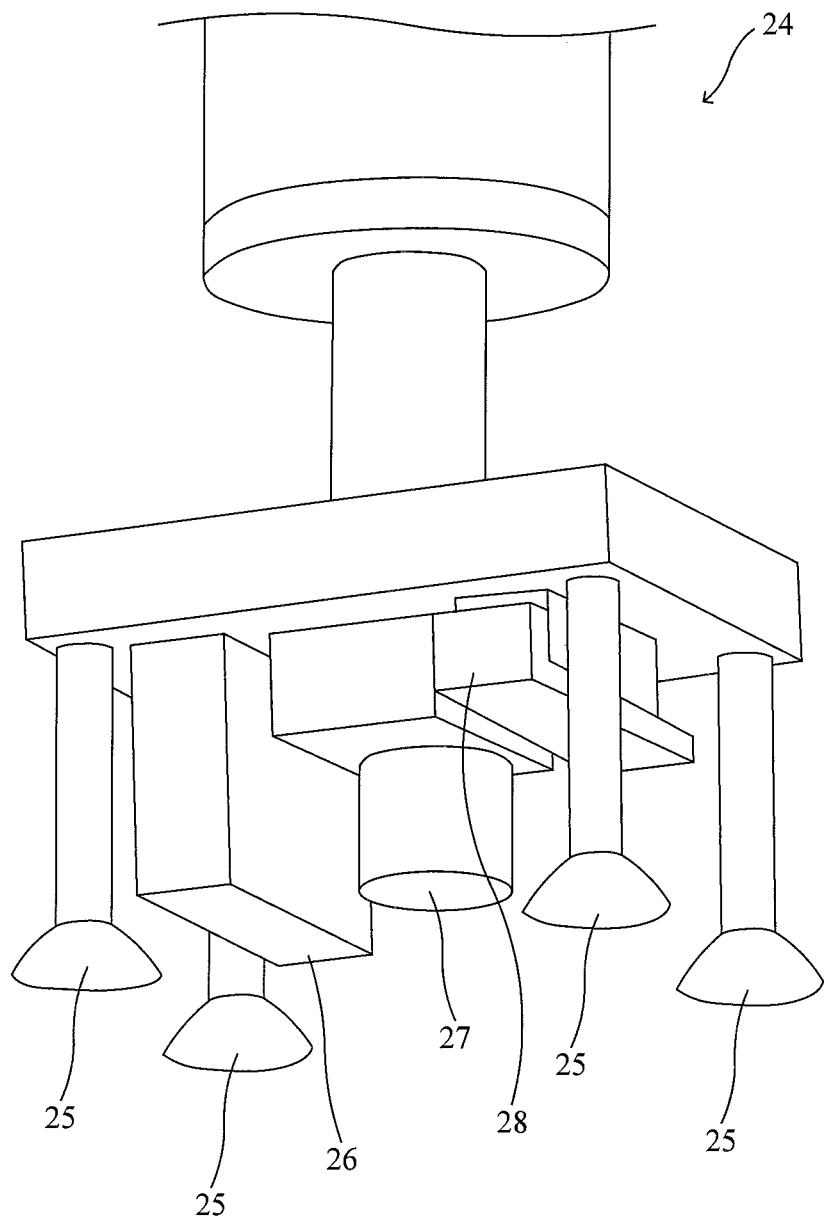
FIG. 6 is a perspective view schematically illustrating the end of the arm.

This robot 11, as shown in FIG. 5 and FIG. 6, comprises the arm 24, and four suction pads 25 (tools), a hook-shaped jig 28 (jig), a laser sensor 26 (first sensor), and a vision sensor 27 (second sensor; sorting destination acquisition portion) are provided to the end of this arm 24.

The arm 24 comprises a plurality of members, with each member rotatably installed to each other.

The suction pad 25 is made into a vacuum state by a vacuum device (not shown), and is thus configured to be capable of suctioning and lifting the goods 4.

The hook-shaped jig 28 is a jig for raising and lowering the upper shelf 20 of the receiving-side cargo 9 and the sending-side cargos 10A to 10F.

The laser sensor 26 irradiates a laser light from above to below the shelf (either the lower shelf 19 or the upper shelf 20) that is the sorting target of the receiving-side cargo 9, that is, toward the top surface of the goods 4 loaded onto the shelf on the top-most stack that has no other goods 4 loaded on its top surface (top side), receives the reflected light of this laser light, and scans the entire top surface of all of the goods 4 on that top-most stack, thereby acquiring distance information to the top surface of each of the goods 4 of the top-most stack.

The vision sensor 27 senses the top surface of identified goods 4 (the goods 4 having a top surface in the highest position; details described later) loaded onto the shelf of the receiving-side cargo 9 of the sorting target, acquiring the outer shape information of the top surface of the identified goods 4 and the delivery destination information as well as the dimensional information of the box 4a (only the delivery destination information in second embodiment described hereafter) from the barcode 8 provided to the top surface of the identified goods 4.

With reference to FIG. 3 once again, the preliminary loading table 12 is a table for temporarily (preliminarily) loading the goods 4.

The conveyor 13 is a conveyor for transporting the goods 4 for which the dimensional information of the box 4a and/or the delivery destination information could not be acquired from the barcode 8 by the vision sensor 27 (for which the barcode 8 could not be scanned) to a predetermined location. The goods 4 transported to the predetermined location by the conveyor 13 are checked by a worker in terms of its delivery destination, etc., and subsequently sorted, for example. Note that the transport surface of the conveyor 13 (the loading portion of the goods 4) links to the fourth loading portion.

Further, when sorting is performed by the robot 11 in the sorting space SS, the receiving-side cargo 9 arranged in the receiving-side berth 6 and loaded with the plurality of goods 4 is pulled by the receiving-side cargo transport cart 17, transported from the receiving-side berth 6, and arranged in the receiving-side cargo arrangement area 22, based on the control of the PLC 16. Further, the (empty) sending-side cargos 10A to 10F arranged in predetermined areas are each pulled by the sending-side cargo transport cart 18, transported from the predetermined area, and arranged in the sending-side cargo arrangement areas 23A to 23F. Then, when sorting has finished, the sorted (empty) receiving-side cargo 9 arranged in the receiving-side cargo arrangement area 22 is pulled by the receiving-side cargo transport cart 17 and transported from the receiving-side cargo arrangement area 22 to a predetermined area. Further, the sending-side cargos 10A to 10F respectively arranged in the sending-side cargo arrangement areas 23A to 23F and loaded with the sorted goods 4 of the corresponding delivery destination areas are pulled by the sending-side cargo transport cart 18 and transported from the sending-side cargo arrangement areas 23A to 23F to the sending-side berth 7.

In reference to FIG. 1 again, the robot controller 14 controls the operation (details described later) of the robot 11 (the arm 24, the suction pad 25, the laser sensor 26, the vision sensor 27, etc.).

Figure 7A:
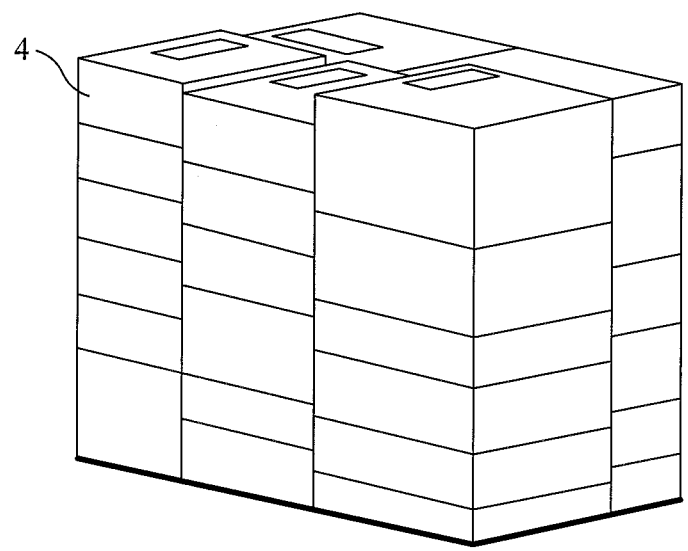
FIG. 7 is a perspective view schematically illustrating examples of stacking patterns stored in the storage device of the PC.
Figure 7B:
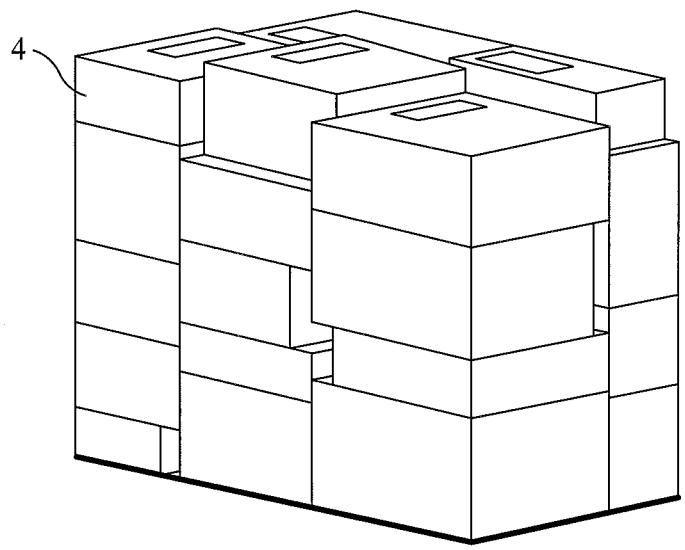

The PC 15 comprises a storage device (pattern storage portion; not shown) that stores a plurality of types of stacking patterns of the goods 4 to the shelf (either the lower shelf 19 or the upper shelf 20) of the stacking target of the sending-side cargo 10. Priority indicators (such as, for example, a plurality of ranks "1," "2," "3," . . . , where the lower value is given a higher priority) are assigned in advance to the plurality of types of stacking patterns stored in the storage device of this PC 15, in accordance with factors such as loading efficiency and loaded state stability. FIGS. 7A and 7B show examples of stacking patterns stored in the storage device of the PC 15. The stacking pattern shown in FIG. 7A is a relatively high priority indicator pattern in which the plurality of goods 4 are stacked substantially without space in between, resulting in a relatively high loading efficiency and loaded state stability. The stacking pattern shown in FIG. 7B is a pattern having a lower priority indicator than the stacking pattern shown in the FIG. 7A, in which space is somewhat formed between the plurality of loaded goods 4, resulting in a loading efficiency and loaded state stability that are lower than those of the stacking pattern shown in the FIG. 7A.

The following describes an example of an overview of the operation of the robot 11 based on the control of the robot controller 14, using FIG. 8 to FIG. 11.

Figure 8:
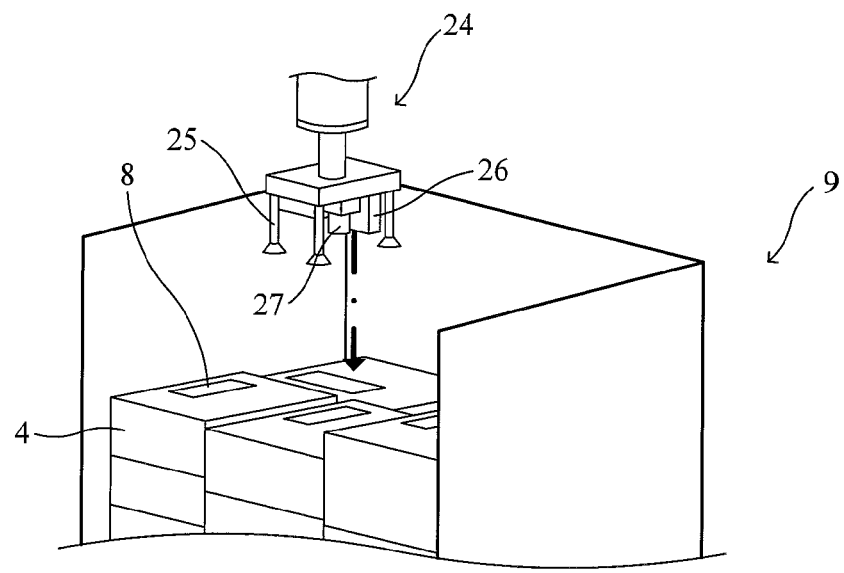
FIG. 8 is an explanatory diagram explaining an example of an overview of robot operation.

As shown in FIG. 8, the robot 11 operates the arm 24 and moves the laser sensor 26 above the shelf of the receiving-side cargo 9 that serves as the sorting target. Subsequently, the laser sensor 26 irradiates laser light toward the top surface of the goods 4 loaded onto the shelf on the top-most stack, receives the reflected light of that laser light, and scans the top surface of all of the goods 4 of the top-most stack, thereby acquiring the distance information to each of the top surfaces of the goods 4 of the top-most stack. The acquisition results of the laser sensor 26, i.e., the distance information to each of the top surfaces of the goods 4 of the top-most stack, are outputted to the robot controller 14. With this arrangement, the goods 4 of the plurality of goods 4 loaded onto the shelf of the receiving-side cargo 9 of the sorting target and having a top surface that exists at the highest position are identified.

Figure 9:
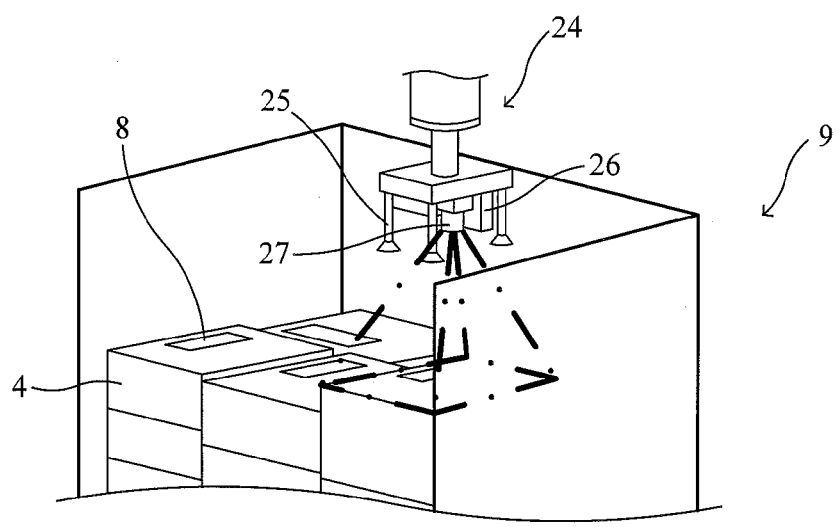
FIG. 9 is an explanatory diagram explaining an example of an overview of robot operation.

Then, as shown in FIG. 9, the robot 11 operates the arm 24 and moves the vision sensor 27 above the goods 4 thus identified. Subsequently, the vision sensor 27 senses the top surface of the identified goods 4, acquires the outer shape information of the top surface of the identified goods 4, and acquires the delivery destination information and dimensional information of the box 4a from the barcode 8 provided to the top surface of the identified goods 4. The following describes as an example of a case where the delivery destination information and dimensional information of the box 4a are acquired from the barcode 8 (the barcode 8 is scanned) by the vision sensor 27 described above. That is, in a case where the delivery destination information and dimensional information of the box 4a are acquired from the barcode 8 by the vision sensor 27 described above, the acquisition results of the vision sensor 27, i.e., the outer shape information of the top surface of the identified goods 4, the delivery destination information of the identified goods 4, and the dimensional information of the box 4a, are outputted to the robot controller 14. With this arrangement, the shape and size (length and width direction dimensions) of the top surface of the identified goods 4 are calculated, the height direction dimension of the box 4a of the identified goods 4 (hereinafter, the height direction dimension of the box 4a of the goods 4 is suitably and simply referred to as the "height direction dimension of the goods 4") and the identified delivery destination area corresponding to the identified goods 4 are determined, and the stacking location of the identified goods 4 on the shelf of the stacking target of the identified sending-side cargo 10 of the sending-side cargos 10A to 10F corresponding to the identified delivery destination area is determined.

Figure 10:
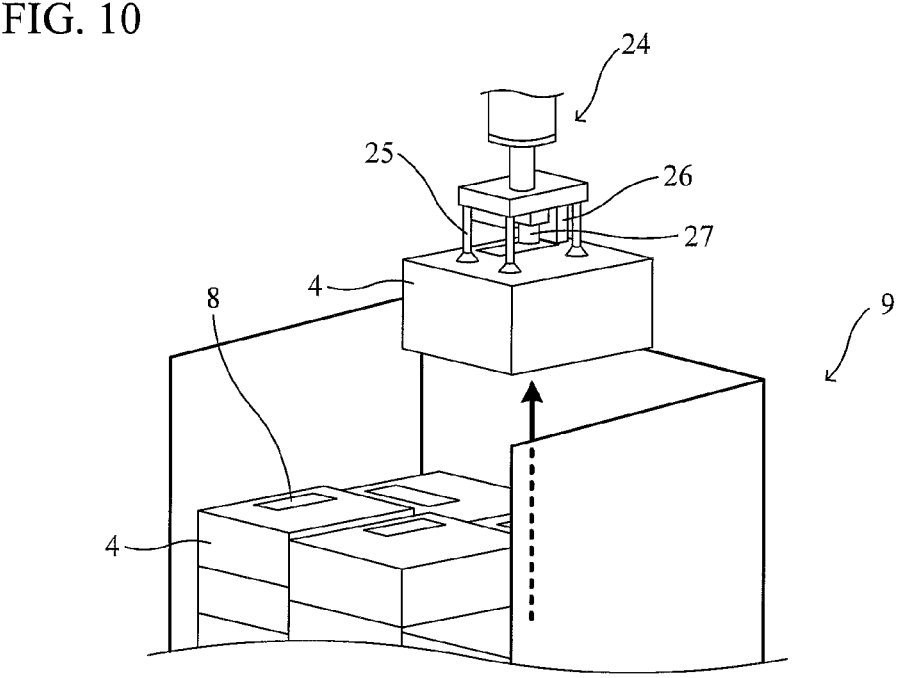
FIG. 10 is an explanatory diagram explaining an example of an overview of robot operation.
Figure 11:
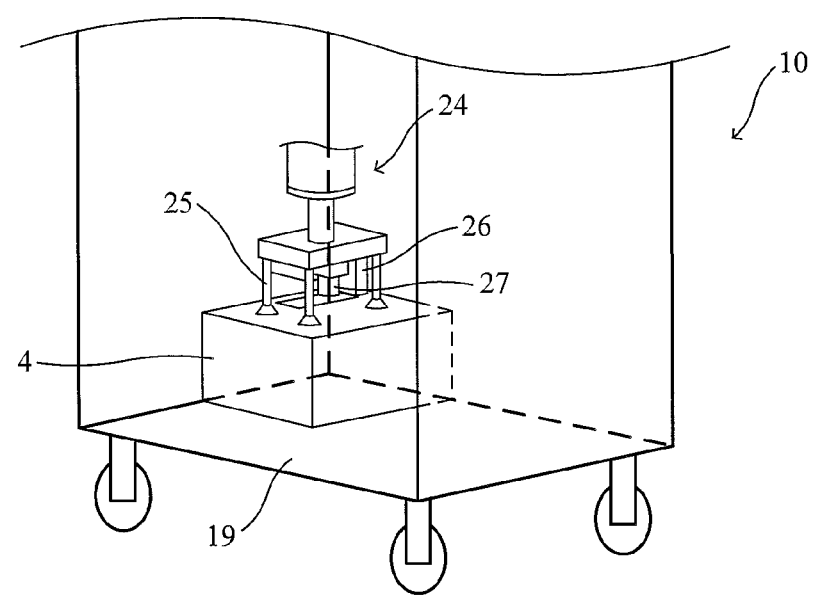
FIG. 11 is an explanatory diagram explaining an example of an overview of robot operation.

Then, as shown in FIG. 10, the robot 11 operates the arm 24 and the suction pad 25, moves the suction pad 25 to the lifting position determined based on the shape and size of the top surface of the identified goods 4 thus calculated, lifts the identified goods 4 using the suction pad 25, and stacks the lifted identified goods 4 onto the determined stacking location of the shelf (the lower shelf 19 in the example shown in FIG. 11) of the stacking target of the identified sending-side cargo 10, as shown in FIG. 11, resulting in the sorted goods 4. Such a procedure is repeatedly executed, thereby sorting the plurality of the goods 4 loaded onto the receiving-side cargo 9 into the "Area A," "Area B," "Area C," "Area D," "Area E," and "Area F" in accordance with delivery destination areas, and transferring the same to the sending-side cargos 10A to 10F, resulting in the sorted goods 4 of each of the areas "Area A" to the "Area F."

Figure 12:
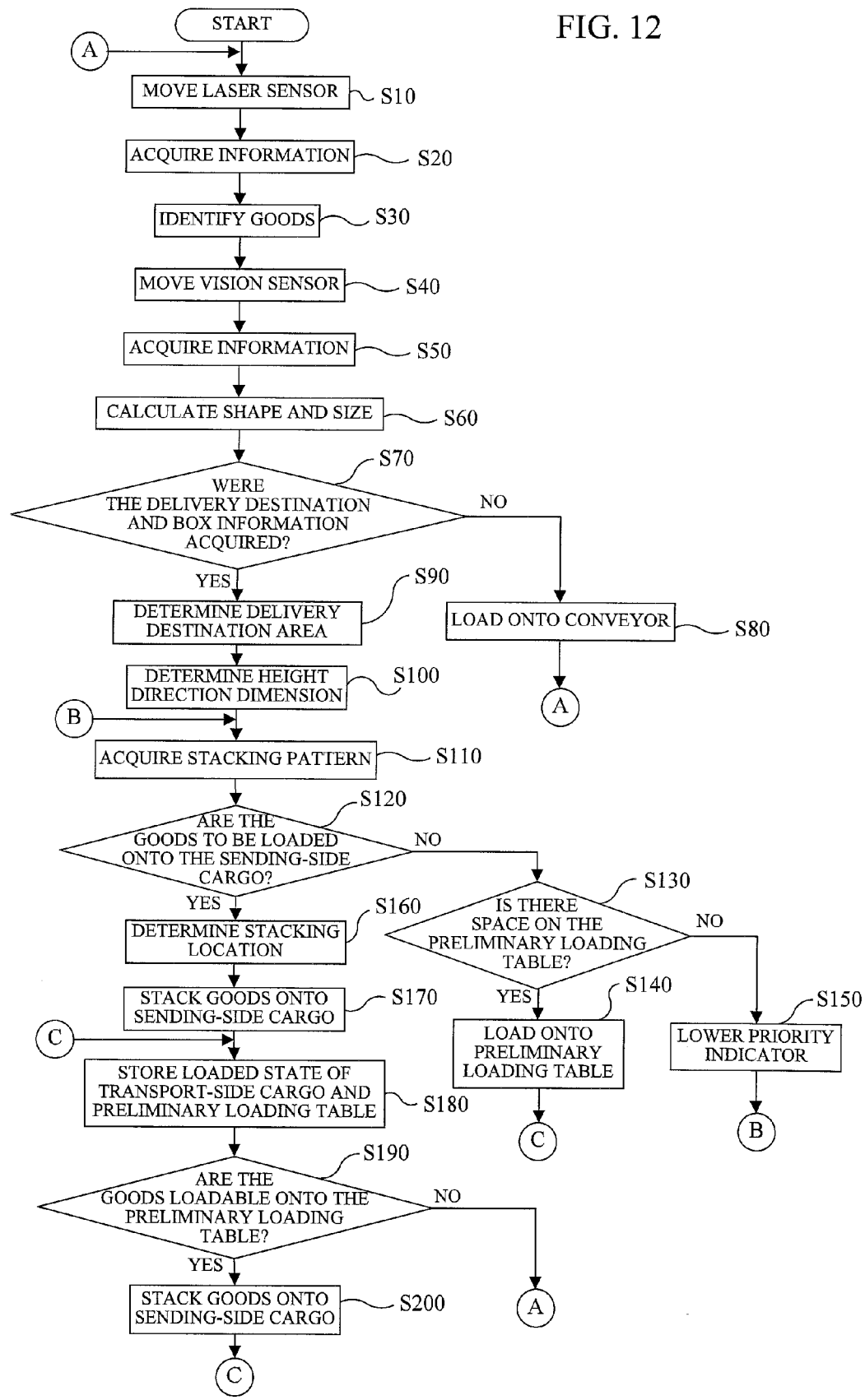
FIG. 12 is a flowchart showing an example of the control details executed by the robot controller.

The following describes an example of the control details of the manufacturing method of the sorted goods 4 executed by the robot controller 14 based on the control of the PLC 16 of the embodiment, using FIG. 12.

In FIG. 12, the process shown in the flow is started, for example, by a predetermined start operation (power ON of the robot controller 14, for example). First, in step S10, the robot controller 14 outputs a control signal to the robot 11, operating the arm 24 so that the laser sensor 26 moves above the shelf of the receiving-side cargo 9 that serves as the sorting target.

Then, the flow proceeds to step S20 where the robot controller 14 outputs a control signal to the robot 11, operating the laser sensor 26 as described above, and acquires the distance information to the top surfaces of each of the goods 4 of the top-most stack loaded onto the shelf of the receiving-side cargo 9 of the sorting target via the laser sensor 26. The procedure of this step S20 links to the first acquisition step.

Subsequently, in step S30, the robot controller 14 identifies which of the plurality of goods 4 loaded into the shelf of the sorting target of the receiving-side cargo 9 is the goods 4 having a top surface that exists in the highest position, based on the distance information to each of the top surfaces of the goods 4 on the top-most stack acquired via the laser sensor 26 in the step S20. The procedure of this step S30 links to the article identifying portion and links to the article identifying step.

Then, the flow proceeds to step S40 where the robot controller 14 outputs a control signal to the robot 11 and operates the arm 24 so that the vision sensor 27 moves above the identified goods 4 identified in the step S30.

Subsequently, in step S50, the robot controller 14 outputs a control signal to the robot 11, operates the vision sensor 27 as described above, acquires via the vision sensor 27 the outer shape information, which includes the location information of the top surface of the identified goods 4, and the delivery destination information as well as the dimensional information of the box 4a from the barcode 8 provided to the top surface of the identified goods 4. The procedure of this step S50 links to the second acquisition step.

Then, the flow proceeds to step S60 where the robot controller 14 calculates the shape and size, including the location and posture, of the top surface of the identified goods 4, based on the outer shape information of the top surface of the identified goods 4 acquired via the vision sensor 27 in the step S50. The procedure of this step S60 links to the first calculating portion and link to the first calculating step.

Subsequently, in step S70, the robot controller 14 determines whether or not the delivery destination information and the dimensional information of the box 4a (only the delivery destination information in second embodiment described later) have been acquired via the vision sensor 27 in the step S50. The procedure of this step S70 links to the acquisition determining portion. In a case where the delivery destination information and the dimensional information of the box 4a cannot be acquired (the barcode 8 cannot be scanned), the decision is made that the condition of step S70 is not satisfied, and the flow proceeds to step S80.

In step S80, the robot controller 14 outputs a control signal to the robot 11, moves the suction pad 25 to the lifting position determined based on the shape and size of the top surface of the identified goods 4 calculated in the step S60, lifts the identified goods 4 by the suction pad 25, and operates the arm 24 and the suction pad 25 so that the lifted identified goods 4 is loaded onto the transport surface of the conveyor 13. Subsequently, the flow returns to the step S10 and the same procedure is repeated. Note that the identified goods 4 loaded onto the transport surface of the conveyor 13 are transported to a predetermined location by the conveyor 13.

On the other hand, in the step S70, if the delivery destination information and the dimensional information of the box 4a have been acquired via the vision sensor 27 in the step S50 (if the barcode 8 was scanned), the decision is made that the condition of step S70 is satisfied and the flow proceeds to step S90.

In step S90, the robot controller 14 determines the identified delivery destination area corresponding to the identified goods 4 based on the delivery destination information of the identified goods 4 acquired via the vision sensor 27 in the step S50. The procedure of this step S90 links to the sorting destination determining portion and links to the first sorting destination determining step.

Then, the flow proceeds to step S100 where the robot controller 14 determines the height direction dimension of the identified goods 4 based on the dimensional information of the box 4a of the identified goods 4 acquired via the vision sensor 27 in the step S50. The procedure of this step S100 links to the height determining portion.

Subsequently, in step S110, the robot controller 14 accesses the storage device of the PC 15 and selects and acquires the stacking pattern having the highest priority indicator of the plurality of types of stacking patterns stored in the storage device, as the stacking pattern of the goods 4 of the identified sending-side cargo 10 corresponding to the identified delivery destination area determined in the step S90. Note that, in step S150 described later, if settings are set so that the priority indicator of the stacking pattern selected in relation to the identified sending-side cargo 10 is to be lowered in this step S110, the stacking pattern corresponding to the set priority indicator is selected and acquired. Note that, in step S150 described later, because settings are set so that the priority indicator of the stacking pattern selected in relation to the identified sending-side cargo 10 is lowered one by one, the robot controller 14 in this step S110 substantially selects and acquires the plurality of types of the stacking patterns stored in the storage device of the PC 15 in descending priority indicator order. The procedure of this step S110 links to the pattern selecting portion.

Then, the flow proceeds to step S120 where the robot controller 14 determines whether or not the identified goods 4 are to be loaded onto the shelf of the identified sending-side cargo 10 of the stacking target at the present moment, based on the shape and size of the top surface of the identified goods 4 calculated in the step S60, the height direction dimension of the identified goods 4 determined in the step S100, the loaded state of the goods 4 on the shelf of the identified sending-side cargo 10 of the stacking target, which is stored in step S180 described later, and the stacking pattern acquired in the step S110. In a case where the loading efficiency or loaded state stability of the shelf of the identified sending-side cargo 10 of the stacking target is to deteriorate if the identified goods 4 are loaded onto the shelf at the present moment, the robot controller 14 deems that the identified goods 4 will not be loaded onto the shelf of the identified sending-side cargo 10 of the stacking target and that the condition of step S120 is not satisfied, and the flow proceeds to step S130. The procedure of this step S120 links to the loading determining portion.

In step S130, the robot controller 14 determines whether or not space for loading the identified goods 4 exists on the preliminary loading table 12, based on the shape and size of the top surface of the identified goods 4 calculated in the step S60, the height direction dimension of the identified goods 4 determined in the step S100, and the loaded state of the goods 4 on the preliminary loading table 12 stored in step S180 described later. If space for loading the identified goods 4 exists on the preliminary loading table 12, the robot controller 14 determines that the condition of step S130 is satisfied, and the flow proceeds to step S140.

In step S140, the robot controller 14 outputs a control signal to the robot 11, moves the suction pad 25 to the lifting position determined based on the shape and size of the top surface of the identified goods 4 calculated in the step S60, lifts the identified goods 4 by the suction pad 25, and operates the arm 24 and the suction pad 25 so that the lifted identified goods 4 are loaded onto the preliminary loading table 12. Subsequently, the flow proceeds to step S180 described later.

On the other hand, in the step S130, if space for loading the identified goods 4 does not exist on the preliminary loading table 12, the robot controller 14 determines that the condition of S130 is not satisfied, and the flow proceeds to step S150.

In step S150, the robot controller 14 sets the priority indicator of the stacking pattern to be selected in relation to the identified sending-side cargo 10 in the step S110 so that it is one lower than that of the present moment. Subsequently, the flow returns to the step S110 and the same procedure is repeated.

On the other hand, in the step S120, in a case where the loading efficiency and loaded state stability of the shelf of the stacking target of the identified sending-side cargo 10 are not to deteriorate if the identified goods 4 are loaded onto the shelf at the present moment, the robot controller 14 deems that the identified goods 4 will be loaded onto the shelf of the identified sending-side cargo 10 of the stacking target, the condition of step S120 is satisfied, and the flow proceeds to step S160.

In step S160, the robot controller 14 determines the stacking location of the identified goods 4 on the shelf of the identified sending-side cargo 10 of the stacking target, based on the shape and size of the top surface of the identified goods 4 calculated in the step S60, the height direction dimension of the identified goods 4 determined in the step S100, the loaded state of the goods 4 on the shelf of the identified sending-side cargo 10 of the stacking target, which is stored in step S180 described later, and the stacking pattern acquired in the step S110. The procedure of this step S160 links to the location determining portion.

Subsequently, in step S170, the robot controller 14 outputs a control signal to the robot 11, moves the suction pad 25 to the lifting position determined based on the shape and size of the top surface of the identified goods 4 calculated in the step S60, lifts the identified goods 4 by the suction pad 25, and operates the arm 24 and the suction pad 25 so that the lifted identified goods 4 are stacked onto the stacking location of the shelf of the identified sending-side cargo 10 of the stacking target, determined in the step S160.

Then, the flow proceeds to step S180 where the robot controller 14 stores the loaded state of the goods 4 in the sending-side cargos 10A to 10F (information such as the loaded location, shape, size, height direction dimension, and delivery destination area of the goods 4) and the loaded state of the goods 4 on the preliminary loading table 12 (information such as the loaded location, shape, size, height direction dimension, and delivery destination area of the goods 4) in memory (not shown), for example.

Subsequently, in step S190, the robot controller 14 determines whether or not the goods 4 loaded on the preliminary loading table 12 includes the goods 4 that are loadable onto the shelf of the sending-side cargo 10 corresponding to the delivery destination area of the stacking target. If the goods 4 that are loadable onto the shelf of the sending-side cargo 10 corresponding to the delivery destination area of the stacking target does not exist, the robot controller 14 determines that the condition of step S190 is not satisfied, the flow returns to the step S10, and the same procedure is repeated. On the other hand, if the goods 4 that are loadable onto the shelf of the sending-side cargo 10 corresponding to the delivery destination area of the stacking target does exist, the robot controller 14 determines that the condition of step S190 is satisfied, and the flow proceeds to step S200.

In step S200, the robot controller 14 outputs a control signal to the robot 11, lifts the goods 4 that were loaded onto the preliminary loading table 12 by the suction pad 25 and determined to be loadable onto the shelf of the sending-side cargo 10 corresponding to the delivery destination area of the stacking target in the step S190, and operates the arm 24 and the suction pad 25 so that the lifted goods 4 are loaded onto the shelf of the sending-side cargo 10 corresponding to the delivery destination area of the stacking target. Subsequently, the flow returns to the step S180 and the same procedure is repeated.

Note that the process shown in this flow ends when a predetermined end operation (power OFF of the robot controller 14, for example) is performed. With the execution of the process shown in this flow, the plurality of the goods 4 loaded onto the receiving-side cargo 9 is sorted into the "Area A," "Area B," "Area C," "Area D," "Area E," and "Area F" in accordance with delivery destination areas, and transferred to the sending-side cargos 10A to 10F, resulting in the sorted goods 4 of the respective areas "Area A" to "Area F."

In the process shown in the flow of FIG. 12 described above, the procedures of steps S80, S140, and S170 link to the first operation control portion and link to the stacking step.

As described above, in the robot system 1 of this embodiment, distance information to each of the top surfaces of the goods 4 of the top-most stack loaded onto the receiving-side cargo 9 is acquired via the laser sensor 26, and the good 4 of the plurality of goods 4 loaded onto the receiving-side cargo 9 having a top surface that exists at the highest position is identified based on this acquired information. Subsequently, the outer shape information of the identified goods 4 thus identified, and the delivery destination information of the identified goods 4 provided to the identified goods 4 are acquired via the vision sensor 27. Then, in a case where the shape and size of the identified goods 4 are calculated based on the outer shape information of the identified goods 4 acquired via the vision sensor 27 and the delivery destination information of the identified goods 4 is acquired via the vision sensor 27, the identified delivery destination area corresponding to the identified goods 4 is determined based on the acquired delivery destination information of the identified goods 4. Subsequently, the identified goods 4 loaded onto the receiving-side cargo 9 is lifted by the suction pad 25 in accordance with the calculated shape and size of the identified goods 4, and stacked onto the identified sending-side cargo 10 corresponding to the identified delivery destination area. Such a procedure is thus repeatedly executed, thereby sorting the plurality of goods 4 loaded onto the receiving-side cargo 9 in accordance with delivery destination areas and transferring the same to the sending side cargos 10A to 10F, resulting in the sorted goods 4 of the corresponding delivery destination areas, and the (empty) sending-side cargos 10A to 10F becoming the sending side cargos 10A to 10F loaded with the sorted goods 4 of corresponding delivery destination areas.

As described above, in this embodiment, the sorting task is automatically performed by the robot 11, making it possible to decrease the labor load of the worker compared to a case where the sorting task is performed manually by the worker. Further, the delivery destination information of the goods 4 is acquired from the barcode 8 provided to the top surface of the goods 4 via the vision sensor 27, making it possible to accurately determine the delivery destination area corresponding to the goods 4. With this arrangement, it is possible to prevent the goods 4 from being sorted into the wrong delivery destination area, and thus improve reliability.

Further, in a case where the sorting task is performed manually by workers, a single worker cannot be asked to perform the task over a long period of time due to the physical burden and fatigue involved, necessitating preparation of a plurality of workers with rotation and interruption of work. In contrast, according to this embodiment, it is possible to automate the sorting task and smoothly continue the work and improve work efficiency without taking into consideration problems such as described above.

Further, in particular, according to this embodiment, the storage device of the PC 15 stores the stacking patterns of the goods 4 on the sending-side cargo 10, and the stacking location of the identified goods 4 on the identified sending-side cargo 10 is determined based on the calculated shape and size of the identified goods 4, the loaded state of the goods 4 on the identified sending-side cargo 10, and the stacking patterns stored in the storage device of the PC 15. Then, the identified goods 4 lifted by the suction pad 25 as described above are stacked onto the determined stacking location. At this time, the stacking patterns having a high loading efficiency (capable of high quantity loading) and a high loaded state stability (not susceptible to toppling) are stored in advance in the storage device of the PC 15, making it possible to determine an efficient and stable stacking location of the goods 4 onto the sending-side cargo 10 and efficiently and stably perform the sorting task.

Further, in particular, according to this embodiment, in a case where it has been determined that the identified goods 4 are not to be loaded onto the identified sending-side cargo 10, the identified goods 4 are loaded onto the preliminary loading table 12, and stacking onto the sending-side cargo 10 is postponed.
With this arrangement, it is possible to prevent the loading efficiency and loaded state stability of the sending-side cargo 10 from deteriorating. Further, a stacking pattern of the goods 4 to be loaded onto the sending-side cargo 10 can be reliably introduced to the stacking patterns stored in the storage device of the PC 15, making it possible to more efficiently and stably perform the sorting task.

Further, in particular, according to this embodiment, a plurality of types of stacking patterns assigned priority indicators in advance is stored in the storage device of the PC 15, and the plurality of types of stacking patterns is selected in descending priority indicator order. At this time, the plurality of types of stacking patterns having a higher loading efficiency (capable of high quantity loading) and higher loaded state stability (not susceptible to toppling) is assigned higher priority indicators in advance and stored in the storage device of the PC 15, making it possible to select the plurality of types of stacking patterns in the order of descending loading efficiency and loaded state stability. With this arrangement, in a case where the stacking pattern having the highest priority indicator is first selected and the sorting task is performed with the highest efficiency and stability, the stacking pattern having the next highest priority indicator is selected when the goods 4 can no longer be temporarily arranged on the preliminary loading table 12 and introduction of the stacking pattern having the highest priority indicator becomes difficult, thereby making it possible to continue the sorting task both efficiently and stably.

Further, in particular, according to this embodiment, in addition to the shape and size of the top surface of the goods 4, the stacking location is determined based on the determined height direction dimension of the goods 4. With this arrangement, it is possible to more accurately determine an efficient and stable stacking location of the goods 4 on the sending-side cargo 10.

Further, in particular, according to this embodiment, the receiving-side cargo 9 and the sending-side cargos 10A to 10F are arranged on the substantial circumference of a circle formed around the base end portion of the arm 24 of the robot 11. With this arrangement, the distances between the base end portion of the arm 24 and the receiving-side cargo 9 and each of the sending-side cargos 10 are substantially the same, making it possible for the arm 24 to perform the sorting task while the suction pad 25 provided to the end is mainly moved in a circumferential direction, thereby minimizing the amount of radial movement of the suction pad 25. As a result, the sorting task can be performed more quickly, shortening the sorting task tact time. Further, the receiving-side cargo 9 and each of the sending-side cargos 10 are arranged radially, making it possible to arrange the front surfaces of the receiving-side cargo 9 and each of the sending-side cargos 10 toward the base end portion of the arm 24, enabling smooth access to the receiving-side cargo 9 and each of the sending-side cargos 10 by the suction pad 25.

Further, in particular, according to this embodiment, the sending-side cargos 10 (the sending-side cargos 10A and 10F corresponding to "Area A" and "Area F" in the above example) corresponding to the delivery destination areas having a relatively high quantity of the goods 4 are arranged closer to the receiving side cargo 9 than the other sending-side cargos 10 (sending-side cargos 10B, 10C, 10D, and 10E corresponding to "Area B," "Area C," "Area D," and "Area E" in the above example). With this arrangement, the amount of movement of the suction pad 25 from the receiving-side cargo 9 to the sending-side cargo 10 can be reduced overall, making it possible to shorten the sorting task tact time.

Further, in particular, according to this embodiment, the receiving-side cargo 9 and the sending-side cargos 10A to 10F are transported by the receiving-side cargo transport cart 17 and the sending-side cargo transport cart 18. With this arrangement, it is possible to further reduce the labor burden of the worker.

Further, in particular, according to this embodiment, in a case where it has been determined that the delivery destination information of the identified goods 4 cannot be acquired via the vision sensor 27, the identified goods 4 lifted by the suction pad 25 are loaded onto the transport surface of the conveyor 13 as described above. With this arrangement, the goods 4 for which the delivery destination information is unclear and cannot be acquired can be loaded with differentiation from the other goods 4, making it possible to prevent the goods 4 with an unclear delivery destination from getting mixed with the others in the sending-side cargo 10. As a result, it is possible to reliably prevent the goods 4 from being sorted into the wrong delivery destination area, and thus further improve reliability.

Further, in particular, according to this embodiment, the receiving-side cargo 9 and the sending-side cargos 10A to 10F comprise the lower shelf 19 and the flip-up type upper shelf 20. With the receiving-side cargo 9 and the sending-side cargos 10A to 10F comprising such a structure, it is possible to divide and load the goods 4 onto the lower shelf 19 and the upper shelf 20, thereby increasing the stability of the loaded state and preventing the loaded goods 4 from toppling over. Further, the robot 11 comprises the hook-shaped jig 28, making it possible to raise and lower the upper shelf 20 using this hook-shaped jig 28. Accordingly, the upper shelf 20 of the receiving-side cargo 9 can be flipped up prior to moving the goods 4 loaded onto the lower shelf 19 of the receiving-side cargo 9, for example, ensuring that the upper shelf 20 will not interfere with the operation of the arm 24 and the suction pad 25. Further, for example, flipping up the upper shelf 20 of the sending-side cargo 10 prior to loading the goods 4 onto the lower shelf 19 of the sending-side cargo 10 ensures that the upper shelf 20 will not interfere with the operation of the arm 24 and the suction pad 25; and lowering the upper shelf 20 of the sending-side cargo 10 once the goods 4 are loaded onto the lower shelf 19 of the sending-side cargo 10 ensures a state in which the goods 4 can be loaded onto the upper shelf 20. As a result, smooth execution of the sorting task is achieved.

Note that the embodiments are not limited to the above, and various modifications may be made without deviating from the spirit and scope of the disclosure. The following describes such modifications one by one.

(1-1) When Providing a Sensor to the Receiving-Side Cargo Upper Portion and Estimating the Height Direction Dimension of the Goods In the above embodiment is described an illustrative scenario in which the dimensional information of the box 4a, including the height direction dimensional information of the box 4a, is recorded in the barcode 8 on the top surface of the goods 4, and the dimensional information of the box 4a is acquired via the vision sensor 27 to identify the height direction dimension of the goods 4. Nevertheless, there are also cases in which the height direction dimensional information of the box 4a is not recorded in the barcode 8 on the top surface of the goods 4. This modification is an example of such a case.

That is, in this modification, only the delivery destination information and not the dimensional information of the box 4a is recorded in the barcode 8 (refer to FIG. 2) provided to the top surface of each of the goods 4.

Figure 13:
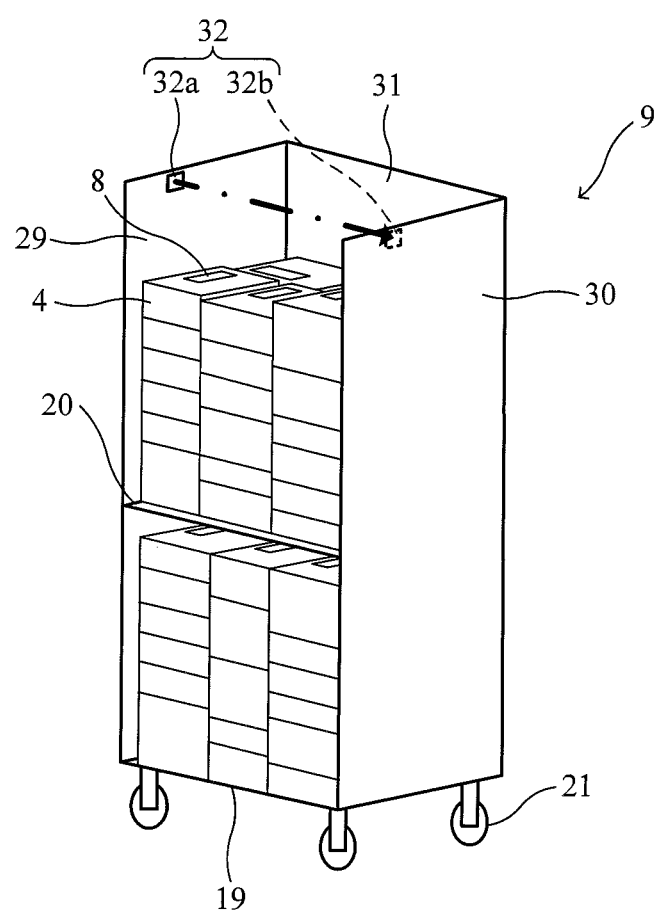
FIG. 13 is a perspective view schematically illustrating the receiving side cargo of a modification in which a sensor is provided to the receiving-side cargo upper portion for estimating the height direction dimension of the goods.
Figure 14A:
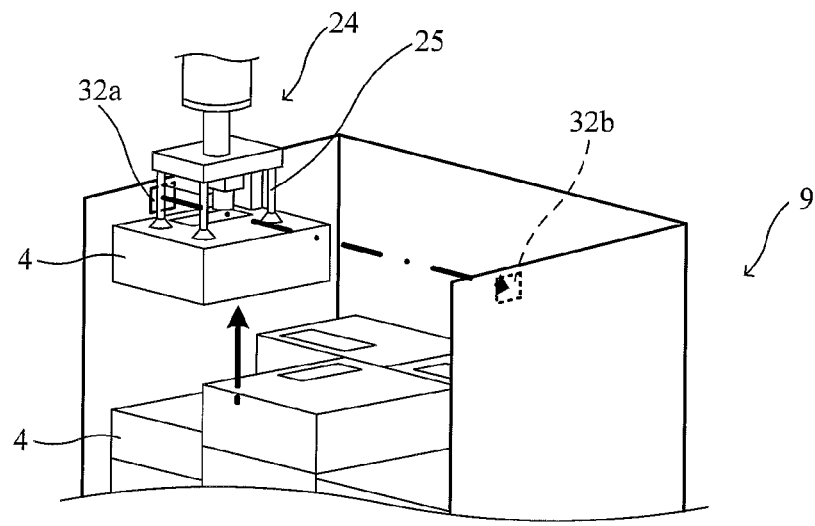
FIG. 14 is an explanatory diagram explaining an example of an overview of robot operation.
Figure 14B:
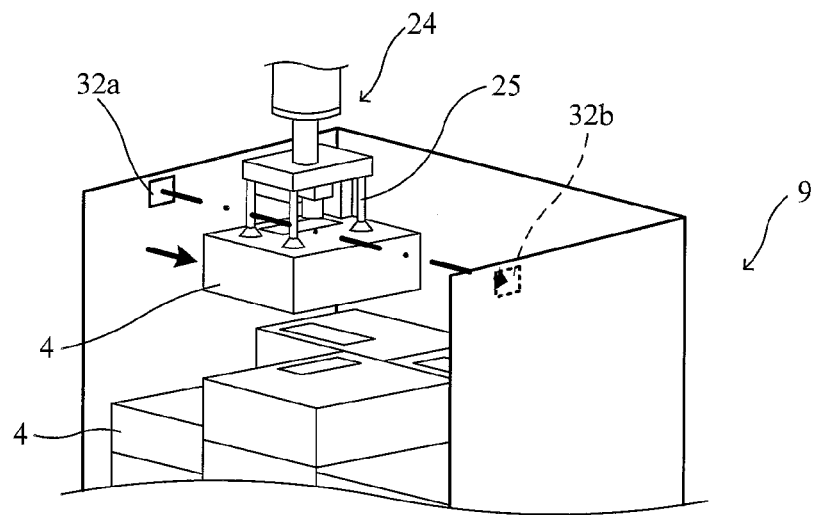
Figure 15A:
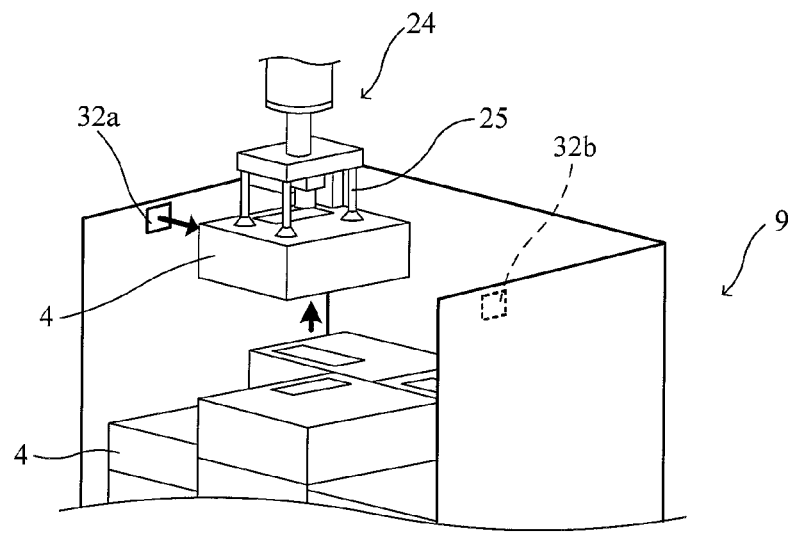
FIG. 15 is an explanatory diagram explaining an example of an overview of robot operation.
Figure 15B:
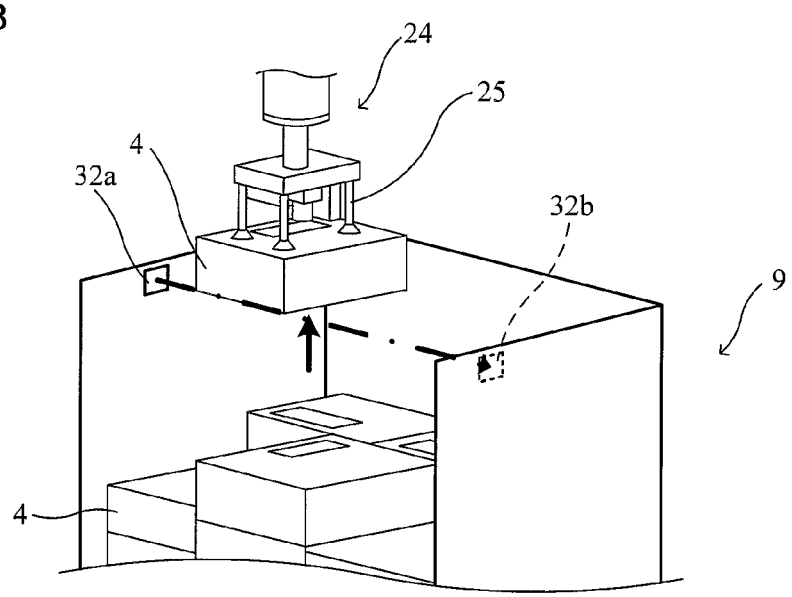

According to this modification, when lifting and moving the goods 4 from the receiving-side cargo 9 via the suction pad 25, the robot 11 controls the operation of the arm 24 so that the goods 4 lifted by the suction pad 25 move along a predetermined movement path. Further, as shown in FIG. 13, according to this modification, a sensor 32 (third sensor) comprising a light-emitting portion 32a and a light-receiving portion 32b are provided to the upper portion of the receiving-side cargo 9. The light-emitting portion 32a of the sensor 32 is provided on the inner surface side of the upper portion of the side wall 29 of the receiving-side cargo 9, emitting light so that the optical axis is substantially horizontal and intersects with the predetermined movement path. The light-receiving portion 32b of the sensor 32 is provided to the inner surface side of the upper portion of the side wall 30 of the receiving-side cargo 9 so that it is opposite the light-emitting portion 32a, and receives the light emitted from the light-emitting portion 32a. The light reception result of the light-receiving portion 32b is outputted to the robot controller 14.

The following describes an example of an overview of the operation of the robot 11 based on the control of the robot controller 14 when the goods 4 are moved from the receiving-side cargo 9 along the predetermined movement path, using FIG. 14 and FIG. 15.

In FIGS. 14A, 14B, 15A, and 15B, when operating the arm 24 and the suction pad 25 and lifting the identified goods 4 previously described by the suction pad 25 as described above, the robot 11 moves the lifted identified goods 4 along the predetermined movement path (refer to the solid arrows in each drawing). At this time, the optical axis of the light from the light-emitting portion 32a of the sensor 32 intersects the predetermined movement path, and thus the identified goods 4 move so that they intersect the optical axis of the light-emitting portion 32a. As a result, before the identified goods 4 intersect the optical axis of the light-emitting portion 32a, the light from the light-emitting portion 32a is received by the light-receiving portion 32b (refer to FIGS. 14A and 14B). Subsequently, while the identified goods 4 are moving so that they intersect the optical axis of the light-emitting portion 32a, the light from the light-emitting portion 32a is blocked by the identified goods 4, causing the light from the light-emitting portion 32a to not be received by the light-receiving portion 32b (refer to FIG. 15A). Then, as the identified goods 4 pass through the optical axis of the light-emitting portion 32a, the light from the light-emitting portion 32a is received by the light-receiving portion 32b (refer to FIG. 15B).

According to this modification, the height direction dimension of the identified goods 4 is estimated based on the posture of the arm 24 (the position of the control point of the arm 24) corresponding to the location of the identified goods 4 and the light reception result of the light-receiving portion 32b when the robot 11 moves the identified goods 4 along the predetermined movement path. That is, the height direction dimension of the identified goods 4 is estimated by comparing the posture of the arm 24 when the identified goods 4 intersect the optical axis of the light-emitting portion 32a and the light from the light-emitting portion 32a is no longer received by the light-receiving portion 32b, and the posture of the arm 24 when the identified goods 4 pass through the optical axis of the light-emitting portion 32a and the light from the light-emitting portion 32a is received by the light-receiving portion 32b.

Subsequently, the robot 11 stacks the identified goods 4 moved along the predetermined movement path onto the stacking location on the shelf of the identified sending-side cargo 10 of the sorting target and determined as described above, resulting in the sorted goods 4, similar to the above embodiment.

Figure 16:
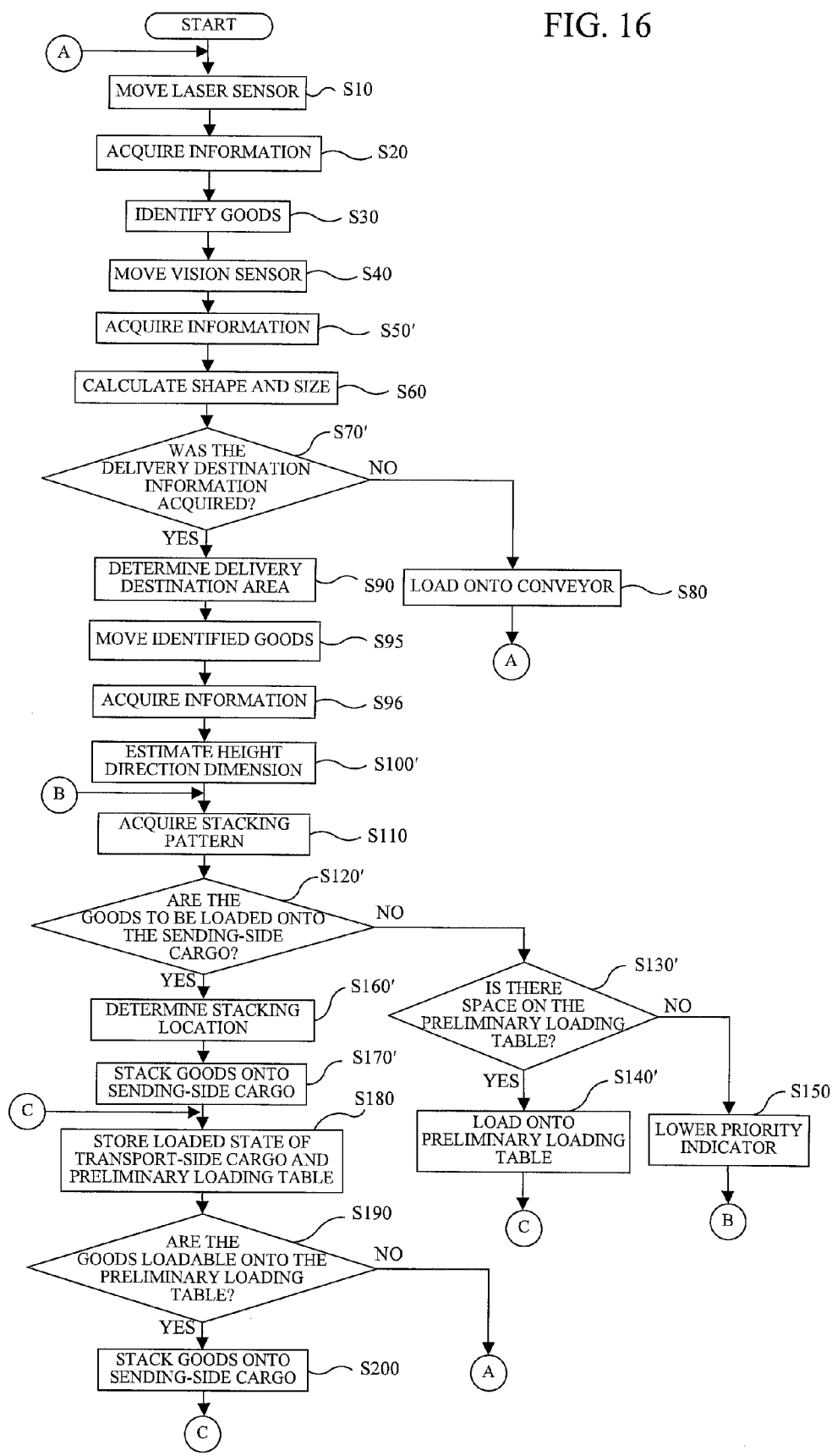
FIG. 16 is a flowchart showing an example of the control details executed by the robot controller.

The following describes an example of the control details of the manufacturing method of the sorted goods 4 executed by the robot controller 14 based on the control of the PLC 16 of this modification, using FIG. 16. Note that FIG. 16 corresponds to the above FIG. 12, the same procedures as those in FIG. 12 are denoted using the same reference numerals, and descriptions thereof are suitably omitted or simplified.

In FIG. 16, the steps S10 to S40 are the same as those in the FIG. 12 previously described; however, once the arm 24 is operated so that the vision sensor 27 moves above the identified goods 4 in step S40, the flow proceeds to step S50' provided in place of step S50.

In step S50', the robot controller 14 outputs a control signal to the robot 11, operates the vision sensor 27 as described above, acquires the outer shape information of the top surface of the identified goods 4 via the vision sensor 27, and acquires the delivery destination information from the barcode 8 provided to the top surface of the identified goods 4. The procedure of this step S50' links to the second acquisition step.

The subsequent step S60 is substantially the same as that in the FIG. 12. That is, in this step, the shape and size of the top surface of the identified goods 4 are calculated.

Then, the flow proceeds to step S70', provided in place of step S70, where the robot controller 14 determines whether or not the delivery destination information has been acquired via the vision sensor 27 in the step S50'. The procedure of this step S70' links to the acquisition determining portion described. In a case where the delivery destination information has not been acquired, the decision is made that the condition of step S70' is not satisfied, and the flow proceeds to step S80.

Step S80 is substantially the same as that in the FIG. 12, i.e., the identified goods 4 are lifted by the suction pad 25, and the arm 24 and the suction pad 25 are operated so that the lifted identified goods 4 are loaded onto the transport surface of the conveyor 13. Subsequently, the flow returns to the step S10 and the same procedure is repeated.

On the other hand, in the step S70', in a case where the delivery destination information has been acquired via the vision sensor 27 in the step S50', the decision is made that the condition of step S70' is satisfied, and the flow proceeds to step S90.

Step S90 is substantially the same as that in the FIG. 12, i.e., the identified delivery destination area corresponding to the identified goods 4 is determined.

Subsequently, in a newly provided step S95, the robot controller 14 outputs a control signal to the robot 11, moves the suction pad 25 to the lifting position determined based on the shape and size of the top surface of the identified goods 4 calculated in the step S60, lifts the identified goods 4 by the suction pad 25, and operates the arm 24 and the suction pad 25 so that the lifted identified goods 4 are moved along the predetermined movement path.

Then, the flow proceeds to a newly provided step S96 where the robot controller 14 acquires the posture information of the arm 24 (the position information of the control point of the arm 24) corresponding to the location of the identified goods 4 and the light reception result of the light-receiving portion 32b of the sensor 32 when the identified goods 4 are moved along the predetermined movement path in the step S95.

Subsequently, in a step S100' provided in place of the step S100, the robot controller 14 estimates the height direction dimension of the identified goods 4 by comparing the posture of the arm 24 when the identified goods 4 intersect the optical axis of the light-emitting portion 32a of the sensor 32 and the light from the light-emitting portion 32a is no longer received by the light-receiving portion 32b, and the posture of the arm 24 when the identified goods 4 pass through the optical axis of the light-emitting portion 32a and the light from the light-emitting portion 32a is received by the light-receiving portion 32b, based on the posture information of the arm 24 corresponding to the location of the identified goods 4 acquired in the step S96 and the light reception result of the light-receiving portion 32b of the sensor 32. The procedure of this step S100' links to the height estimating portion.

The subsequent step S110 is substantially the same as that of the FIG. 12, i.e., the stacking patterns of a plurality of types stored in the storage device of the PC 15 are selected and acquired in descending priority indicator order.

Then, the flow proceeds to a step S120', provided in place of step S120, where the robot controller 14 determines whether or not the identified goods 4 are to be loaded onto the shelf of the identified sending-side cargo 10 of the stacking target at the present moment, based on the shape and size of the top surface of the identified goods 4 calculated in the step S60, the height direction dimension of the identified goods 4 estimated in the step S100', the loaded state of the goods 4 on the shelf of the identified sending-side cargo 10 of the stacking target, which is stored in the step S180 previously described, and the stacking pattern acquired in the step S110. The procedure of this step S120' links to the loading determining portion. In a case where the loading efficiency or loaded state stability of the shelf of the identified sending-side cargo 10 of the stacking target is to deteriorate if the identified goods 4 are loaded onto the shelf at the present moment, the robot controller 14 deems that the identified goods 4 will not be loaded onto the shelf of the identified sending-side cargo 10 of the stacking target, the condition of step S120' is not satisfied, and the flow proceeds to step S130' provided in place of step S130.

In step S130', the robot controller 14 determines whether or not space for loading the identified goods 4 exists on the preliminary loading table 12, based on the shape and size of the top surface of the identified goods 4 calculated in the step S60, the height direction dimension of the identified goods 4 estimated in the step S100', and the loaded state of the goods 4 on the preliminary loading table 12 stored in the step S180 previously described. If space for loading the identified goods 4 exists on the preliminary loading table 12, the robot controller 14 determines that the condition of step S130' is satisfied and the flow proceeds to step S140' provided in place of step S140.

In step S140', the robot controller 14 outputs a control signal to the robot 11, and the arm 24 and the suction pad 25 are operated so that the identified goods 4 moved along the predetermined movement path in the step S95 are loaded onto the preliminary loading table 12. Subsequently, the flow proceeds to the step S180.

On the other hand, in the step S130', if space for loading the identified goods 4 does not exist on the preliminary loading table 12, the robot controller 14 determines that the condition of the step S130' is not satisfied and the flow proceeds to step S150.

Step S150 is substantially the same as that in the FIG. 12, i.e., the robot controller 14 sets the priority indicator of the stacking pattern to be selected in relation to the identified sending-side cargo 10 in the step S110 so that it is one lower than that of the present moment. Subsequently, the flow returns to the step S110 and the same procedure is repeated.

On the other hand, in the step S120', in a case where the loading efficiency and the loaded state stability of the shelf of the identified sending-side cargo 10 of the stacking target are not to deteriorate if the identified goods 4 are loaded onto the shelf at the present moment, the robot controller 14 deems that the identified goods 4 will be loaded onto the shelf of the identified sending-side cargo 10 of the stacking target, the condition of step S120' is satisfied, and the flow proceeds to step S160' provided in place of step S160.

In step S160', the robot controller 14 determines the stacking location of the identified goods 4 onto the shelf of the identified sending-side cargo 10 of the stacking target, based on the shape and size of the top surface of the identified goods 4 calculated in the step S60, the height direction dimension of the identified goods 4 estimated in the step S100', the loaded state of the goods 4 on the shelf of the identified sending-side cargo 10 of the stacking target, which is stored in the step S180, and the stacking pattern acquired in the step S110. The procedure of this step S160' links to the location determining portion.

Subsequently, in the step S170' provided in place of step S170, the robot controller 14 outputs a control signal to the robot 11, and operates the arm 24 and the suction pad 25 so that the identified goods 4 moved along the predetermined movement path in the step S95 are stacked onto the stacking location on the shelf of the identified sending-side cargo 10 of the stacking target, determined in the step S160'.

The subsequent steps S180 to S200 are the same as those in the FIG. 12, and descriptions thereof will be omitted.

In the process shown in the flow of FIG. 16 described above, the procedures of steps S80, S95, S140', and S170' link to the first operation control portion and link to the stacking step. Further, of these, the procedure of step S95 links to the first control portion, and the procedure of step S170' links to the second control portion.

According to this modification described above, in addition to the shape and size of the top surface of the goods 4, the stacking location is determined based on the estimated height direction dimension of the goods 4 as well. With this arrangement, similar to the embodiment, it is possible to more accurately determine the efficient and stable stacking location of the goods 4 on the sending-side cargo 10.

Note that, while the above has described an illustrative scenario in which sorting is performed by the single robot 11 in the single sorting space SS, the present disclosure is not limited thereto, allowing sorting to be performed by a plurality of robots in a plurality of sorting spaces. At this time, the PLC 16 may automatically determine the mode of the sorting performed by each of the robots in each of the sorting spaces (the quantity and arrangement of the sending-side cargos arranged in each of the sorting spaces, the delivery destination areas corresponding to each of the sending-side cargos, etc.) based on the sorting parameter information stored in the storage device of the PLC 16. The following describes an example in which the modes of the sorting performed by each of the robots in each of the sorting spaces are mutually different, using modifications (1-2), (1-3), and (1-4). Note that the configuration of the robot system shown in each of the drawings of the modifications (1-2), (1-3), and (1-4) described below achieves a mode that corresponds to the correspondence information generated by the PLC 16 of the modifications (1-2), (1-3), and (1-4) described below based on the sorting parameter information stored in the storage device of the PLC 16.

(1-2) When Sorting is Performed Serially in a Plurality of Sorting Spaces (1)

This modification is an example of a case where a plurality of robots perform sorting serially (in stages) in a plurality of sorting spaces. Further, this modification is an example of a case where the truck terminal comprises two sorting spaces in which a robot that performs sorting is arranged as existing equipment, and the delivery destination areas of the plurality of goods 4 constitute the 10 areas of "Area G," "Area H," "Area I," "Area J," "Area K," "Area L," "Area M," "Area N," "Area O," and "Area P."

Figure 17:
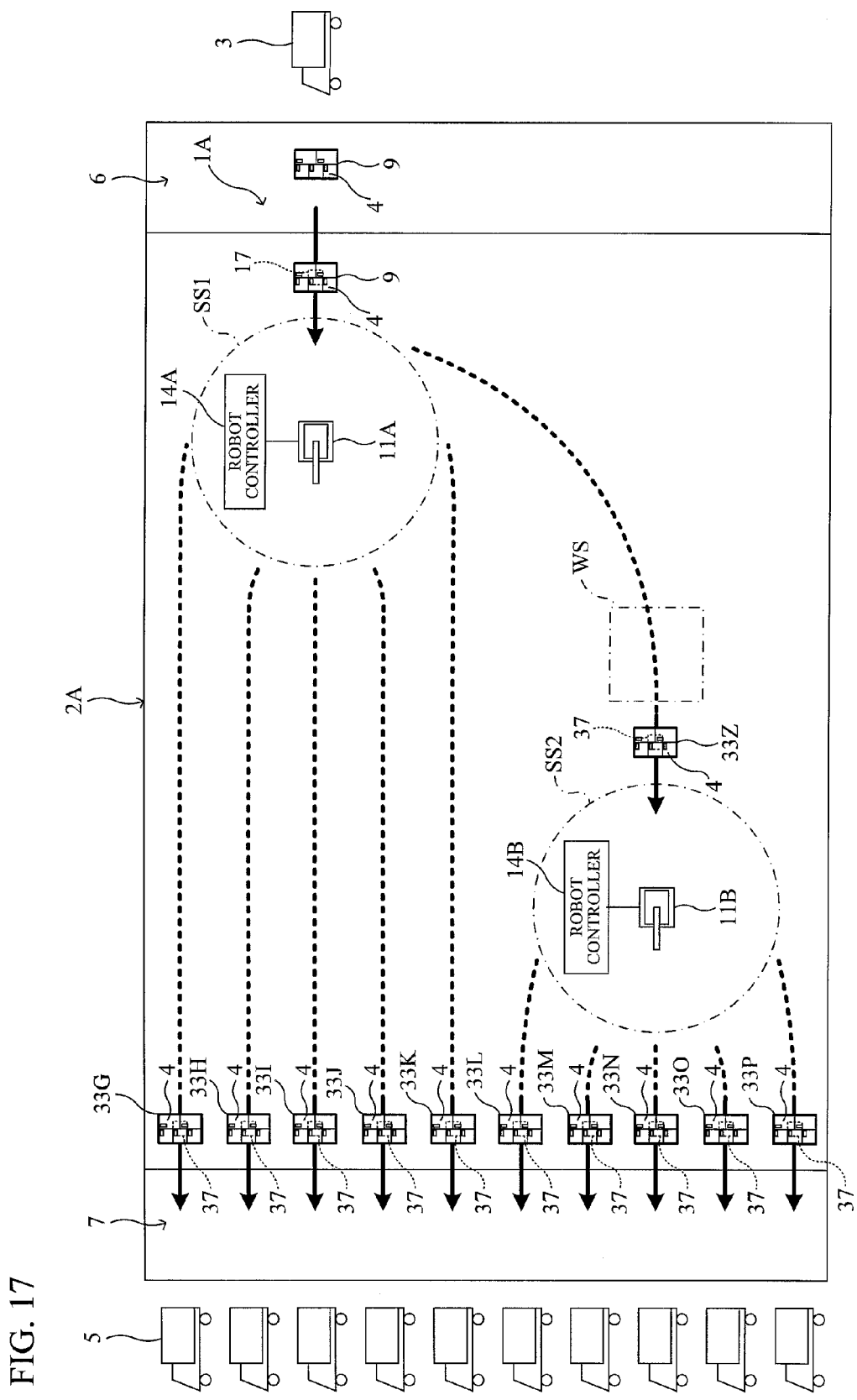
FIG. 17 is a system schematic conceptually illustrating the overall configuration of a robot system of a modification in which sorting is serially performed in a plurality of sorting spaces.
Figure 18:
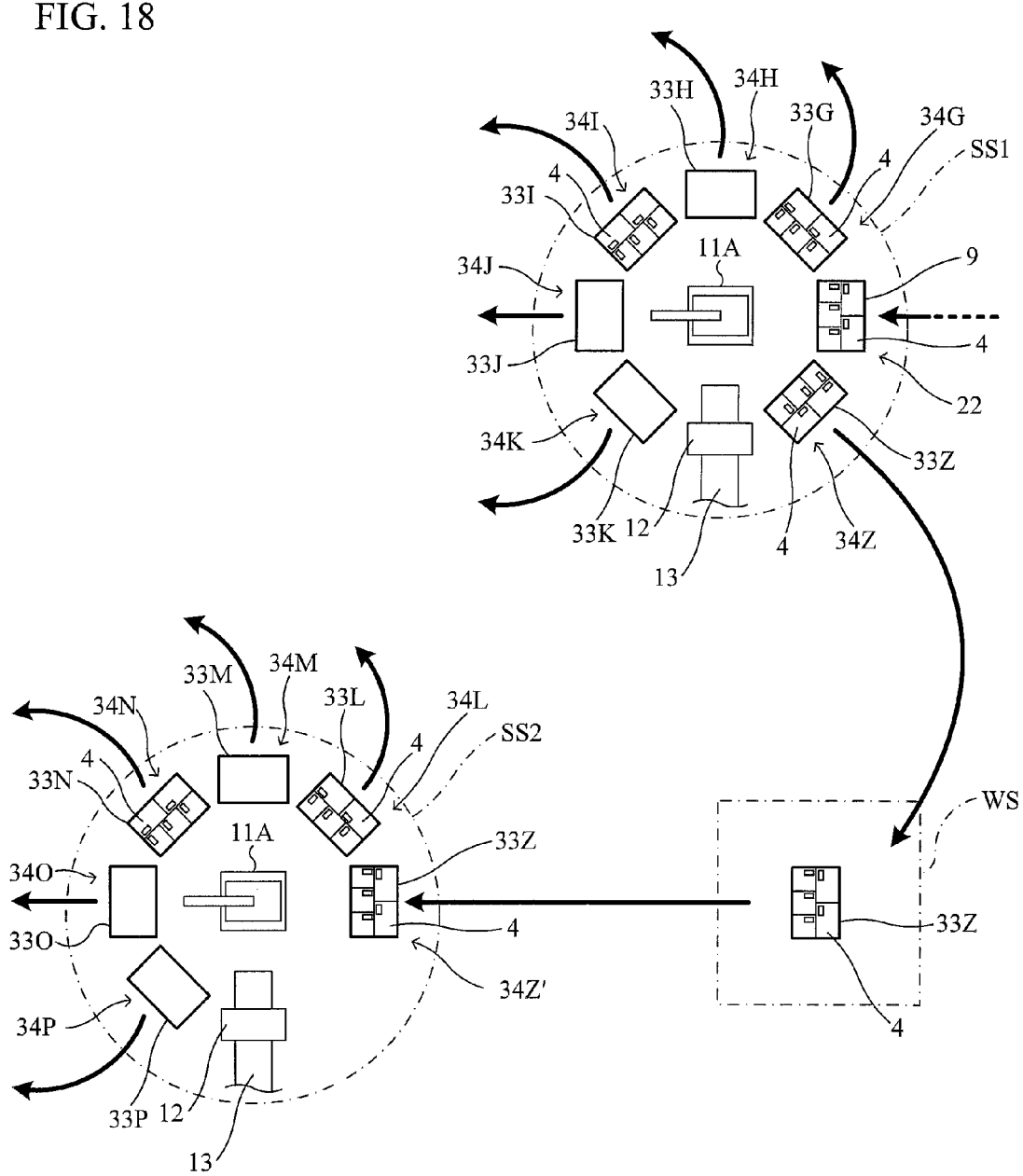
FIG. 18 is a top view schematically illustrating the interior of each sorting space.

As shown in FIG. 17 and FIG. 18, a robot system 1A of this modification is provided with a truck terminal 2A. The truck terminal 2A is a distribution facility for sorting the plurality of goods 4 received from the receiving-side truck 3 into the "Area G," "Area H," "Area I," "Area J," "Area K," "Area L," "Area M," "Area N," "Area O," and "Area P" in accordance with delivery destination areas, and transferring the sorted goods 4 of these areas "Area G" to "Area P" to the sending-side truck 5.

The robot system 1A comprises the receiving-side cargo 9, sending side cargos 33G, 33H, 33I, 33J, 33K, 33L, 33M, 33N, 33O, 33P, and 33Z (second loading portion; hereinafter suitably referred to as the "sending-side cargo 33" when indicated without distinction), two sorting spaces SS1 and SS2, a waiting space WS, the receiving-side cargo transport cart 17, a sending-side cargo transport cart 37 (second transport cart), the PLC 16, and the PC 15. Note that, to prevent complexities in illustration, the user interface 50 connected to the PLC 16, and the PC 15 are omitted in FIG. 17.

According to this modification, the PLC 16 determines the sorting mode (the quantity and arrangement of the sending-side cargos 33 arranged in each of the sorting spaces SS1 and SS2, the delivery destination areas corresponding to each of the sending-side cargos 33, etc.) of each of robots 11A and 11B (described later) in each of the sorting spaces SS1 and SS2, based on the sorting parameter information (the quantity information of the goods 4, and the quantity information of the goods 4 per delivery destination area) stored in the storage device of the PLC 16, and determines the delivery destination area corresponding to each of the sending-side cargos 33G to 33P and 33Z. Then, the correspondence information that associates each of the areas "Area G," "Area H," "Area I," "Area J," "Area K," "Area L," "Area M," "Area N," "Area O," "Area P," and "Area Z" (described later) with one of the sending-side cargos 33G to 33P and 33Z is generated and stored in the storage device of the PLC 16. In this example, the storage device of the PLC 16 stores the correspondence information that associates "Area G" to the sending-side cargo 33G, "Area H" to the sending-side cargo 33H, "Area I" to the sending-side cargo 33I, "Area J" to the sending-side cargo 33J, and "Area K" to the sending-side cargo 33K; collectively associates "Area L," "Area M," "Area N," "Area O," and "Area P" as "Area Z" to the sending-side cargo 33Z; and associates, as the areas included in "Area Z," "Area L" to the sending-side cargo 33L, "Area M" to the sending-side cargo 33M, "Area N" to the sending-side cargo 33N, "Area O" to the sending-side cargo 33O, and "Area P" to the sending-side cargo 33P.

That is, in this example, each of the areas "Area G," "Area H," "Area I," "Area J," and "Area K" links to the first sorting destination, "Area Z" links to the second sorting destination, and each of the areas "Area L," "Area M," "Area N," "Area O," and "Area P" links to the third sorting destination. Further, each of the sending-side cargos 33G to 33K and 33Z links to the first delivery-side loading portion, with the sending-side cargos 33G to 33K also link to a portion of the first delivery-side loading portion as well, and the sending-side cargo 33Z links to the remaining first delivery-side loading portion and the second supply-side loading portion as well. Further, each of the sending-side cargos 33L to 33P links to the second delivery-side loading portion.

The sending-side cargos 33G to 33P and 33Z comprise the same structure as each of the receiving-side cargo 9 and the sending-side cargos 10A to 10F (refer to FIGS. 4A and 4B).

In the sorting space SS1 are arranged a robot 11A (first robot), the preliminary loading table 12, the conveyor 13, and a robot controller 14A that controls the operation of the robot 11A. The robot 11A and the robot controller 14A are communicably connected. Note that, in FIG. 18, the robot controller 14A is omitted to prevent complexities in illustration. The receiving-side cargo arrangement area 22, and sending-side cargo arrangement areas 34G, 34H, 34I, 34J, 34K, and 34Z (second arrangement areas) for respectively arranging the sending-side cargos 33G, 33H, 33I, 33J, 33K, and 33Z received from a predetermined area are provided in the area surrounding the robot 11A of the sorting space SS1.

The robot 11A transfers the plurality of goods 4 loaded onto the receiving-side cargo 9 arranged in the receiving-side cargo arrangement area 22 by executing primary sorting in which the plurality of goods 4 is sorted into the areas "Area G" to "Area K" and "Area Z" in accordance with delivery destination areas, and transporting them to the sending-side cargos 33G to 33K and 33Z respectively arranged in the sending-side cargo arrangement areas 34G to 34K and 34Z. That is, the robot 11A executes primary sorting in which the plurality of goods 4 loaded onto the receiving-side cargo 9 is sorted into the sorted goods 4 of the "Area G," the sorted goods 4 of the "Area H," the sorted goods 4 of the "Area I," the sorted goods 4 of the "Area J," the sorted goods 4 of the "Area K," and the goods 4 of "Area Z," and transferred onto the sending-side cargo 33 corresponding to the delivery destination area.

Specifically, of the plurality of goods 4 loaded onto the receiving-side cargo 9, the robot 11A transfers the goods 4 for which the delivery destination is affiliated with the "Area G" to the sending-side cargo 33G corresponding to the "Area G" as the sorted goods 4 of the "Area G"; the goods 4 for which the delivery destination is affiliated with the "Area H" to the sending-side cargo 33H corresponding to the "Area H" as the sorted goods 4 of the "Area H"; the goods 4 for which the delivery destination is affiliated with the "Area I" to the sending-side cargo 33I corresponding to the "Area I" as the sorted goods 4 of the "Area I"; the goods 4 for which the delivery destination is affiliated with the "Area J" to the sending-side cargo 33J corresponding to the "Area J" as the sorted goods 4 of the "Area J"; the goods 4 for which the delivery destination is affiliated with the "Area K" to the sending-side cargo 33K corresponding to the "Area K" as the sorted goods 4 of the "Area K"; and the goods 4 for which the delivery destination is affiliated with the "Area Z," i.e., one of the areas "Area L," "Area M," "Area N," "Area O," or "Area P," to the sending-side cargo 33Z as the goods 4 of the "Area Z."

Further, when sorting is performed by the robot 11A in the sorting space SS1, the receiving-side cargo 9 arranged in the receiving-side berth 6 and loaded with the plurality of goods 4 is pulled by the receiving-side cargo transport cart 17, transported from the receiving-side berth 6, and arranged in the receiving-side cargo arrangement area 22, based on the control of the PLC 16. Further, the (empty) sending-side cargos 33G to 33K and 33Z arranged in a predetermined area are each pulled by the sending-side cargo transport cart 37, transported from the predetermined area, and arranged in the sending-side cargo arrangement areas 34G to 34K and 34Z. Then, when sorting has finished, the sorted (empty) receiving-side cargo 9 arranged in the receiving-side cargo arrangement area 22 is pulled by the receiving-side cargo transport cart 17 and transported from the receiving-side cargo arrangement area 22 to a predetermined area. Further, the sending-side cargos 33G to 33K respectively arranged in the sending-side cargo arrangement areas 34G to 34K and loaded with the sorted goods 4 of the corresponding delivery destination areas are pulled by the sending-side cargo transport cart 37 and transported from the sending-side cargo arrangement areas 34G to 34K to the sending-side berth 7. Further, the sending-side cargo 33Z arranged in the sending-side cargo arrangement area 34Z and loaded with the goods 4 of the "Area Z" is pulled by the sending-side cargo transport cart 37 and transported from the sending-side cargo arrangement area 34Z to a sending-side cargo arrangement area 34Z' described later of the sorting space SS2 via the waiting space WS.

In the sorting space SS2 are arranged a robot 11B (second robot), the preliminary loading table 12, the conveyor 13, and a robot controller 14B that controls the operation of the robot 11B. The robot 11B and the robot controller 14B are communicably connected. Note that, in FIG. 18, the robot controller 14B is omitted to prevent complexities in illustration. Further, the robot 11A and the robot controller 14A arranged in the sorting space SS1, the robot 11B and the robot controller 14B arranged in the sorting space SS2, and the PC 15 link to the robot. Further, the robot controller 14A arranged in the sorting space SS1, the robot controller 14B arranged in the sorting space SS2, the PLC 16 that controls these robot controllers 14A and 14B, and the PC 15 link to the first controller apparatus. In this sorting space SS2 are provided the sending-side cargo arrangement area 34Z' (first arrangement area) for arranging the sending-side cargo 33Z (link to the first loading portion) received from the sorting space SS1 via the waiting space WS, and sending-side cargo arrangement areas 34L, 34M, 34N, 34O, and 34P (second arrangement areas) for respectively arranging the sending-side cargos 33L, 33M, 33N, 33O, and 33P (link to the second loading portions) received from a predetermined area.

The robot 11B transfers the goods 4 of the "Area Z" that is loaded onto the sending-side cargo 33Z arranged in the sending-side cargo arrangement area 34Z' and was subjected to primary sorting by the robot 11A in the sorting space SS1 by executing secondary sorting in which the same are sorted into the areas "Area L" to "Area P," which are included in the "Area Z," in accordance with delivery destination areas, and transporting them to the sending-side cargos 33L to 33P respectively arranged in the sending-side cargo arrangement areas 34L to 34P. That is, the robot 11B executes secondary sorting in which the goods 4 of the "Area Z" loaded onto the sending-side cargo 33Z are sorted into the sorted goods 4 of the "Area L," the sorted goods 4 of the "Area M," the sorted goods 4 of the "Area N," the sorted goods 4 of the "Area O," and the sorted goods 4 of the "Area P," and transferred onto the sending-side cargo 33 corresponding to the delivery destination area.

Further, when sorting is performed by the robot 11B in the sorting space SS2, the sending-side cargo 33Z arranged in the waiting space WS and loaded with the goods 4 of the "Area Z" is pulled by the sending-side cargo transport cart 37, transported from the waiting space WS, and arranged in the sending-side cargo arrangement area 34Z', based on the control of the PLC 16. Further, the (empty) sending-side cargos 33L to 33P arranged in a predetermined area are each pulled by the sending-side cargo transport cart 37, transported from the predetermined area, and arranged in the sending-side cargo arrangement areas 34L to 34P. Then, when sorting has finished, the sorted (empty) sending-side cargo 33Z arranged in the sending-side cargo arrangement area 34Z' is pulled by the sending-side cargo transport cart 37 and transported from the sending-side cargo arrangement area 34Z' to a predetermined area. Further, the sending-side cargos 33L to 33P respectively arranged in the sending-side cargo arrangement areas 34L to 34P and loaded with the sorted goods 4 of the corresponding delivery destination areas are pulled by the sending-side cargo transport cart 37 and transported from the sending-side cargo arrangement areas 34L to 34P to the sending-side berth 7.

As described above, according to this modification, the plurality of goods 4 is first received in the sorting space SS1 where the robot 11A executes primary sorting, resulting in the sorted goods 4 of the "Area G," the sorted goods 4 of the "Area H," the sorted goods 4 of the "Area I," the sorted goods 4 of the "Area J," the sorted goods 4 of the "Area K," and the goods 4 of the "Area Z." Subsequently, the goods 4 of the "Area Z" subjected to primary sorting are received in the sorting space SS2 where the robot 11B executes secondary sorting, resulting in the sorted goods 4 of the "Area L," the sorted goods 4 of the "Area M," the sorted goods 4 of the "Area N," the sorted goods 4 of the "Area O," and the sorted goods 4 of the "Area P." That is, sorting is performed serially in the two sorting spaces SS1 and SS2, with the robot 11A first executing primary sorting in the sorting space SS1, followed by the robot 11B executing secondary sorting in the sorting space SS2.

The two robots 11A and 11B arranged in these two sorting spaces SS1 and SS2 each comprise the same structure and links to the robot 11 (refer to FIG. 5 and FIG. 6).

The control details of the manufacturing method of the sorted goods 4 respectively executed by the robot controllers 14A and 14B based on the control of the PLC 16 in this modification differ only in terms of factors such as delivery destination areas, number of delivery destination areas, and cargos subject to sorting and stacking in the process shown in the flow of the FIG. 12 and, since substantially the same procedures will basically suffice, the detailed descriptions thereof are omitted. The following describes an example of the control details executed by the PLC 16 of this modification, using FIG. 19.

Figure 19:
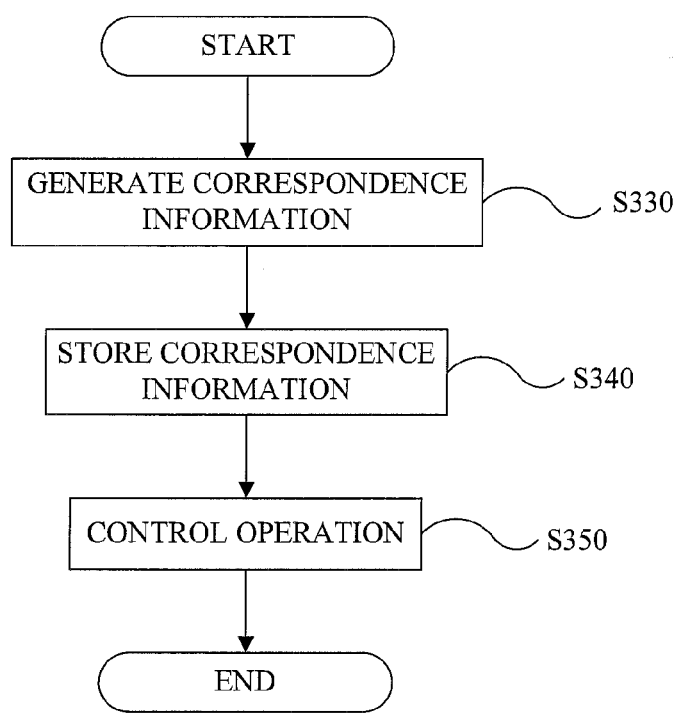
FIG. 19 is a flowchart showing an example of the control details executed by the PLC.

In FIG. 19, the process shown in the flow is started by a predetermined start operation (power ON of the PLC 16, for example). First, in step S330, the PLC 16 determines the sorting mode (the quantity and arrangement of the sending-side cargos 33 arranged in each of the sorting spaces SS1 and SS2, the delivery destination areas corresponding to each of the sending-side cargos 33, etc.) of each of the robots 11A and 11B in each of the sorting spaces SS1 and SS2, based on the sorting parameter information (the quantity information of the goods 4, and the quantity information of the goods 4 per delivery destination area) stored in the storage device of the PLC 16, and generates the correspondence information based on the details of that determination. The procedure of this step S330 links to the first correspondence information generating portion. According to this modification, as shown in the FIG. 18, six sending-side cargos 33 (sending-side cargos 33G to 33K and 33Z) are arranged in the sorting space SS1, and five sending-side cargos 33 (sending-side cargos 33L to 33P) are arranged in the sorting space SS2, with the sending-side cargos 33G, 33H, 33I, 33J, 33K, 33L, 33M, 33N, 33O, 33P, and 33Z determined to be respectively associated with "Area G," "Area H," "Area I," "Area J," "Area K," "Area L," "Area M," "Area N," "Area O," "Area P," and "Area Z," and the correspondence information is generated based on the details of that determination.

Subsequently, in step S340, the PLC 16 stores the correspondence information generated in the step S330 in the storage device of the PLC 16. The procedure of this step S340 links to the correspondence information storage step.

Then, the flow proceeds to step S350 where the PLC 16 outputs a control signal to each of the robot controllers 14A and 14B based on the correspondence information stored in the storage device of the PLC 16, and controls each of the robot controllers 14A and 14B that control each of the robots 11A and 11B so that the robots 11A and 11B of the sorting spaces SS1 and SS2 transfer the plurality of goods 4 to the respective corresponding sending-side cargos 33 in coordination. That is, according to this modification, the PLC 16 receives the receiving-side cargo 9 in the sorting space SS1, and controls the robot controller 14A that controls the operation of the robot 11A so that the plurality of goods 4 loaded onto the receiving-side cargo 9 is transferred to each of the identified sending-side cargos 33 of the sending-side cargos 33G to 33K and 33Z associated with the identified delivery destination areas, resulting in the sorted goods 4 of each of the areas "Area G" to "Area K" and the goods 4 of "Area Z." Further, the PLC 16 receives the sending-side cargo 33Z loaded with the goods 4 of the "Area Z" in the sorting space SS2, and controls the robot controller 14B that controls the operation of the robot 11B so that the goods 4 of the "Area Z" loaded onto the sending-side cargo 33Z are transferred to each of the identified sending-side cargos 33 of the sending-side cargos 33L to 33P associated with the identified delivery destination areas, resulting in the sorted goods 4 of each of the areas "Area L" to the "Area P." Subsequently, the process shown in this flow ends.

Note that the procedure corresponding to step S50 shown in the FIG. 12 and executed by each of the robot controllers 14A and 14B links to the sorting destination acquisition step. Further, the procedure corresponding to step S60 shown in the FIG. 12 and executed by each of the robot controllers 14A and 14B links to the second calculating portion and links to the second/first calculating step. Further, the procedure corresponding to step S90 shown in the FIG. 12 and executed by each of the robot controllers 14A and 14B links to the sorting destination determining portion and links to the second/first sorting destination determining step. Further, the procedure corresponding to step S170 shown in the FIG. 12 and executed by each of the robot controllers 14A and 14B, and the procedure of step S350 shown in the FIG. 19 and executed by the PLC 16 link to the second operation control portion and link to the transferring step.

In this modification described above, the sorting task is automatically performed by the two robots 11A and 11B, making it possible to reduce the labor burden of the worker and improve work efficiency, similar to the embodiment. Further, the delivery destination information is acquired from the barcode 8 provided to the top surface of the goods 4 via the vision sensor 27 provided to the robots 11A and 11B, making it possible to accurately determine the delivery destination area corresponding to the goods 4. With this arrangement, it is possible to prevent the goods 4 from being sorted into the wrong delivery destination area, and thus improve reliability.

Further, according to this modification, the storage device of the PLC 16 stores the correspondence information that associates each of the delivery destination areas with one of the plurality of sending-side cargos 33, and, in this example, the correspondence information that associates each of the areas "Area G" to "Area P" and "Area Z" to one of the sending-side cargos 33G to 33P and 33Z, which are determined based on sorting parameter information (the quantity information of the goods 4, and the quantity information of the goods 4 per delivery destination area) stored in advance. Then, the operation of each of the robots 11A and 11B is controlled so that the robots 11A and 11B transfer the plurality of goods 4 to the respective corresponding sending-side cargos 33G to 33P and 33Z in coordination, in accordance with the delivery destination information acquired by the vision sensor 27, based on the correspondence information stored in the storage device of this PLC 16. With this arrangement, the sorting parameters, such as the quantity of the goods 4 and the quantity of the goods 4 per delivery destination area, are inputted into the PLC 16 in advance and the sorting parameter information is stored in the storage device of the PLC 16, making it possible to change the sorting mode of each of the robots 11A and 11B in each of the sorting spaces SS1 and SS2 in accordance with sorting parameter variations. As a result, it is possible to execute sorting flexibly in response to sorting parameter variations using existing equipment.

Further, according to this modification, the delivery destination areas associated with each of the sending-side cargos 33G to 33P and 33Z are determined based on the sorting parameter information (the quantity information of the goods 4, and the quantity information of the goods 4 per delivery destination area) stored in the storage device of the PLC 16, and the correspondence information is generated based on the details of that determination and stored in the storage device of the PLC 16. With the delivery destination areas corresponding to each of the sending-side cargos 33G to 33P and 33Z automatically determined and the correspondence information thus generated, it is possible to reduce the labor burden of the operator in comparison to a case where the correspondence information is generated based on a manual operation of the operator. Further, this makes it possible to avoid defects such as correspondence information generation failure caused by an operator forgetting an operation.

Further, according to this modification, the storage device of the PLC 16 stores the quantity information of the goods 4 and the quantity information of the goods 4 per delivery destination as sorting parameter information. With this arrangement, it is possible to flexibly execute sorting in accordance with the variation in the quantity of the goods 4 and in the quantity of the goods 4 per delivery destination using existing equipment.

Further, according to this modification, sorting is performed serially in the two sorting spaces SS1 and SS2 so that the robot 11A first executes primary sorting in the sorting space SS1, and then the robot 11B executes secondary sorting in the sorting space SS2. As a result, work efficiency can be improved.

(1-3) When Sorting is Performed Serially in a Plurality of Sorting Spaces (2)

This modification is an example of a case where a truck terminal comprises three sorting spaces in which a robot that performs sorting is arranged as existing equipment, with 10 delivery destination areas of the plurality of goods 4, namely "Area X-A," "Area X-B," "Area X-C," "Area X-D," "Area X-E," "Area Y-F," "Area Y-G," "Area Y-H," "Area Y-I," and "Area Y-J."

Figure 20:
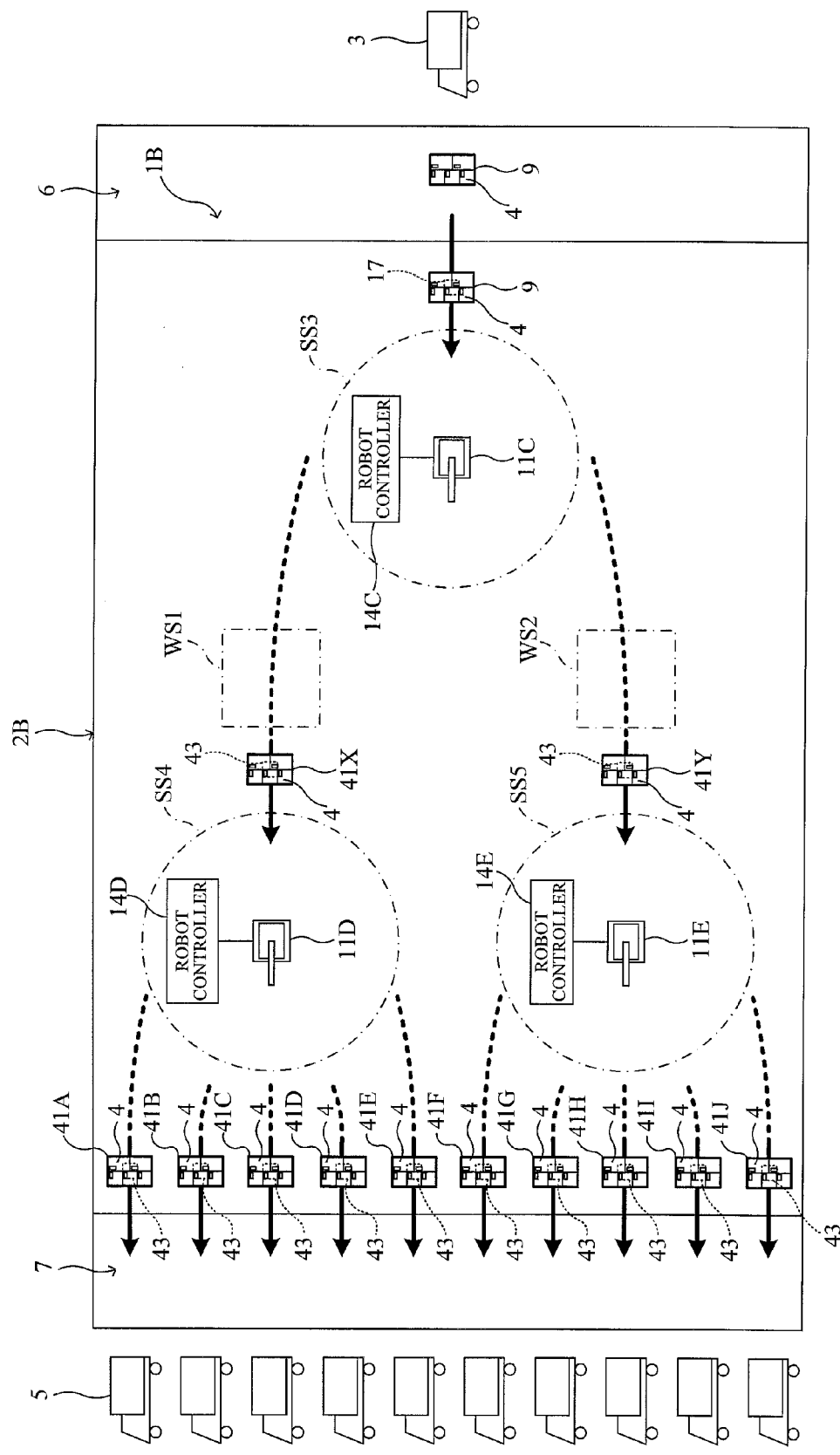
FIG. 20 is a system schematic conceptually illustrating the overall configuration of a robot system of a modification in which sorting is serially performed in a plurality of sorting spaces.
Figure 21:
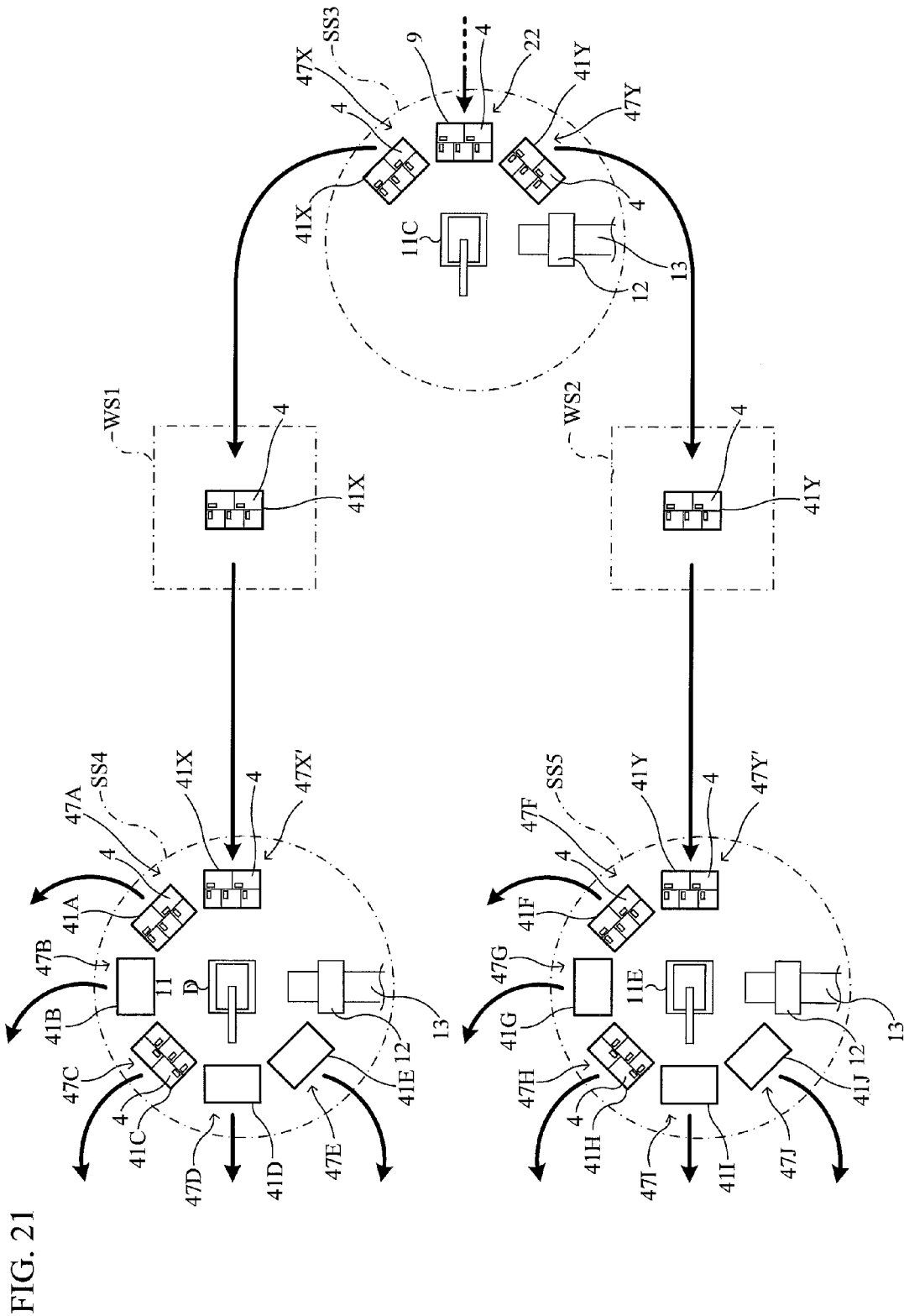
FIG. 21 is a top view schematically illustrating the interior of each sorting space.

As shown in FIG. 20 and FIG. 21, a robot system 1B of this modification is provided with a truck terminal 2B. The truck terminal 2B is a distribution facility for sorting the plurality of goods 4 received from the receiving-side truck 3 into the areas "Area X-A," "Area X-B," "Area X-C," "Area X-D," "Area X-E," "Area Y-F," "Area Y-G," "Area Y-H," "Area Y-I," and "Area Y-J" in accordance with delivery destination areas, and transferring the same to the sending-side truck 5 as the sorted goods 4 of these areas "Area X-A" to "Area X-E" and "Area Y-F" to "Area Y-J."

The robot system 1B comprises the receiving-side cargo 9, sending-side cargos 41A, 41B, 41C, 41D, 41E, 41F, 41G, 41H, 41I, 41J, 41X, and 41Y (second loading portions; hereinafter suitably referred to as the "sending-side cargo 41" when indicated without distinction), three sorting spaces SS3, SS4, and SS5, waiting spaces WS1 and WS2, the receiving-side cargo transport cart 17, a sending-side cargo transport cart 43 (second transport cart), the PLC 16, and the PC 15. Note that, to prevent complexities in illustration, the PLC 16, the user interface 50 connected to the PLC 16, and the PC 15 are omitted in FIG. 20.

According to this modification, the PLC 16 determines the sorting mode (the quantity and arrangement of the sending-side cargos 41 arranged in each of the sorting spaces SS3, SS4, and SS5, the delivery destination areas corresponding to each of the sending-side cargos 41, etc.) of each of robots 11C, 11D, and 11E (described later) in each of the sorting spaces SS3, SS4, and SS5, based on the sorting parameter information (the quantity information of the goods 4, and the quantity information of the goods 4 per delivery destination area) stored in the storage device of the PLC 16, and determines the delivery destination areas corresponding to each of the sending-side cargos 41A to 41J, 41X, and 41Y. Then, the correspondence information that associates each of the areas "Area X-A," "Area X-B," "Area X-C," "Area X-D," "Area X-E," "Area Y-F," "Area Y-G," "Area Y-H," "Area Y-I," and "Area Y-J," and the areas "Area X" and "Area Y" described later to one of the sending-side cargos 41A to 41J, 41×, and 41Y is generated and stored in the storage device of the PLC 16. According to this example, the storage device of the PLC 16 stores the correspondence information that associates "Area X" and "Area Y" classified based on predetermined classification standards with the sending-side cargos 41X and 41Y, respectively; the areas "Area X-A," "Area X-B," "Area X-C," "Area X-D," and "Area X-E" classified in more detail than "Area X" (classified under "Area X") with the sending-side cargos 41A, 41B, 41C, 41D, and 41E, respectively; and the areas "Area Y-F," "Area Y-G," "Area Y-H," "Area Y-I," and "Area Y-J" classified in more detail than "Area Y" (classified under "Area Y") with the sending-side cargos 41F, 41G, 41H, 41I, and 41J, respectively.

That is, in this example, the areas "Area X" and "Area Y" are each link to the fourth sorting destination, and the other areas "Area X-A" to "Area X-E" and "Area Y-F" to "Area Y-J" are each link to the fifth sorting destination. Further, the sending-side cargos 41X and 41Y are respectively link to the first delivery-side loading portion and second supply-side loading portion, and the sending-side cargos 41A to 41J are each link to the second delivery-side loading portion.

The sending-side cargos 41A to 41J, 41X, and 41Y comprise the same structure as each of the receiving-side cargo 9 and the sending-side cargos 10A to 10F (refer to FIGS. 4A and 4B).

In the sorting space SS3 are arranged the robot 11C (first robot), the preliminary loading table 12, the conveyor 13, and a robot controller 14C that controls the operation of the robot 11C. The robot 11C and the robot controller 14C are communicably connected. Note that, in FIG. 21, the robot controller 14C is omitted to prevent complexities in illustration. The receiving-side cargo arrangement area 22 and sending-side cargo arrangement areas 47X and 47Y (second arrangement areas) for respectively arranging the sending-side cargos 41X and 41Y received from a predetermined area are provided to the area surrounding the robot 11C of the sorting space SS3.

The robot 11C transfers the plurality of goods 4 loaded onto the receiving-side cargo 9 arranged in the receiving-side cargo arrangement area 22 by executing primary sorting in which the same is sorted into "Area X" and "Area Y" in accordance with delivery destination areas, and transporting the result to the sending-side cargos 41X and 41Y respectively arranged in the sending-side cargo arrangement areas 47X and 47Y. That is, the robot 11C executes primary sorting in which the plurality of goods 4 loaded onto the receiving-side cargo 9 is sorted into the goods 4 of the "Area X" and the goods 4 of the "Area Y," and then transferred to the sending-side cargos 41X and 41Y corresponding to delivery destination areas.

Specifically, of the plurality of goods 4 loaded onto the receiving-side cargo 9, the robot 11C transfers the goods 4 for which the delivery destination is affiliated with the "Area X" to the sending-side cargo 41X as the goods 4 of the "Area X"; and transfers the goods 4 for which the delivery destination is affiliated with the "Area Y" to the sending-side cargo 41Y as the goods 4 of the "Area Y."

Further, when sorting is performed by the robot 11C in the sorting space SS3, the receiving-side cargo 9 arranged in the receiving-side berth 6 and loaded with the plurality of goods 4 is pulled by the receiving-side cargo transport cart 17, transported from the receiving-side berth 6, and arranged in the receiving-side cargo arrangement area 22, based on the control of the PLC 16. Further, the (empty) sending-side cargos 41X and 41Y arranged in a predetermined area are each pulled by the sending-side cargo transport cart 43, transported from the predetermined area, and respectively arranged in the sending-side cargo arrangement areas 47X and 47Y. Then, when sorting has finished, the sorted (empty) receiving-side cargo 9 arranged in the receiving-side cargo arrangement area 22 is pulled by the receiving-side cargo transport cart 17, and transported from the receiving-side cargo arrangement area 22 to a predetermined area. Further, the sending-side cargo 41X arranged in the sending-side cargo arrangement area 47X and loaded with the goods 4 of the "Area X" is pulled by the sending-side cargo transport cart 43 and transported from the sending-side cargo arrangement area 47X to a sending-side cargo arrangement area 47X' described later of the sorting space SS4 via the waiting space WS1. Further, the sending-side cargo 41Y arranged in the sending-side cargo arrangement area 47Y and loaded with the goods 4 of the "Area Y" is pulled by the sending-side cargo transport cart 43 and transported from the sending-side cargo arrangement area 47Y to a sending-side cargo arrangement area 47Y' described later of the sorting space SS5 via the waiting space WS2.

In the sorting space SS4 are arranged the robot 11D (second robot), the preliminary loading table 12, the conveyor 13, and a robot controller 14D that controls the operation of the robot 11D. The robot 11D and the robot controller 14D are communicably connected. Note that, in FIG. 21, the robot controller 14D is omitted to prevent complexities in illustration. In this sorting space SS4 are provided the sending-side cargo arrangement area 47X' (first arrangement area) for arranging the sending-side cargo 41X (link to the first loading portion) received from the sorting space SS3 via the waiting space WS1, and the sending-side cargo arrangement areas 47A, 47B, 47C, 47D, and 47E (second arrangement areas) for respectively arranging the sending-side cargos 41A, 41B, 41C, 41D, and 41E received from a predetermined area.

The robot 11D transfers the goods 4 of the "Area X" loaded onto the sending-side cargo 41X arranged in the sending-side cargo arrangement area 47X' and subjected to primary sorting by the robot 11C in the sorting space SS3 by executing secondary sorting in which these goods 4 are sorted into the areas "Area X-A" to "Area X-E," which are classified under the "Area X" in accordance with delivery destination areas, and transporting the result to the sending-side cargos 41A to 41E respectively arranged in the sending-side cargo arrangement areas 47A to 47E. That is, the robot 11D executes secondary sorting in which the goods 4 of the "Area X" loaded onto the sending-side cargo 41X are sorted into the sorted goods 4 of the "Area X-A," the sorted goods 4 of the "Area X-B," the sorted goods 4 of the "Area X-C," the sorted goods 4 of the "Area X-D," and the sorted goods 4 of the "Area X-E," and transfers the result onto the sending-side cargo 41 corresponding to the delivery destination area.

Further, when sorting is performed by the robot 11D in the sorting space SS4, the sending-side cargo 41X that is arranged in the waiting space WS1 and loaded with the goods 4 of "Area X" is pulled by the sending-side cargo transport cart 43, transported from the waiting space WS1, and arranged in the sending-side cargo arrangement area 47X', based on the control of the PLC 16. Further, the (empty) sending-side cargos 41A to 41E arranged in a predetermined area are respectively pulled by the sending-side cargo transport cart 43, transported from the predetermined area, and arranged in the sending-side cargo arrangement areas 47A to 47E. Then, when sorting has finished, the sorted (empty) sending-side cargo 41X arranged in the sending-side cargo arrangement area 47X' is pulled by the sending-side cargo transport cart 43 and transported from the sending-side cargo arrangement area 47X' to a predetermined area. Further, the sending-side cargos 41A to 41E respectively arranged in the sending-side cargo arrangement areas 47A to 47E and loaded with the sorted goods 4 of corresponding delivery destination areas are pulled by the sending-side cargo transport cart 43 and transported from the sending-side cargo arrangement areas 47A to 47E to the sending-side berth 7.

In the sorting space SS5 are arranged the robot 11E (second robot), the preliminary loading table 12, the conveyor 13, and a robot controller 14E that controls the operation of the robot 11E. The robot 11E and the robot controller 14E are communicably connected. Note that, in FIG. 21, the robot controller 14E is omitted to prevent complexities in illustration. Further, the robot 11C and the robot controller 14C arranged in the sorting space SS3, the robot 11D and the robot controller 14D arranged in the sorting space SS4, the robot 11E and the robot controller 14E arranged in the sorting space SS5, and the PC 15 link to the robot. Further, the robot controller 14C arranged in the sorting space SS3, the robot controller 14D arranged in the sorting space SS4, the robot controller 14E arranged in the sorting space SS5, the PLC 16 that controls these robot controllers 14C, 14D, and 14E, and the PC 15 link to the first controller apparatus. In this sorting space SS5 are provided the sending-side cargo arrangement area 47Y' (first arrangement area) for arranging the sending-side cargo 41Y (link to the first loading portion) received from the sorting space SS3 via the waiting space WS2, and the sending-side cargo arrangement areas 47F, 47G, 47H, 47I, and 47J (second arrangement areas) for respectively arranging the sending-side cargos 41F, 41G, 41H, 41I, and 41J received from a predetermined area.

The robot 11E transfers the goods 4 of the "Area Y" loaded onto the sending-side cargo 41Y arranged in the sending-side cargo arrangement area 47Y' and subjected to primary sorting by the robot 11C in the sorting space SS3 by executing secondary sorting wherein these goods 4 are sorted into the areas "Area Y-F" to "Area Y-J," which are classified under the "Area Y" in accordance with delivery destination areas, and transporting the same to the sending-side cargos 41F to 41J respectively arranged in the sending-side cargo arrangement areas 47F to 47J. That is, the robot 11E executes secondary sorting in which the goods 4 of the "Area Y" loaded onto the sending-side cargo 41Y are sorted into the sorted goods 4 of the "Area Y-F," the sorted goods 4 of the "Area Y-G," the sorted goods 4 of the "Area Y-H," the sorted goods 4 of the "Area Y-I," and the sorted goods 4 of the "Area Y-J," and transferred onto the sending-side cargo 41 corresponding to the delivery destination area.

Further, when sorting is performed by the robot 11E in the sorting space SS5, the sending-side cargo 41Y arranged in the waiting space WS2 and loaded with the goods 4 of "Area Y" is pulled by the sending-side cargo transport cart 43, transported from the waiting space WS2, and arranged in the sending-side cargo arrangement area 47Y', based on the control of the PLC 16. Further, the (empty) sending-side cargos 41F to 41J arranged in a predetermined area are each pulled by the sending-side cargo transport cart 43, transported from the predetermined area, and arranged in the sending-side cargo arrangement areas 47F to 47J. Then, when sorting has finished, the sorted (empty) sending-side cargo 41Y arranged in the sending-side cargo arrangement area 47Y' is pulled by the sending-side cargo transport cart 43 from the sending-side cargo arrangement area 47Y' to a predetermined area. Further, the sending-side cargos 41F to 41J respectively arranged in the sending-side cargo arrangement areas 47F to 47J and loaded with the sorted goods 4 of the corresponding delivery destination areas are pulled by the sending-side cargo transport cart 43 and transported from the sending-side cargo arrangement areas 47F to 47J to the sending-side berth 7.

As described above, according to this modification, the plurality of goods 4 is received in the sorting space SS1, where the robot 11C performs primary sorting, resulting in the goods 4 of "Area X" and the goods 4 of "Area Y." Subsequently, the goods 4 of the "Area X" subjected to primary sorting are received in the sorting space SS4 where the robot 11D executes secondary sorting, resulting in the sorted goods 4 of the "Area X-A," the sorted goods 4 of the "Area X-B," the sorted goods 4 of the "Area X-C," the sorted goods 4 of the "Area X-D," and the sorted goods 4 of the "Area X-E." Subsequently, the goods 4 of the "Area Y" subjected to primary sorting are received in the sorting space SS5 where the robot 11E executes secondary sorting, resulting in the sorted goods 4 of the "Area Y-F," the sorted goods 4 of the "Area Y-G," the sorted goods 4 of the "Area Y-H," the sorted goods 4 of the "Area Y-I," and the sorted goods 4 of the "Area Y-J." That is, after the robot 11C executes primary sorting in the sorting space SS3, the two robots 11C and 11D execute secondary sorting in the two sorting spaces SS4 and SS5, thus serially executing sorting in the sorting space SS3 and in the two sorting spaces SS4 and SS5.

The three robots 11C, 11D, and 11E arranged in these three sorting spaces SS3, SS4, and SS5 each comprise the same structure and link to the robot 11 (refer to FIG. 5 and FIG. 6).

The control details of the manufacturing method of the sorted goods 4 respectively executed by the robot controllers 14C, 14D, and 14E based on the control of the PLC 16 in this modification differ only in terms of factors such as delivery destination areas, number of delivery destination areas, and cargos subject to sorting and stacking in the flow of the FIG. 12 and, since substantially the same process will basically suffice, the detailed descriptions thereof are omitted. Further, the same process as that shown in the flow of the FIG. 19 is sufficient for the control details executed by the PLC 16 in this modification. The following describes an example of the control details executed by the PLC 16 of this modification, using the FIG. 19.

First, in step S330 of the FIG. 19, the PLC 16 determines the sorting mode (the quantity and arrangement of the sending-side cargos 41 arranged in each of the sorting spaces SS3, SS4, and SS5, the delivery destination areas corresponding to each of the sending-side cargos 41, etc.) of each of the robots 11C, 11D, and 11E in each of the sorting spaces SS3, SS4, and SS5, based on the sorting parameter information (the quantity information of the goods 4, and the quantity information of the goods 4 per delivery destination area) stored in the storage device of the PLC 16, and generates the correspondence information based on the details of that determination. In this modification as well, the procedure of this step S330 links to the first correspondence information generating portion. According to this modification, as shown in the FIG. 21, two of the sending-side cargos 41 (sending-side cargos 41X and 41Y) are arranged in the sorting space SS3, five of the sending-side cargos 41 (sending side cargos 41A to 41E) are arranged in the sorting space SS4, and five of the sending-side cargos 41 (sending-side cargos 41F to 41J) are arranged in the sorting space SS5; the determination is made that the sending-side cargo 41X is associated with the "Area X," the sending-side cargo 41Y is associated with the "Area Y," the sending-side cargo 41A is associated with the "Area X-A," the sending-side cargo 41B is associated with the "Area X-B," the sending-side cargo 41C is associated with the "Area X-C," the sending-side cargo 41D is associated with the "Area X-D," the sending-side cargo 41E is associated with the "Area X-E," the sending-side cargo 41F is associated with the "Area Y-F," the sending-side cargo 41G is associated with the "Area Y-G," the sending-side cargo 41H is associated with the "Area Y-H," the sending-side cargo 41I is associated with the "Area Y-I," and the sending side cargo 41J is associated with the "Area Y-J"; and the correspondence information is generated based on the details of the determination.

Subsequently, in step S340 of the FIG. 19, the PLC 16 stores the correspondence information generated in the step S330 in the storage device of the PLC 16. According to this modification as well, the procedure of this step S340 links to the correspondence information storage step.

Then, the flow proceeds to step S350 of the FIG. 19 where the PLC 16 outputs a control signal to each of the robot controllers 14C, 14D, and 14E based on the correspondence information stored in the storage device of the PLC 16, and controls each of the robot controllers 14C, 14D, and 14E that control each of the robots 11C, 11D, and 11E so that the robots 11C, 11D, and 11E of the sorting spaces SS3, SS4, and SS5 transfer the plurality of goods 4 to each of the corresponding sending-side cargos 41 in coordination. That is, according to this modification, the PLC 16 receives the receiving-side cargo 9 in the sorting space SS3, and controls the robot controller 14C that controls the operation of the robot 11C so that the plurality of goods 4 loaded onto the receiving-side cargo 9 is transferred to each of the identified sending-side cargos 41 of the sending-side cargos 41X and 41Y associated with the identified delivery destination areas, resulting in the goods 4 of each of the areas "Area X" to "Area Y." Further, the PLC 16 receives the sending-side cargo 41X loaded with the goods 4 of the "Area X" in the sorting space SS4, and controls the robot controller 14D that controls the operation of the robot 11D so that the goods 4 of the "Area X" loaded onto the sending-side cargo 41X are transferred to each of the identified sending-side cargos 41 of the sending side cargos 41A to 41E associated with the identified delivery destination areas, resulting in the sorted goods 4 of each of the areas "Area X-A" to "Area X-E." Further, the PLC 16 receives the sending-side cargo 41Y loaded with the goods 4 of the "Area Y" in the sorting space SS5, and controls the robot controller 14E that controls the operation of the robot 11E so that the goods 4 of the "Area Y" loaded onto the sending-side cargo 41Y are transferred to each of the identified sending-side cargos 41 of the sending side cargos 41F to 41J associated with the identified delivery destination areas, resulting in the sorted goods 4 of each of the areas "Area Y-F" to the "Area Y-J." Subsequently, the process shown in this flow ends.

Note that the procedure corresponding to step S50 shown in the FIG. 12 and executed by each of the robot controllers 14C, 14D, and 14E links to the sorting destination acquisition step. Further, the procedure corresponding to step S60 shown in the FIG. 12 and executed by each of the robot controllers 14C, 14D, and 14E link to the second calculating portion and link to the second/first calculating step. Further, the procedure corresponding to step S90 shown in the FIG. 12 and executed by each of the robot controllers 14C, 14D, and 14E links to the sorting destination determining portion and links to the second/first sorting destination determining step. Further, the procedure corresponding to step S170 shown in the FIG. 12 and executed by each of the robot controllers 14C, 14D, and 14E, and the procedure of step S350 shown in the FIG. 19 and executed by the PLC 16 link to the second operation control portion and link to the transferring step.

In the modification described above, after the robot 11C executes primary sorting in the sorting space SS3, each of the two robots 11C and 11D executes secondary sorting in the two sorting spaces SS4 and SS5, thus serially executing sorting in the sorting space SS3 and in the two sorting spaces SS4 and SS5. With this arrangement, the same advantages as those of the modification of (1-2) can be achieved.

(1-4) When Sorting is Performed in Parallel in a Plurality of Sorting Spaces

This modification is an example of a case where a plurality of robots executes sorting in parallel in a plurality of sorting spaces. Further, this embodiment is an example of a case where a truck terminal is provided with two sorting spaces where a robot that executes sorting is arranged as existing equipment, and the delivery destination areas of the plurality of goods 4 are established as the six areas of "Area A," "Area B," "Area C," "Area D," "Area E," and "Area F."

Figure 22:
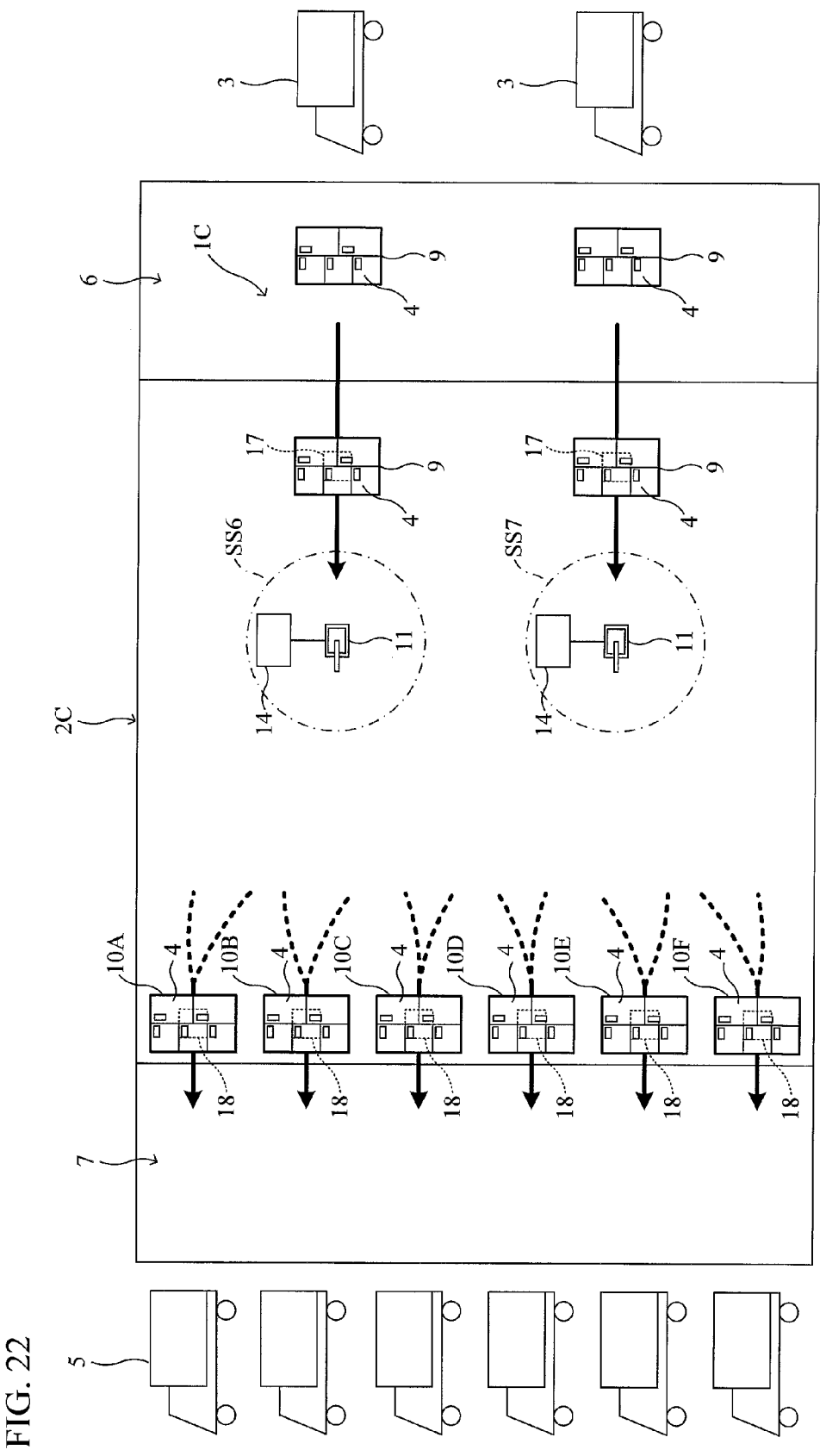
FIG. 22 is a system schematic conceptually illustrating the overall configuration of a robot system of a modification in which sorting is performed in parallel in a plurality of sorting spaces.
Figure 23:
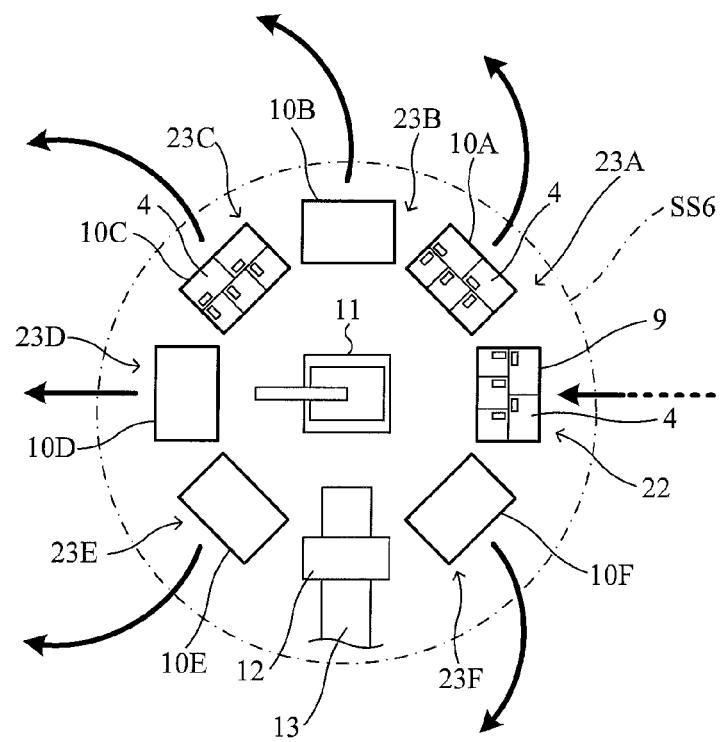
FIG. 23 is a top view schematically illustrating the interior of each sorting space.
Figure 23:
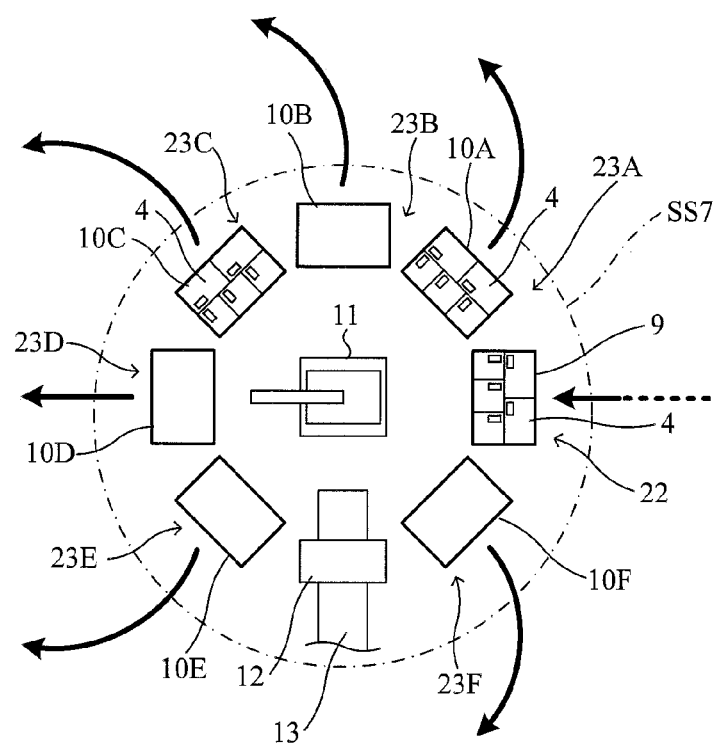

As shown in FIG. 22 and FIG. 23, a robot system 1C of this modification is provided in a truck terminal 2C. The truck terminal 2C is a distribution facility for sorting the plurality of goods 4 received from the receiving-side truck 3 into the "Area A," "Area B," "Area C," "Area D," "Area E," and "Area F" in accordance with delivery destination areas, and transferring the sorted goods 4 of each of the areas "Area A" to "Area F" to the sending-side truck 5.

The robot system 1C comprises the receiving-side cargo 9, the sending-side cargos 10A to 10F, two sorting spaces SS6 and SS7, the receiving-side cargo transport cart 17, the sending-side cargo transport cart 18, the PLC 16, and the PC 15. Note that, to prevent complexities in illustration, the PLC 16, the user interface 50 connected to the PLC 16, and the PC 15 are omitted in FIG. 22.

According to this modification, the PLC 16 determines the sorting mode (the quantity and arrangement of the sending-side cargos 10 arranged in each of the sorting spaces SS6 and SS7, the delivery destination areas corresponding to each of the sending-side cargos 10, etc.) of each of the robots 11 and 11 (described later) in each of the sorting spaces SS6 and SS7, based on the sorting parameter information (the quantity information of the goods 4, and the quantity information of the goods 4 per delivery destination area) stored in the storage device of the PLC 16, and determines the delivery destination area corresponding to each of the sending-side cargos 10A to 10F. Then, the correspondence information that associates each of the areas "Area A," "Area B," "Area C," "Area D," "Area E," and "Area F" with one of the sending-side cargos 10A to 10F is generated and stored in the storage device of the PLC 16.

The sorting space SS6 is the same as the sorting space SS (refer to FIG. 3); that is, the robot 11, the preliminary loading table 12, the conveyor 13, and the robot controller 14 are arranged in the sorting space SS6, and the receiving-side cargo arrangement area 22 and the sending-side cargo arrangement areas 23A to 23F are provided around the robot 11. Note that, in FIG. 23, the robot controller 14 is omitted to prevent complexities in illustration.

The robot 11 arranged in this sorting space SS6 performs the same processing as the embodiment. That is, the robot 11 sorts the plurality of goods 4 loaded onto the receiving-side cargo 9 arranged in the receiving-side cargo arrangement area 22 of the sorting space SS6 into the "Area A," "Area B," "Area C," "Area D," "Area E," and "Area F" in accordance with delivery destination areas, and transfers the result to the sending-side cargos 10A to 10F respectively arranged in the sending-side cargo arrangement areas 23A to 23F of the sorting space SS6. Note that, according to this modification, the robot 11 arranged in this sorting space SS6 links to the first robot, the receiving-side cargo 9 arranged in the receiving-side cargo arrangement area 22 of the sorting space SS6 links to the first supply-side loading portion, and the sending-side cargos 10A to 10F respectively arranged in the sending-side cargo arrangement areas 23A to 23F of the sorting space SS6 link to the first delivery-side loading portion.

The sorting space SS7 is the same as the sorting space SS (refer to FIG. 3); that is, the robot 11, the preliminary loading table 12, the conveyor 13, and the robot controller 14 are arranged in the sorting space SS7, and the receiving-side cargo arrangement area 22 and the sending-side cargo arrangement areas 23A to 23F are provided around the robot 11. Note that, in FIG. 23, the robot controller 14 is omitted to prevent complexities in illustration. Further, the robot 11 and the robot controller 14 arranged in the sorting space SS6, the robot 11 and the robot controller 14 arranged in the sorting space SS7, and the PC 15 link to the robot. Further, the robot controller 14 arranged in the sorting space SS6, the robot controller 14 arranged in the sorting space SS7, the PLC 16 that controls these robot controllers 14 and 14, and the PC 15 link to the first controller apparatus.

The robot 11 arranged in this sorting space SS7 performs the same processing as the embodiment. That is, the robot 11 sorts the plurality of goods 4 loaded onto the receiving-side cargo 9 arranged in the receiving-side cargo arrangement area 22 of the sorting space SS7 into the "Area A," "Area B," "Area C," "Area D," "Area E," and "Area F" in accordance with delivery destination areas, and transfers the result to the sending-side cargos 10A to 10F respectively arranged in the sending-side cargo arrangement areas 23A to 23F of the sorting space SS7. Note that, according to this modification, the robot 11 arranged in this sorting space SS7 links to the second robot, the receiving-side cargo 9 arranged in the receiving-side cargo arrangement area 22 of the sorting space SS7 links to the second supply-side loading portion, and the sending-side cargos 10A to 10F respectively arranged in the sending-side cargo arrangement areas 23A to 23F of the sorting space SS7 link to the second delivery-side loading portion.

As described above, according to this modification, the plurality of goods 4 is divided and received in the sorting spaces SS6 and SS7, and then each of the robots 11 and 11 executes sorting in parallel in each of the sorting spaces SS6 and SS7, resulting in the sorted goods 4 of the "Area A," the sorted goods 4 of the "Area B," the sorted goods 4 of the "Area C," the sorted goods 4 of the "Area D," the sorted goods 4 of the "Area E," and the sorted goods 4 of the "Area F." That is, the sorting task of the robot 11 in the sorting space SS6 and the sorting task of the robot 11 in the sorting space SS7 are performed in parallel, resulting in parallel execution of sorting in the two sorting spaces SS6 and SS7.

In this modification, substantially the same procedure as the process shown in the flow of the FIG. 12 is sufficient for the control details of the manufacturing method of the sorted goods 4 respectively executed by each of the robot controllers 14 based on the control of the PLC 16, and a detailed description thereof will be omitted. Further, the same process as that shown in the flow of the FIG. 19 is sufficient for the control details executed by the PLC 16 in this modification. The following describes an example of the control details executed by the PLC 16 of this modification, using the FIG. 19.

First, in step S330 of the FIG. 19, the PLC 16 determines the sorting mode (the quantity and arrangement of the sending-side cargos 10 arranged in each of the sorting spaces SS6 and SS7, the delivery destination areas corresponding to each of the sending-side cargos 10, etc.) of each of the robots 11 and 11 in each of the sorting spaces SS6 and SS7, based on the sorting parameter information (the quantity information of the goods 4, and the quantity information of the goods 4 per delivery destination area) stored in the storage device of the PLC 16, and generates the correspondence information based on the details of that determination. In this modification as well, the procedure of this step S330 links to the first correspondence information generating portion. According to this modification, as shown in the FIG. 23, six of the sending-side cargos 10 (sending-side cargos 10A to 10F) are arranged in each of the sorting spaces SS6 and SS7, the determination is made that the sending-side cargos 10A, 10B, 10C, 10D, and 10E are respectively associated with the areas "Area A," "Area B," "Area C," "Area D," and "Area E," and the correspondence information is generated based on the details of that determination.

Subsequently, in step S340 of the FIG. 19, the PLC 16 stores the correspondence information generated in the step S330 in the storage device of the PLC 16. According to this modification as well, the procedure of this step S340 links to the correspondence information storage step.

Then, the flow proceeds to step S350 of the FIG. 19 where the PLC 16 outputs a control signal to each of the robot controllers 14 and 14 based on the correspondence information stored in the storage device of the PLC 16, and controls each of the robot controllers 14 and 14 that control each of the robots 11 and 11 so that the robots 11 and 11 of the sorting spaces SS6 and SS7 transfer the plurality of goods 4 to each of the corresponding sending-side cargos 10 in coordination. That is, according to this modification, the PLC 16 receives the receiving-side cargo 9 in each of the sorting space SS6 and SS7, and controls the robot controllers 14 and 14 that control the operation of each of the robots 11 and 11 so that the plurality of goods 4 loaded onto the receiving-side cargo 9 is transferred to each of the identified sending-side cargos 10 of the sending-side cargos 10A to 10F associated with the identified delivery destination areas in parallel, resulting in the sorted goods 4 of each of the areas "Area A" to "Area F." Subsequently, the process shown in this flow ends.

Note that the procedure corresponding to step S50 shown in the FIG. 12 and executed by each of the robot controllers 14 links to the sorting delivery destination acquisition step. Further, the procedure corresponding to step S60 shown in the FIG. 12 and executed by each of the robot controllers 14 link to the second calculating portion and link to the second/first calculating step. Further, the procedure corresponding to step S90 shown in the FIG. 12 and executed by each of the robot controllers 14 links to the sorting destination determining portion and links to the second/first sorting destination determining step. Further, the procedure corresponding to step S170 shown in the FIG. 12 and executed by each of the robot controllers 14, and the procedure of step S350 shown in the FIG. 19 and executed by the PLC 16 link to the second operation control portion and link to the transferring step.

According to this modification described above, the same advantages as those of the modification (1-2) can be achieved. Further, according to this modification, the sorting task of the robot 11 in the sorting space SS6 and the sorting task of the robot 11 in the sorting space SS7 are performed in parallel, resulting in the parallel execution of sorting in the two sorting spaces SS6 and SS7. With this arrangement, even in a case where the robot 11 of one of the sorting spaces (the robot 11 of the sorting space SS6, for example) is shut down due to failure, maintenance, or the like, it is possible to continue the sorting task using the robot 11 of the other sorting space (the robot 11 of the sorting space SS7, for example), thereby preventing shutdown of the overall system. As a result, the stability and reliability of the robot system 1C are improved.

(1-5) When the Correspondence Information is Generated Based on a Manual Operation of the Operator In the modifications of (1-2) and (1-4), the delivery destination areas respectively associated with the sending-side cargos arranged in each of the sorting spaces are automatically determined to generate correspondence information, but the present disclosure is not limited thereto. That is, the operator himself or herself may determine the sorting mode (the quantity and arrangement of the sending-side cargos arranged in each of the sorting spaces, the delivery destination areas respectively associated with the sending-side cargos, etc.) of each of the robots of each of the sorting spaces, and the PLC 16 may generate the correspondence information based on the details of that determination. In such a case, the PLC 16 generates the correspondence information based on the operation information of the user interface 50 via the operator (links to the second correspondence generating portion), and stores the generated correspondence information in the storage device of the PLC 16. According to this modification, the correspondence information intended by the operator is reliably generated, thereby increasing reliability in comparison to a case where that information is automatically generated.

(1-6) When the Quantity of Sending-Side Cargos Corresponding to Delivery Destination Areas Having a High Quantity of Goods is Increased In the embodiment, the sending-side cargos 10 of the sending-side cargos 10A to 10E corresponding to the delivery destination areas having a relatively high quantity of the goods 4 are arranged closer to the receiving-side cargo 9 than the other sending-side cargos 10, but the present disclosure is not limited thereto. That is, the sending-side cargos 10 corresponding to the delivery destination areas having a relatively high quantity of the goods 4 may be arranged so that the quantity arranged is higher than that of the other sending-side cargos 10. With this arrangement, it is possible to reduce the replacement frequency of the sending-side cargos 10 corresponding to the delivery destination areas having a relatively high quantity of the goods 4, thereby shortening the tact time of the sorting task.

Second embodiment will now be described with reference to accompanying drawings. This embodiment is an example where articles are sorted as part of an article loading/unloading task. The components that are the same as those in the first embodiment will be denoted using the same reference numerals, and descriptions thereof will be suitably omitted or simplified.

The robot system 1 of this embodiment is also provided to the truck terminal 2 of a delivery service provider, and the general arrangement is the same as that shown in the FIG. 1.

Figure 24:
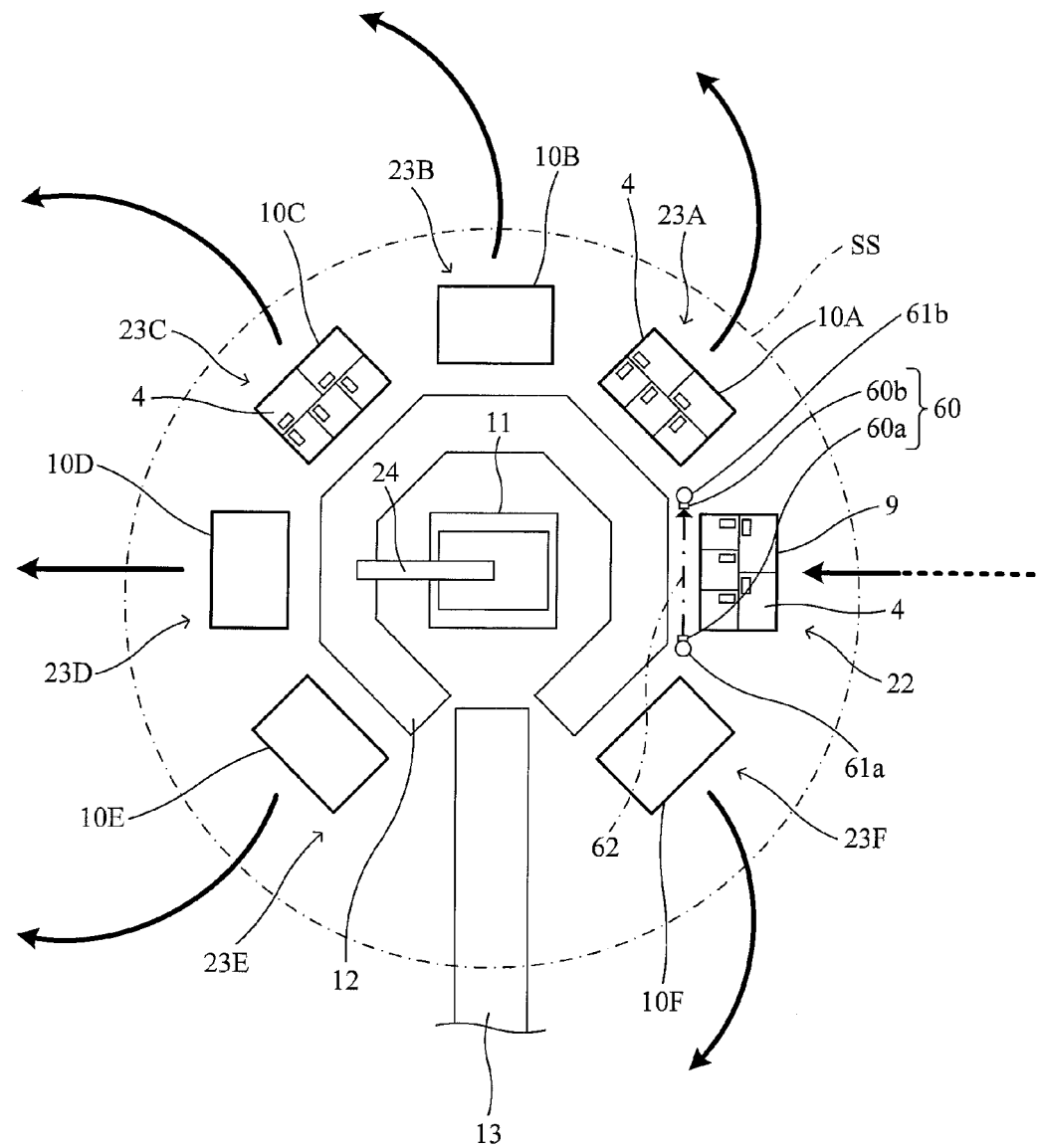
FIG. 24 is a top view schematically illustrating the interior of the sorting space of the robot system of second embodiment.

That is, as shown in FIG. 24 and the FIG. 1, the robot system 1 comprises the receiving-side cargo 9 (fifth loading portion, supply apparatus) that supplies the goods 4, the sending-side cargos 10A, 10B, 10C, 10D, 10E, and 10F (sixth loading portion, hereinafter suitably referred to as the "sending-side cargo 10" in cases where these are not distinguished), the sorting space SS, the receiving-side cargo transport cart 17, the sending-side cargo transport cart 18, the PLC (Programmable Logic Controller) 16, and the PC (Personal Computer) 15.

Figure 25A:
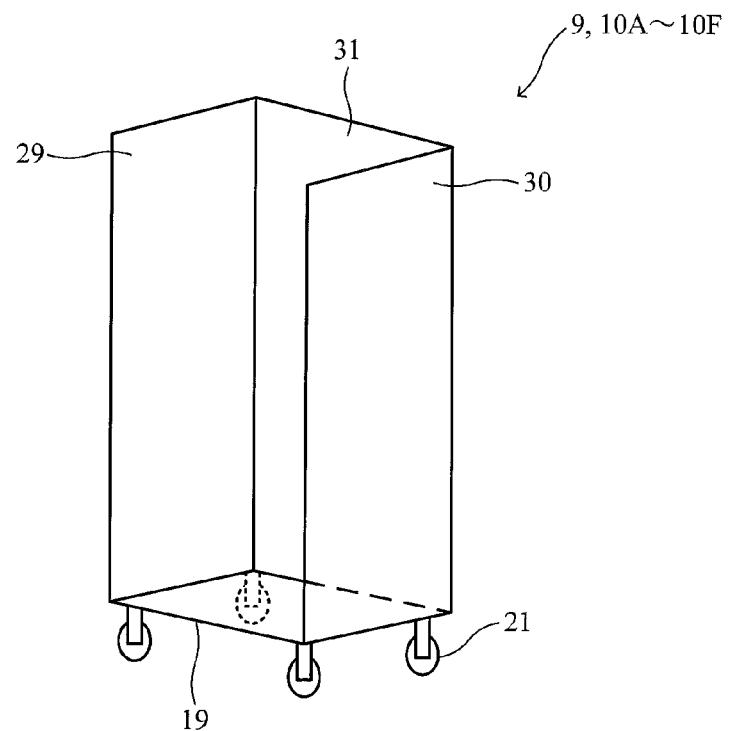
FIG. 25 is a perspective view schematically illustrating the cargo.
Figure 25B:
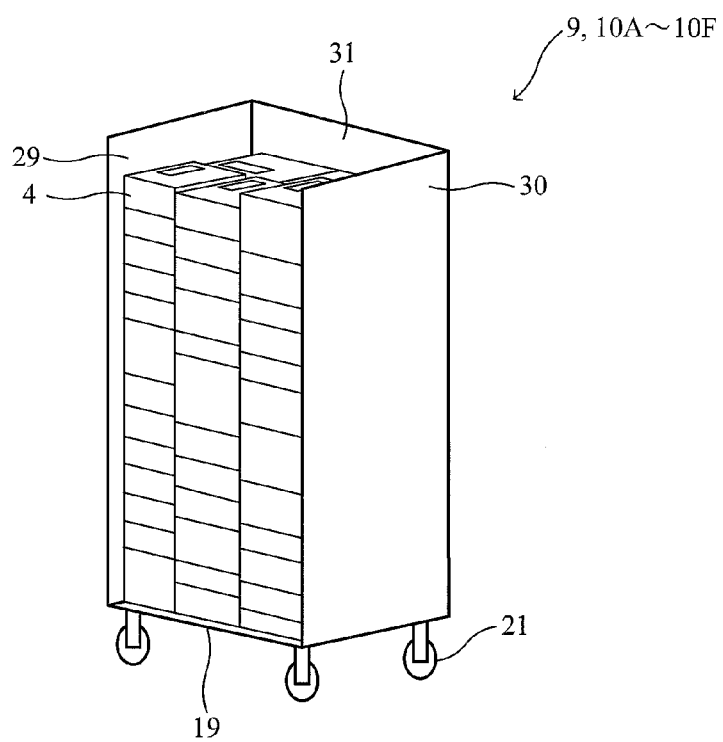

The receiving-side cargo 9 and the sending-side cargos 10A to 10F each comprise the same structure and, in this embodiment, also include the side walls 29 and 30, the rear wall 31, and the shelf 19 that permits stacking of the goods 4 in a plurality, as shown in FIGS. 25A and 25B. The caster 21 is installed in each of the four corners of the bottom surface of the shelf 19, and the receiving-side cargo 9 and the sending-side cargos 10A to 10F are each configured to move freely.

The plurality of the goods 4 received from the receiving-side truck 3 is loaded in a plurality of stacks onto the shelf 19 of the receiving-side cargo 9 so that the top surface side on which the barcode 8 is provided is facing upward.

As shown in FIG. 24 and the FIG. 1, the robot 11 comprising the arm 24, the preliminary loading table 12, the conveyor 13, the robot controller 14 (second controller apparatus), and a photoelectric sensor 60 comprising a light-emitting portion 60a and a light-receiving portion 60b are arranged in the sorting space SS. The robot 11 and the robot controller 14 are communicably connected, and the robot controller 14, the PLC 16, and the PC 15 are communicably connected. Further, the robot controller 14 and the photoelectric sensor 60 are communicably connected. Note that, in FIG. 24, the robot controller 14 is omitted to prevent complexities in illustration. The area around the robot 11 of this sorting space SS is provided with the receiving-side cargo arrangement area 22 (arrangement location) for arranging the receiving-side cargo 9 received from the receiving-side berth 6, and the sending-side cargo arrangement areas 23A, 23B, 23C, 23D, 23E, and 23F for respectively arranging the sending-side cargo 10A, 10B, 10C, 10D, 10E, and 10F received from a predetermined area.

Figure 26:
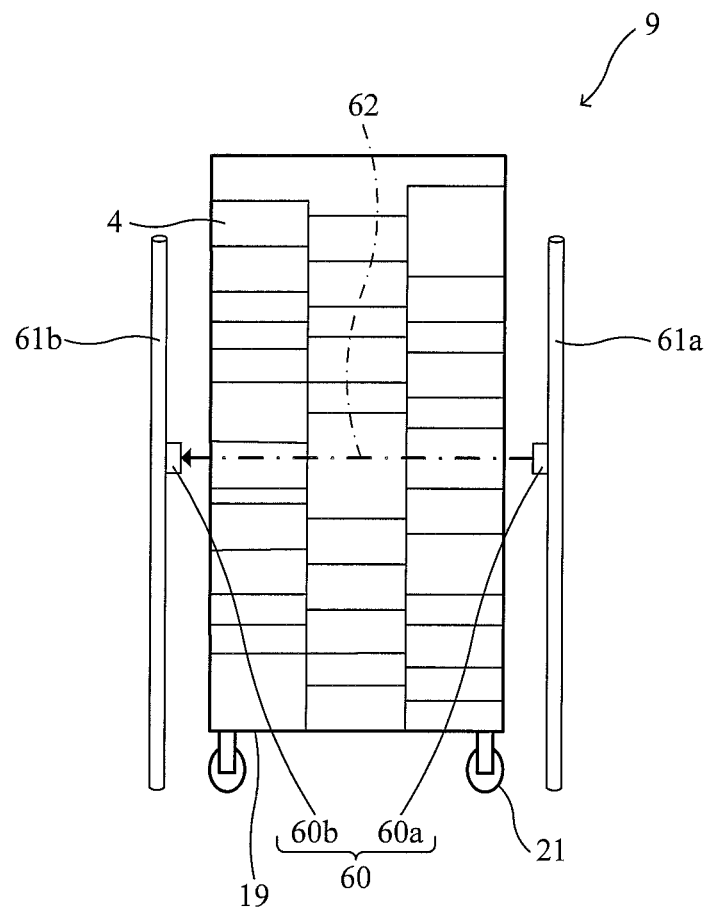
FIG. 26 is an explanatory drawing that explains the installation location of the light-emitting portion and light-receiving portion of the photoelectric sensor.

As shown in FIG. 24 and FIG. 26, two support poles 61a and 61b (first support portion) are provided near the receiving-side cargo arrangement area 22, with the light-emitting portion 60a that emits light (infrared or visible light) installed on one of the support poles 61 (support pole 61a in this example), and the light-receiving portion 60b that receives the light emitted from the light-emitting portion 60a installed on the other of the support poles 61 (the support pole 61b in this example). The light reception result of the light-receiving portion 60b is outputted to the robot controller 14. Specifically, the light-emitting portion 60a and the light-receiving portion 60b are respectively fixed to the support poles 61a and 61b so that an optical path 62 of the light that travels between the two has a height position that is located at the substantial center (although not limited to the center height position, but including nearby height positions as well) of the height position of the goods 4 loaded at the highest position of the receiving-side cargo 9 (such as the permitted upper limit height position where the goods 4 are loadable onto the receiving-side cargo 9, for example) and the height position of the goods 4 loaded at the lowest position of the receiving-side cargo 9 (such as the height position of the top surface of the shelf 19, for example). Further, the optical path 62 is formed to substantially follow the horizontal direction in this example.

Figure 27:
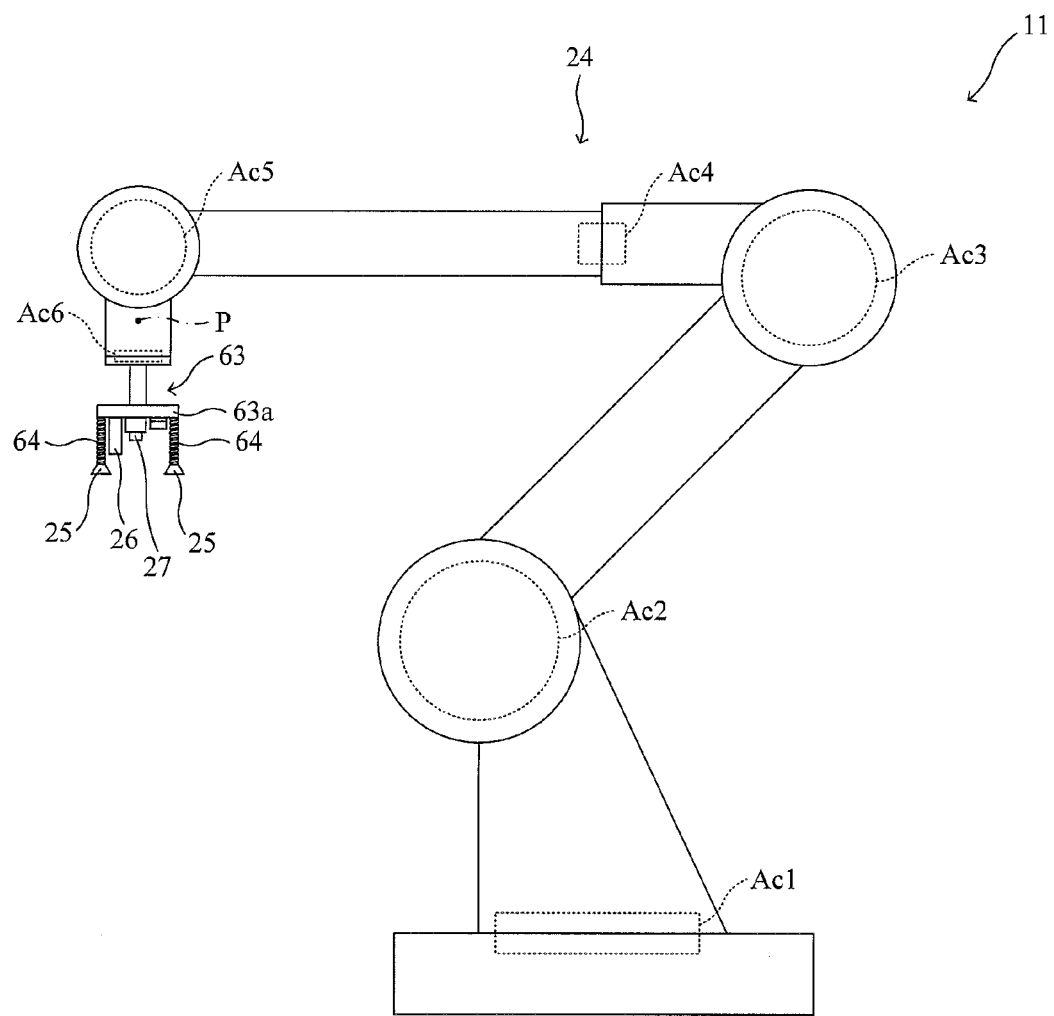
FIG. 27 is a side view schematically illustrating the robot configuration.
Figure 28:
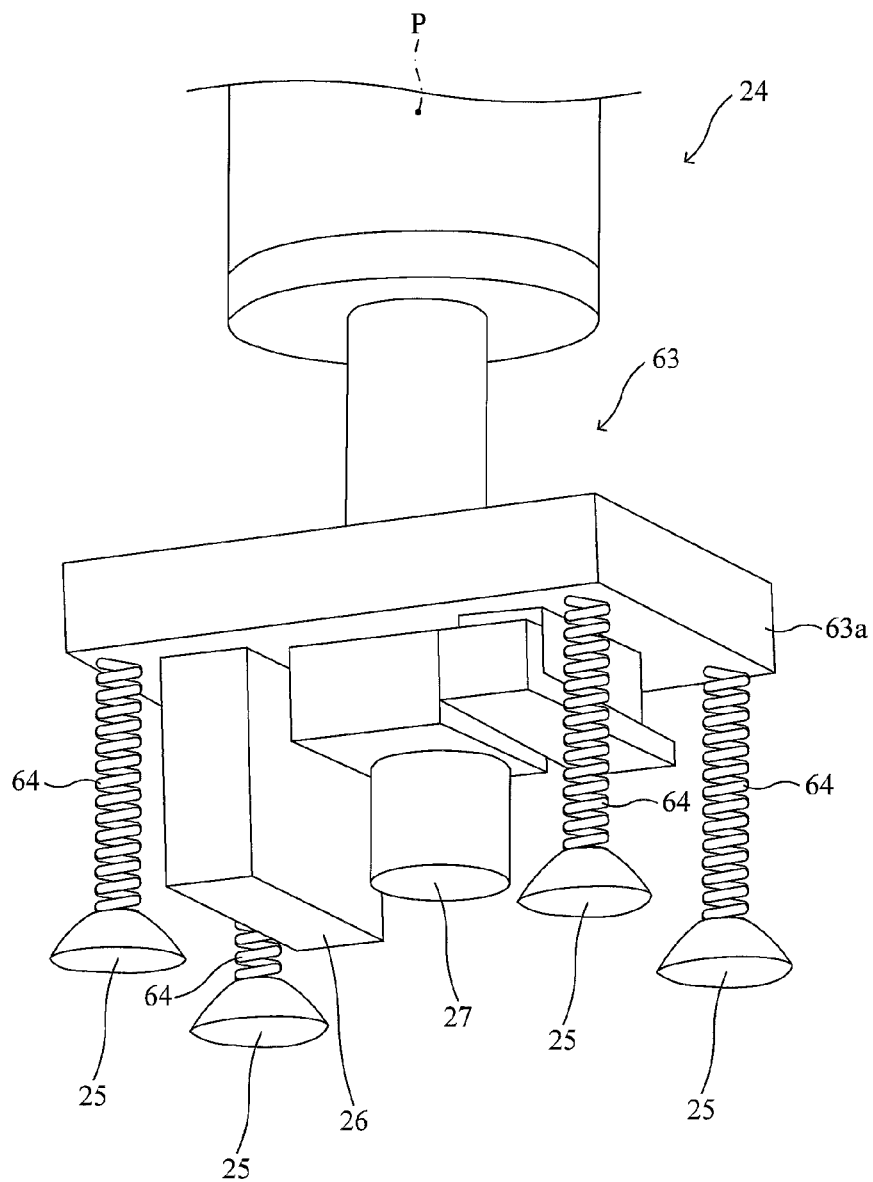
FIG. 28 is a perspective view schematically illustrating the end side of the arm.

As shown in FIG. 24, the robot 11 sorts the plurality of goods 4 loaded onto the receiving-side cargo 9 arranged in the receiving-side cargo arrangement area 22 by lifting and transporting each of the goods 4 using the suction pad 25 described later to the sending-side cargos 10 of the sending-side cargos 10A to 10F arranged in the sending-side cargo arrangement areas 23A to 23F that correspond to the delivery destination area. This robot 11, as shown in FIG. 27 and FIG. 28, comprises the arm 24 and actuators Ac1, Ac2, Ac3, Ac4, Ac5, and Ac6, each constituting a servo motor for driving the arm 24.

The servo motor of each of the actuators Ac1 to Ac6 is communicably connected with the robot controller 14, and operates in accordance with a command from the robot controller 14. Further, each of the servo motors comprises a rotation position sensor (encoder; not shown), and the rotation position information of each of the servo motors is inputted to the robot controller 14 at each predetermined operation cycle.

Further, an installation member 63 is provided at the end of the arm 24. The installation member 63 comprises a sheet-shaped plate portion 63a, and the suction pad 25 is provided to each of the four corners of the plate portion 63a via a support member 64. Note that the installation member 63, the four support members 64, and the four suction pads 25 link to the tool, and the plate portion 63a of the installation member 63 links to the tool main body.

Each of the support members 64 is a member that supports the suction pad 25 provided to the end side, and comprises a spring member capable of flexibly bending in the surface direction of the plate portion 63a and in the direction orthogonal to that surface direction. Note that each of the support members 64 may comprise a flexible member, such as rubber, in place of the spring member.

Each of the suction pads 25 is established in a vacuum state by a vacuum apparatus (not shown), making it possible for the suction pad 25 to lift the contacted goods 4 by vacuum suction and, with the support member 64 flexibly bending as described above, move in the surface direction of the plate portion 63a and the direction orthogonal to that surface direction.

Further, the laser sensor 26 and the vision sensor 27 are provided to the plate portion 63a of the installation member 63. Note that the laser sensor 26 and the vision sensor 27 link to the sensor apparatus and, of these, the laser sensor 26 links to the first sensor, and the vision sensor 27 links to the second sensor.

The laser sensor 26 irradiates laser light toward the top surface of the goods 4 that is loaded onto the receiving-side cargo 9 on the top-most stack where no other goods 4 are loaded on its top surface (link to the top side), receives the reflected light of that laser light, and scans the top surface of all of the goods 4 of the top-most stack, making it possible to acquire the distance information to each of the top surfaces of the goods 4 of the top-most stack.

Note that a reference mark P in the drawing indicates an identified control point of the robot 11 defined on the end-side of the arm 24.

As shown in FIG. 24, the preliminary loading table 12 is a table for temporarily loading (temporarily loading) the goods 4 and, in the example of this embodiment, is arranged so as to surround the robot 11.

Then, as shown in the FIG. 1, the robot controller 14 controls the operation (details described later) of the robot 11 (the arm 24, the actuators Ac1 to Ac6, the vacuum apparatus, the laser sensor 26, the vision sensor 27, etc.). Note that suitable memory of the robot controller 14 stores the installation information of the arm 24 of the robot 11, the actuator Ac1 to Ac6, the vacuum apparatus, the laser sensor 26, the vision sensor 27, and the like, in advance. Then, the robot controller 14 is configured so that it can acquire the height position information of the suction pad 25 by an inverse kinematics calculation or kinematics calculation based on the rotation position information of the servo motor of each of the actuators Ac1 to Ac6 from the rotation position sensor.

Figure 29A:
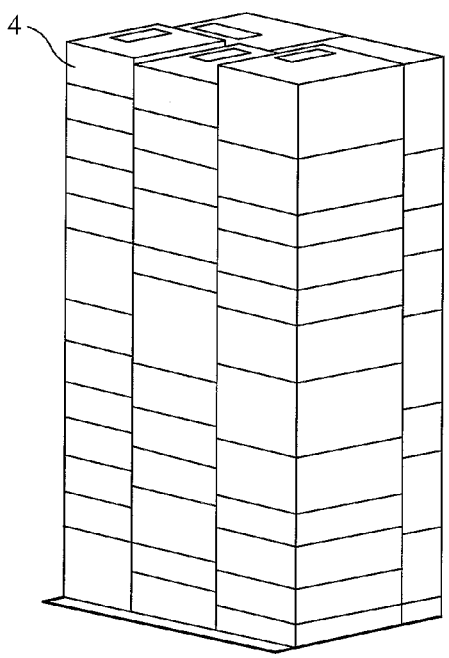
FIG. 29 is a perspective view schematically illustrating examples of stacking patterns stored in the storage device of the PC.
Figure 29B:
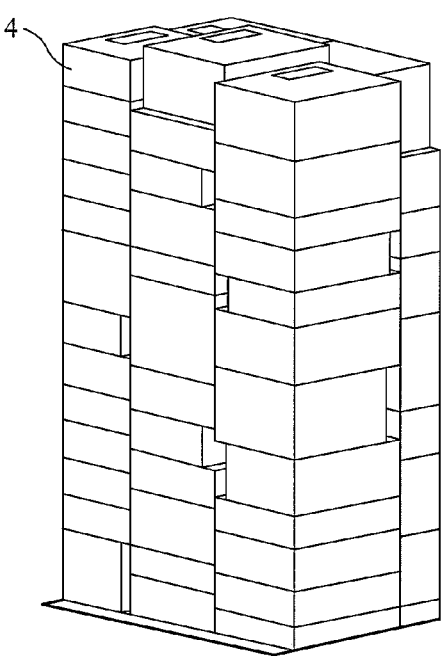

The PC 15 comprises a storage device (not shown) that stores a plurality of types of stacking patterns of the goods 4 to the sending-side cargo 10, similar to the first embodiment. Priority indicators (such as, for example, a plurality of ranks "1," "2," "3," . . . , where the lower value is given a higher priority) are assigned in advance to the plurality of types of stacking patterns stored in the storage device of this PC 15, in accordance with factors such as loading efficiency and loaded state stability. FIGS. 29A and 29B show examples of stacking patterns stored in the storage device of the PC 15. The stacking pattern shown in FIG. 29A is a relatively high priority indicator pattern in which the plurality of goods 4 are stacked substantially without space in between, resulting in a relatively high loading efficiency and loaded state stability. The stacking pattern shown in FIG. 29B is a pattern having a lower priority indicator than the stacking pattern shown in the FIG. 29A; in this pattern, space is somewhat formed between the plurality of loaded goods 4, resulting in a loading efficiency and loaded state stability that are lower than those of the stacking pattern shown in the FIG. 29A.

According to this embodiment, the robot 11 passes the goods 4 lifted by the suction pad 25 through the area of the optical path 62 of the light between the light-emitting portion 60a and the light-receiving portion 60b of the photoelectric sensor 60, via the control of the robot controller 14. As described later, the robot controller 14 is capable of detecting the height direction dimension of the goods 4 that passed through the area of the optical path 62 based on the light reception result of the light-receiving portion 60b of the light emitted from the light-emitting portion 60a, and the area of the optical path 62 links to the area for detecting the height direction dimension of the article. The following describes an example of the operation of the robot 11 based on the control of the robot controller 14, using FIG. 30 to FIG. 40. Note that the depth direction, width direction, and height direction (vertical direction) of the receiving-side cargo 9 are established as the x-axis direction, y-axis direction, and z-axis direction of a three-dimensional rectangular coordinate system, and that the value of the z coordinate increases upward.

According to this embodiment, although not particularly shown, the robot 11 holds in advance a box-shaped article (hereinafter, suitably referred to as "standard article") of a known height direction dimension via the suction pad 25 so that the height position of the bottom surface thereof is higher than the height position of the optical path 62. Then, in this state, the robot 11 operates and lowers the arm 24 so that the standard article held by the suction pad 25 follows substantially along the vertical direction (so that only the value of the z coordinate changes and not the values of the coordinates x and y), passing through the area of the optical path 62. At this time, when the lowered standard article approaches the area of the optical path 62 and the light from the light-emitting portion 60a is blocked by the standard article, the amount of light received by the light-receiving portion 60b decreases to an amount lower than that prior to blocking, decreasing lower than a predetermined threshold value (hereinafter suitably referred to as "first threshold value"; including a case where the light is not received by the light-receiving portion 60b). The position coordinates of the identified control point P at this time are recorded as standard coordinates (hereinafter suitably referred to as "first standard coordinates").

Further, on the other hand, the robot 11 holds the standard article via the suction pad 25 in advance so that the height position of the bottom surface thereof is lower than the height position of the optical path 62. Then, in this state, the robot 11 operates the arm 24, raises the standard article held by the suction pad 25 substantially along the vertical direction, passing the standard article through the area of the optical path 62. At this time, when the raised standard article passes through the optical path 62, the light from the light-emitting portion 60a blocked by the standard article is introduced to the light-receiving portion 60b once again, and the amount of light received by the light-receiving portion 60b, which had decreased below the first threshold value, increases above that when blocked, increasing above a threshold value other than the first threshold value (hereinafter suitably referred to as "the second threshold value"; including cases where the light is no longer received and then once again received by the light-receiving portion 60b). The position coordinates of the identified control point P at this time are recorded as standard coordinates other than the first standard coordinates (hereinafter suitably referred to as "the second standard coordinates").

Figure 30:
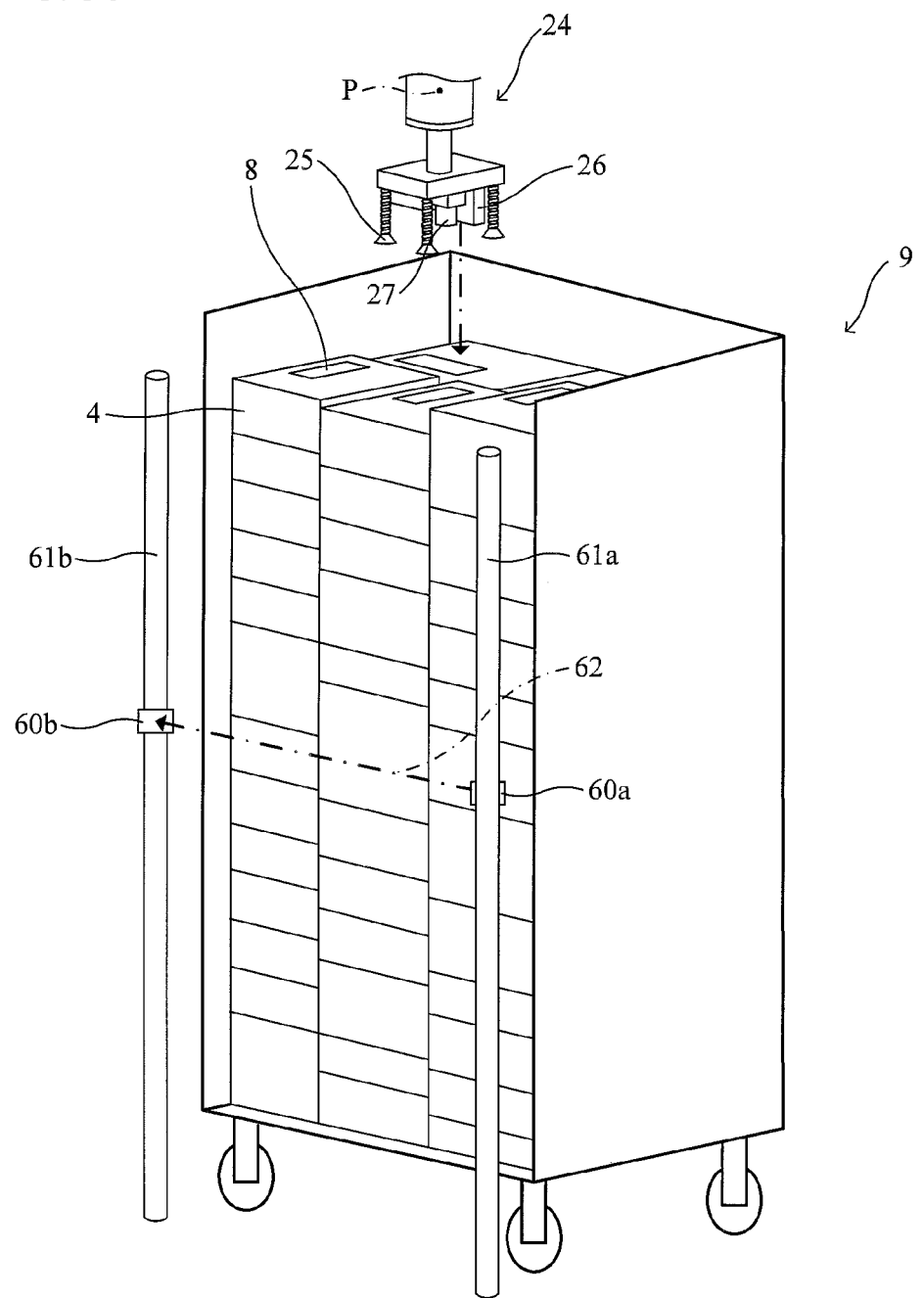
FIG. 30 is an explanatory diagram explaining an example of the operation of the robot.

Then, as shown in FIG. 30, the robot 11 operates the arm 24 and moves the laser sensor 26 above the receiving-side cargo 9. Subsequently, the laser sensor 26 irradiates laser light toward the top surface of the goods 4 of the top-most stack loaded onto the receiving-side cargo 9, receives the reflected light of that laser light, and scans the top surface of all of the goods 4 of the top-most stack, thereby acquiring the distance information to each of the top surfaces of the goods 4 of the top-most stack. The acquisition results of the laser sensor 26, i.e., the distance information to each of the top surfaces of the goods 4 of the top-most stack, are outputted to the robot controller 14. With this arrangement, the goods 4 having a top surface that is in the highest position of the plurality of goods 4 loaded onto the receiving-side cargo 9 is identified. Further, the height position of the top surface of the identified goods 4 thus identified (the value of the z coordinate related to the top surface of the identified goods 4) is detected.

Figure 31:
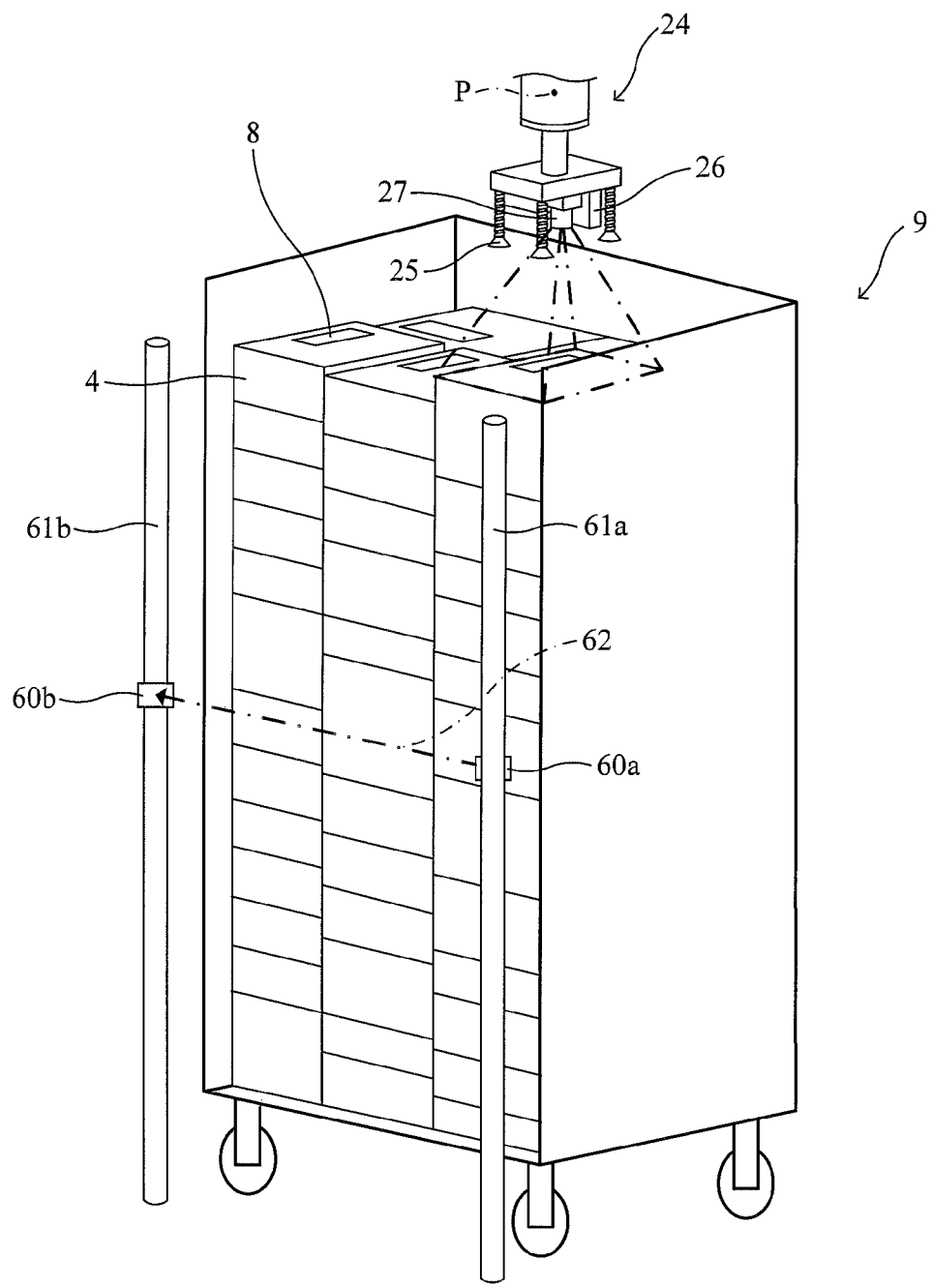
FIG. 31 is an explanatory diagram explaining an example of the operation of the robot.

Then, as shown in FIG. 31, the robot 11 operates the arm 24 and moves the vision sensor 27 above the identified goods 4 thus identified. Subsequently, the vision sensor 27 senses the top surface of the identified goods 4, acquires the outer shape information of the top surface of the identified goods 4, and acquires the delivery destination information from the barcode 8 provided to the top surface of the identified goods 4. The following describes an example of a case where the delivery destination information is successfully acquired from the barcode 8 (the barcode 8 is scanned) by the vision sensor 27 described above. That is, in such a case, the acquisition results of the vision sensor 27, i.e., the outer shape information of the top surface of the identified goods 4 and the delivery destination information of the identified goods 4, are outputted to the robot controller 14. With this arrangement, the shape and size (the length direction dimension and width direction dimension) of the top surface of the identified goods 4 are calculated, and the identified delivery destination area corresponding to the identified goods 4 is determined.

Figure 32:
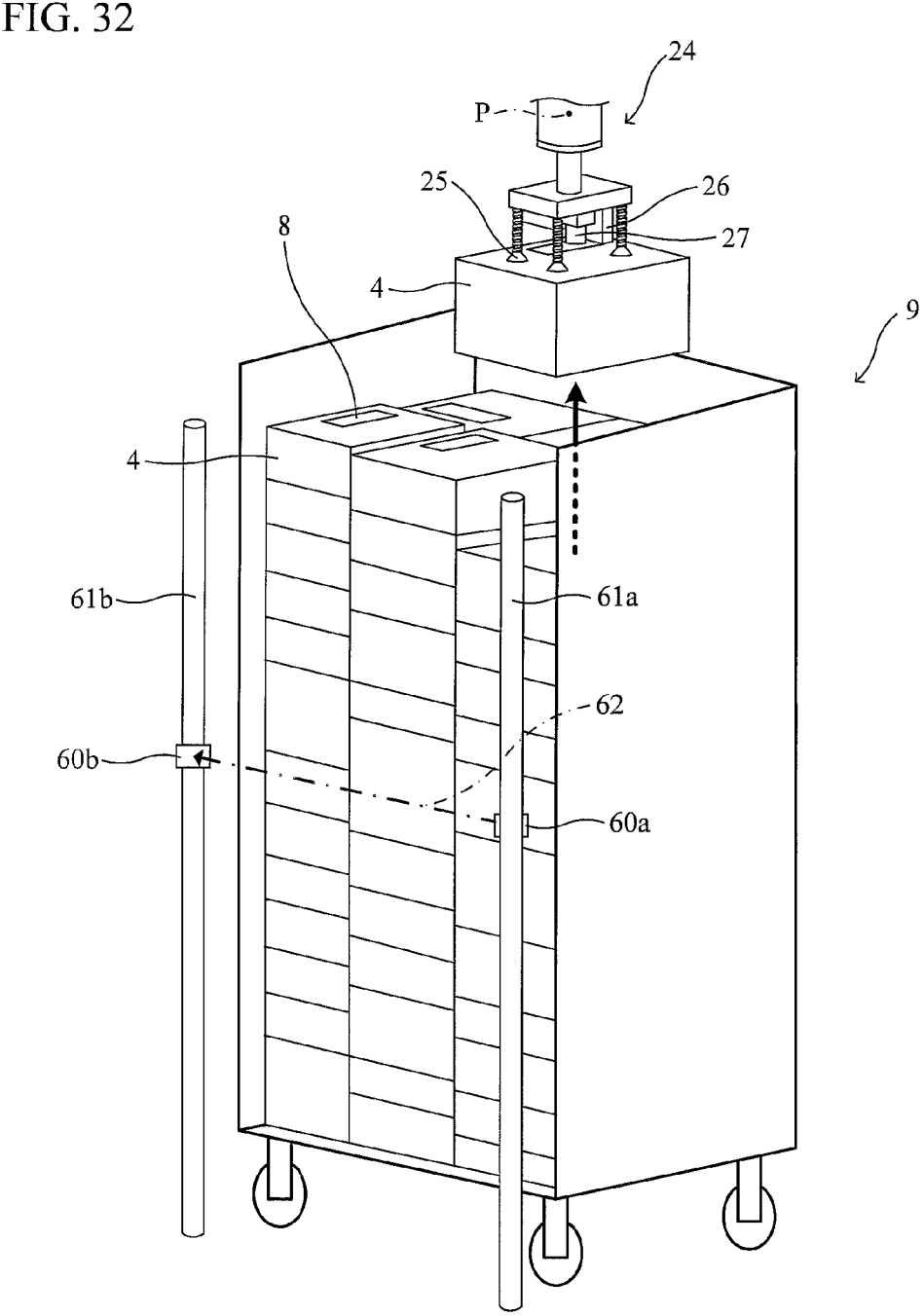
FIG. 32 is an explanatory diagram explaining an example of the operation of the robot.
Figure 33A:
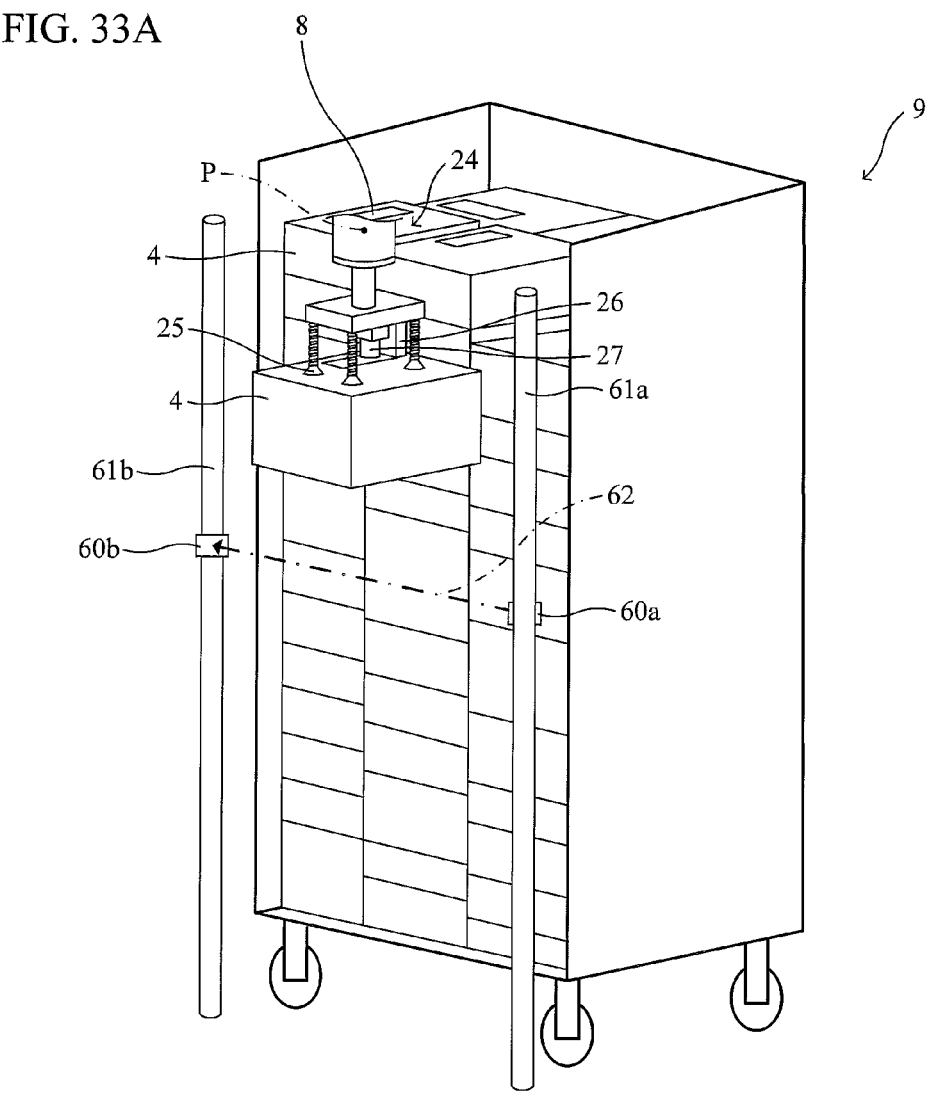
FIG. 33 is an explanatory diagram explaining an example of the operation of the robot.
Figure 33B:
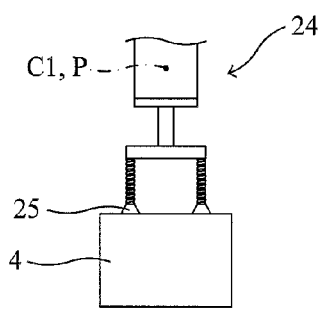
Figure 33B:
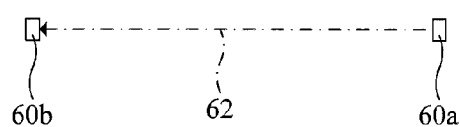

Then, as shown in FIG. 32, the robot 11 operates the arm 24, moves the suction pad 25 to the lifting location determined based on the calculated shape and size of the top surface of the identified goods 4, and lifts the identified goods 4 by the suction pad 25. The following describes an example wherein, as shown in FIG. 32, in a case where the lifted identified goods 4 are loaded to a position higher than the height position (link to the predetermined height position) of the optical path 62 on the receiving-side cargo 9, the detected height position of the top surface of the identified goods 4 is higher than the height position of the optical path 62 (the detected value of the z coordinate related to the top surface of the identified goods 4 is larger than the value of the z coordinate related to the optical path 62). That is, in such a case, the robot 11 operates the arm 24 and, as shown in FIGS. 33A and 33B, the identified control point P is positioned at the position coordinates C1 (first position coordinates). The position coordinates C1 are coordinates of a position higher than the height position of the optical path 62; specifically, coordinates whereby the height position of the bottom surface of the goods 4 is determined to be at a height higher than the height position of the optical path 62, even in a case where the identified goods 4 held by the suction pad 25 have the highest estimated height direction dimension.

Figure 34A:
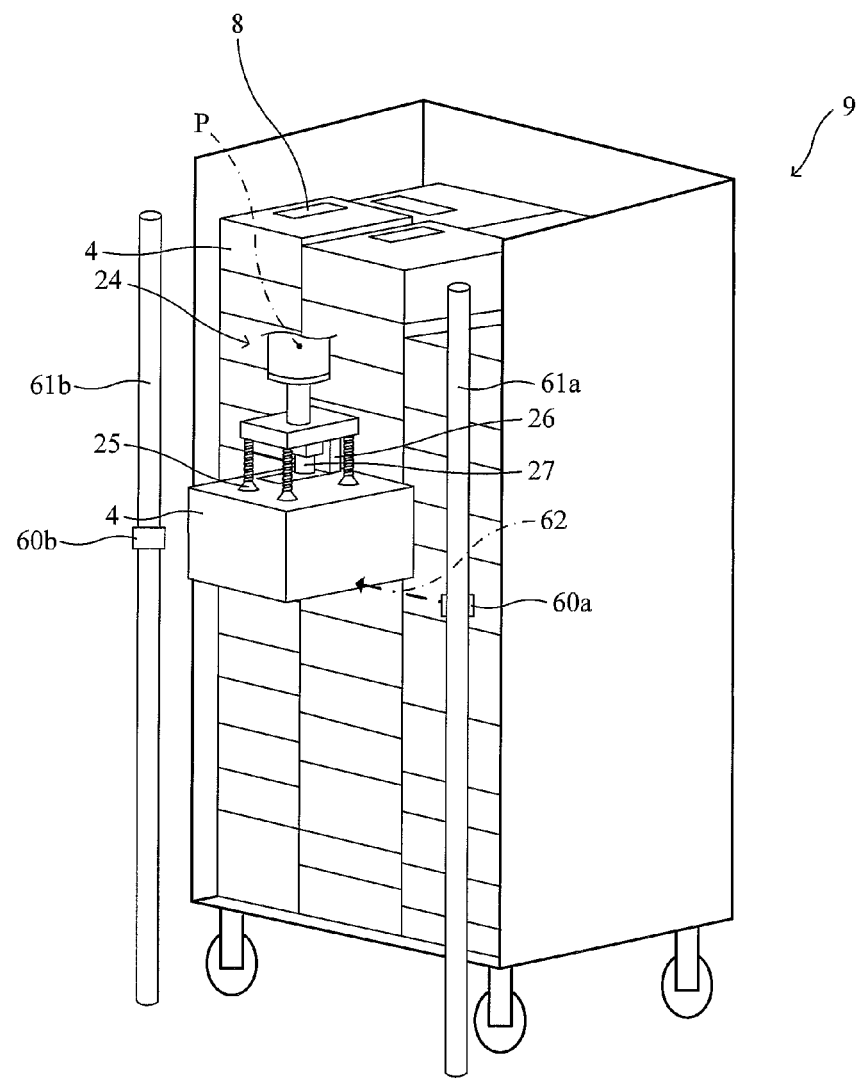
FIG. 34 is an explanatory diagram explaining an example of the operation of the robot.
Figure 34B:
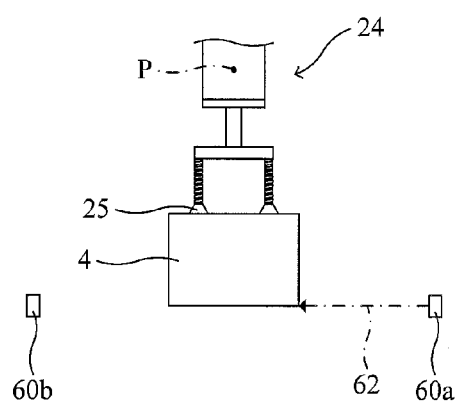
Figure 35A:
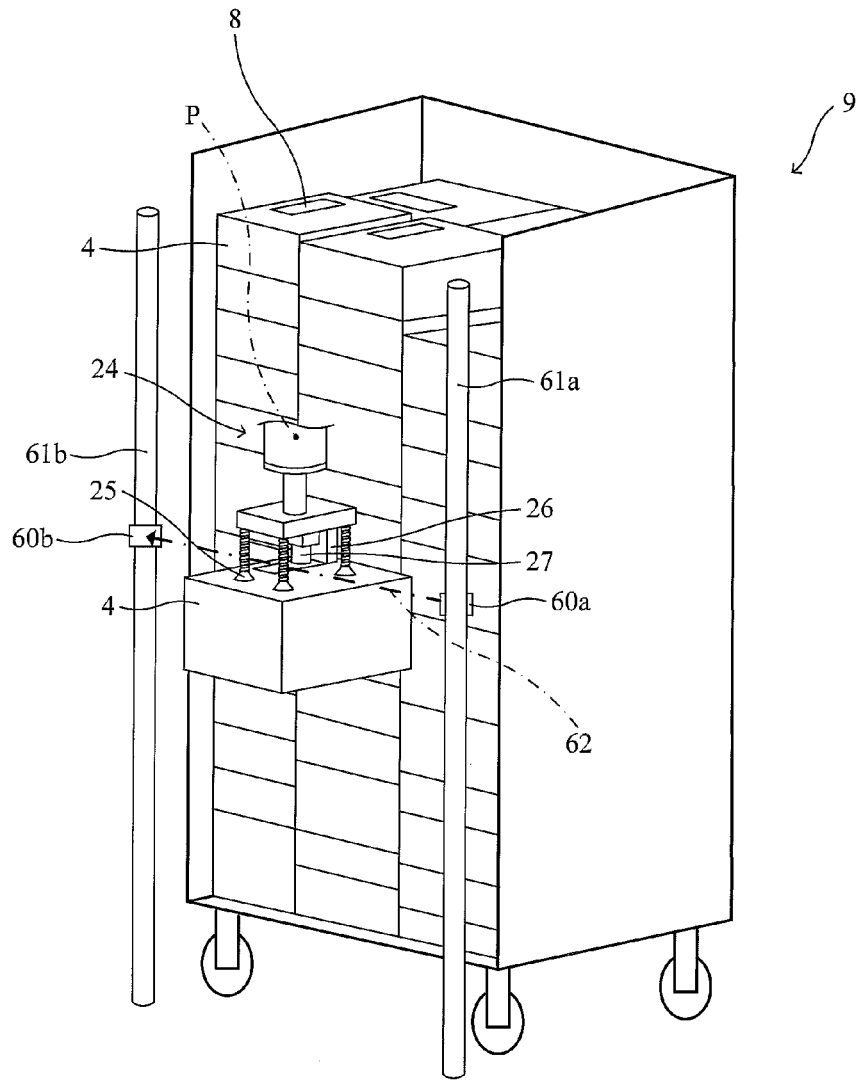
FIG. 35 is an explanatory diagram explaining an example of the operation of the robot.
Figure 35B:
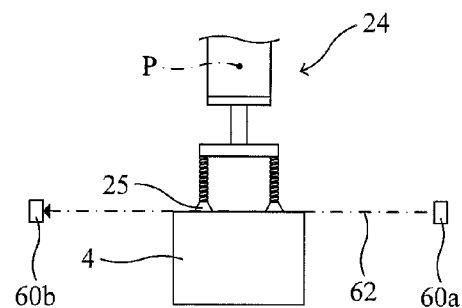

Subsequently, the robot 11 operates the arm 24 and, as shown in FIGS. 34A, 34B, 35A, and 35B, the identified goods 4 held by the suction pad 25 are lowered substantially along the vertical direction and made to pass through the area of the optical path 62. FIGS. 34A and 34B show a state wherein the identified goods 4 to be lowered approach the area of the optical path 62. In this state, the light from the light-emitting portion 60a is blocked by the identified box 4, causing the amount of light received by the light-receiving portion 60b to decrease further than that prior to being blocked, decreasing below the first threshold value. FIGS. 35A and 35B show a state wherein the identified goods 4 to be lowered have passed through the area of the optical path 62. In this state, the light from the light-emitting portion 60a that was blocked by the identified box 4 is once again introduced to the light-receiving portion 60b, causing the amount of light received by the light-receiving portion 60b, which had decreased below the first threshold value, to increase further than that when blocked, increasing above the second threshold value.

At this time, based on the light reception result of the light-receiving portion 60b of the light from the light-emitting portion 60a when the robot 11 lowers the identified goods 4 as described above (including the existence or non-existence of light reception by the light-receiving portion 60b from the light-emitting portion 60a), the position coordinates (hereinafter suitably referred to as "the first identified position coordinates") of the identified control point P when the amount of light reception by the light-receiving portion 60b decreases further than the first threshold value are detected. Then, the difference between the value of the z coordinate of the detected first identified position coordinates and the value of the z coordinate of the first standard coordinates recorded in advance is calculated. Here, since the amount of movement required to approach the area of the optical path 62 decreases as the height direction dimension of the identified goods 4 increases, the value of the z coordinate of the first identified position coordinates increases as the height direction dimension of the identified goods 4 increases. Then, the difference between the value of the z coordinate of the first identified position coordinates and the value of the z coordinate of the first standard coordinates is proportional to the size of the height direction dimension of the identified goods 4 that pass through the area of the optical path 62. Based on this, according to this embodiment, the height direction dimension of the identified goods 4 that passed through the area of the optical path 62 is detected based on the difference between the value of the z coordinate of the first identified position coordinates and the value of the z coordinate of the first standard coordinates calculated above.

For example, given that the z coordinate is set so that the value increases by one every 1 mm, a height direction dimension of the standard article of 100 mm, and a value of the z coordinate of the first standard coordinates of 700, in a case where the value of the z coordinate of the first identified position coordinates is detected as 800, the difference is calculated as 100, and thus the height direction dimension of the identified goods 4 is detected as 200 mm. Further, in a case where the value of the z coordinate of the first identified position coordinates is detected as 900, the difference is calculated as 200, and thus the height direction dimension of the identified goods 4 is detected as 300 mm.

Figure 36:
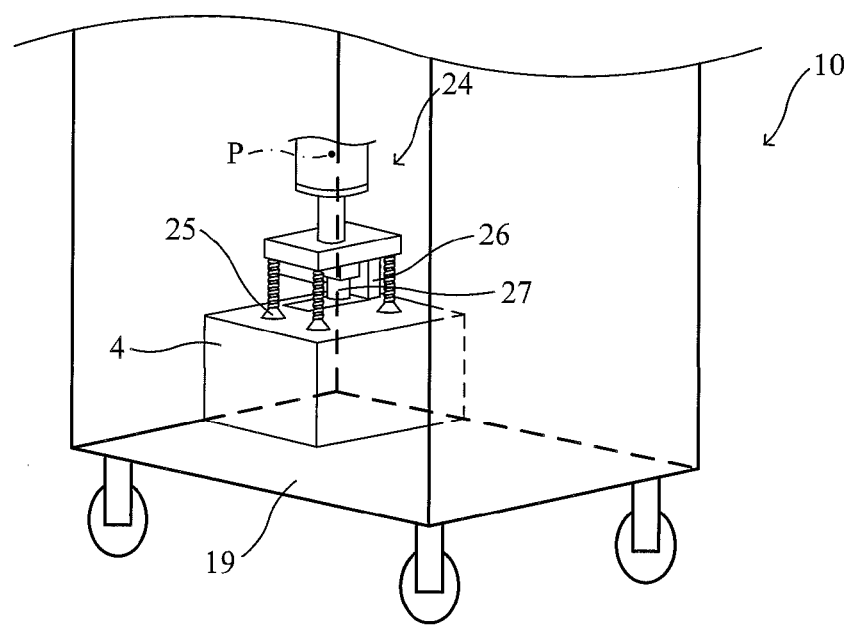
FIG. 36 is an explanatory diagram explaining an example of the operation of the robot.

Subsequently, based on the calculated shape and size of the top surface of the identified goods 4, and the detected height direction dimension of the identified goods 4, the stacking location of the identified goods 4 to the identified sending-side cargo 10 corresponding to the identified delivery destination area is determined. Then, the robot 11 operates the arm 24 and stacks the identified goods 4 that had passed through the area of the optical path 62 to the determined stacking location of the identified sending-side cargo 10 as shown in FIG. 36, resulting in the sorted goods 4.

Note that, as described above, the height direction dimension can be detected at the moment when the state shown in the FIGS. 34A and 34B (the state in which the lowest portion of the identified goods 4 passed through the area of the optical path 62) is achieved, allowing the identified goods 4 to be stacked onto the stacking location once this state is reached, without completely achieving the state shown in the FIGS. 35A and 35B (the state in which the entire identified goods 4 have passed through the area of the optical path 62).

Figure 37:
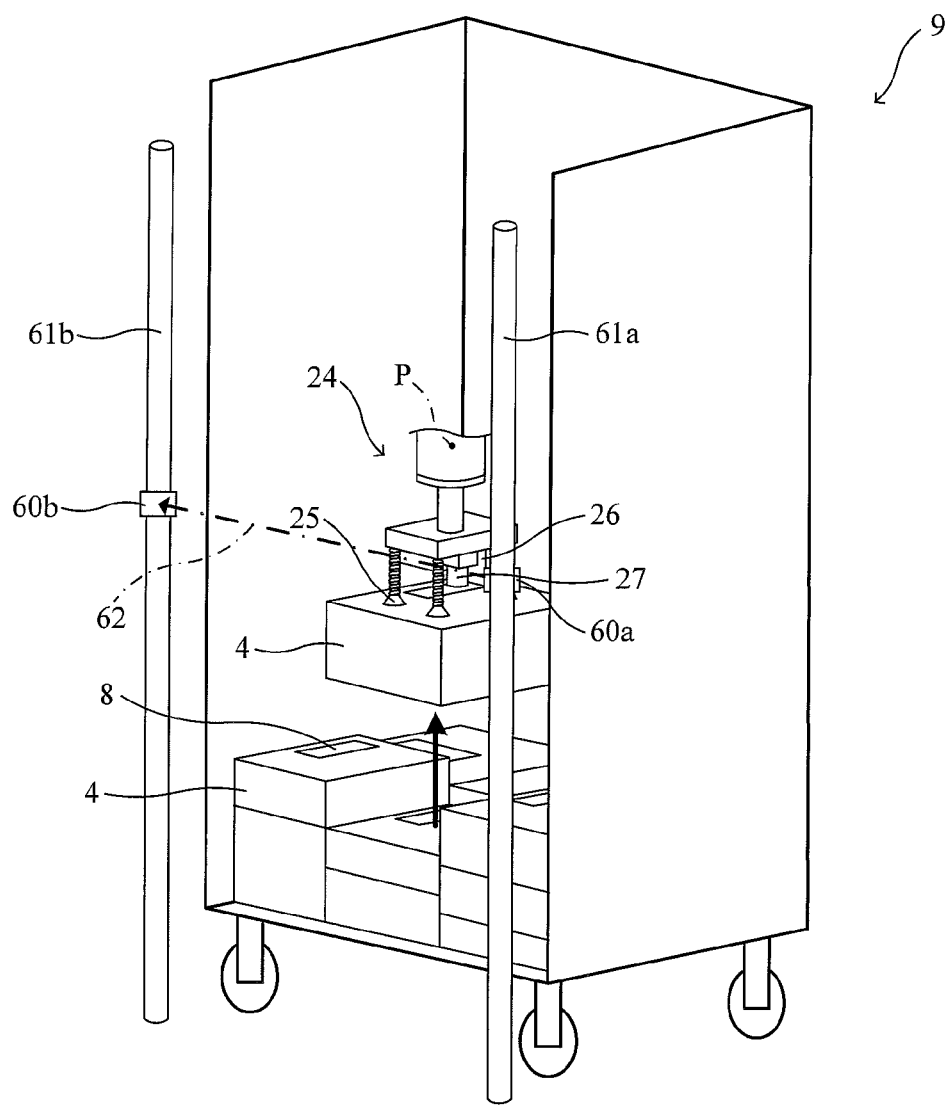
FIG. 37 is an explanatory diagram explaining an example of the operation of the robot.
Figure 38A:
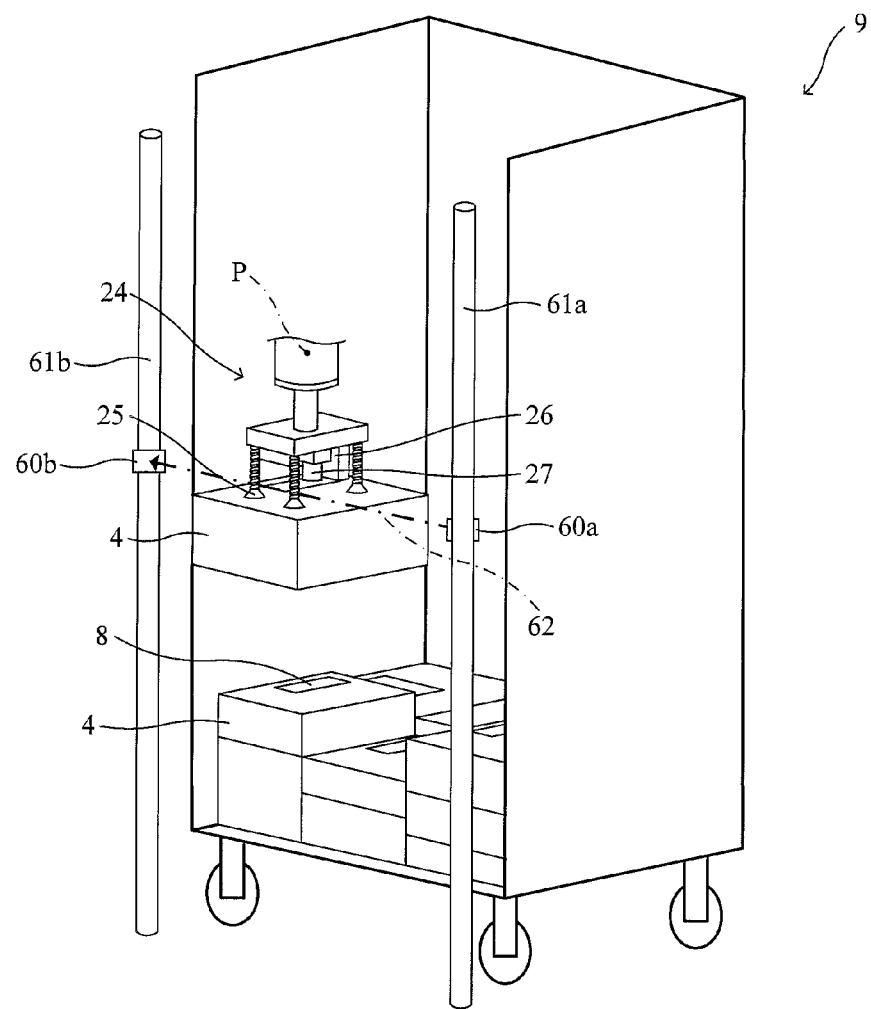
FIG. 38 is an explanatory diagram explaining an example of the operation of the robot.
Figure 38B:
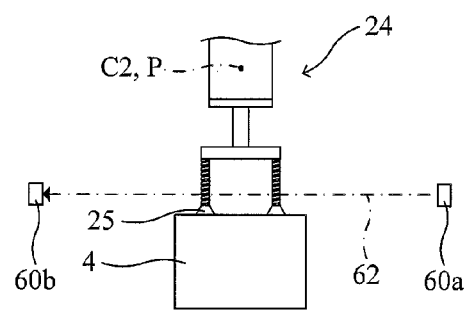

Next, the following describes an example wherein, as shown in FIG. 37, in a case where the identified goods 4 lifted by the robot 11 via the arm 24 are loaded to a position lower than the height position of the optical path 62 on the receiving-side cargo 9, the detected height position of the top surface of the identified goods 4 is lower than the height position of the optical path 62 (the detected value of the z coordinate related to the top surface of the identified goods 4 is smaller than the value of the z coordinate related to the optical path 62). That is, in such a case, the robot 11 operates the arm 24 and, as shown in FIGS. 38A and 38B, the identified control point P is positioned at position coordinates C2 (second position coordinates). The position coordinates C2 are coordinates of a position lower than the height position of the optical path 62; specifically, coordinates whereby the height position of the bottom surface of the goods 4 is determined to be at a height lower than the height position of the optical path 62, even in a case where the identified goods 4 held by the suction pad 25 have the smallest estimated height direction dimension.

Figure 39A:
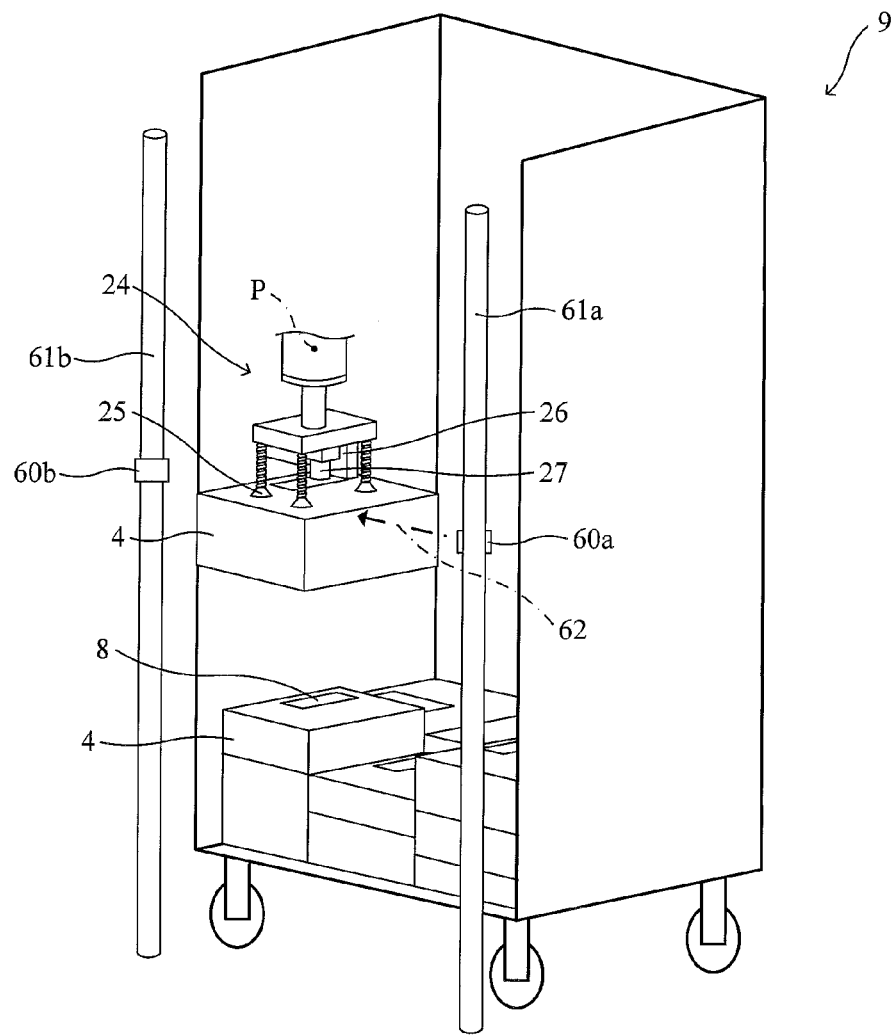
FIG. 39 is an explanatory diagram explaining an example of the operation of the robot.
Figure 39B:
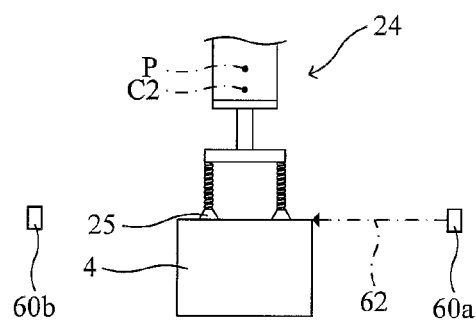
Figure 40A:
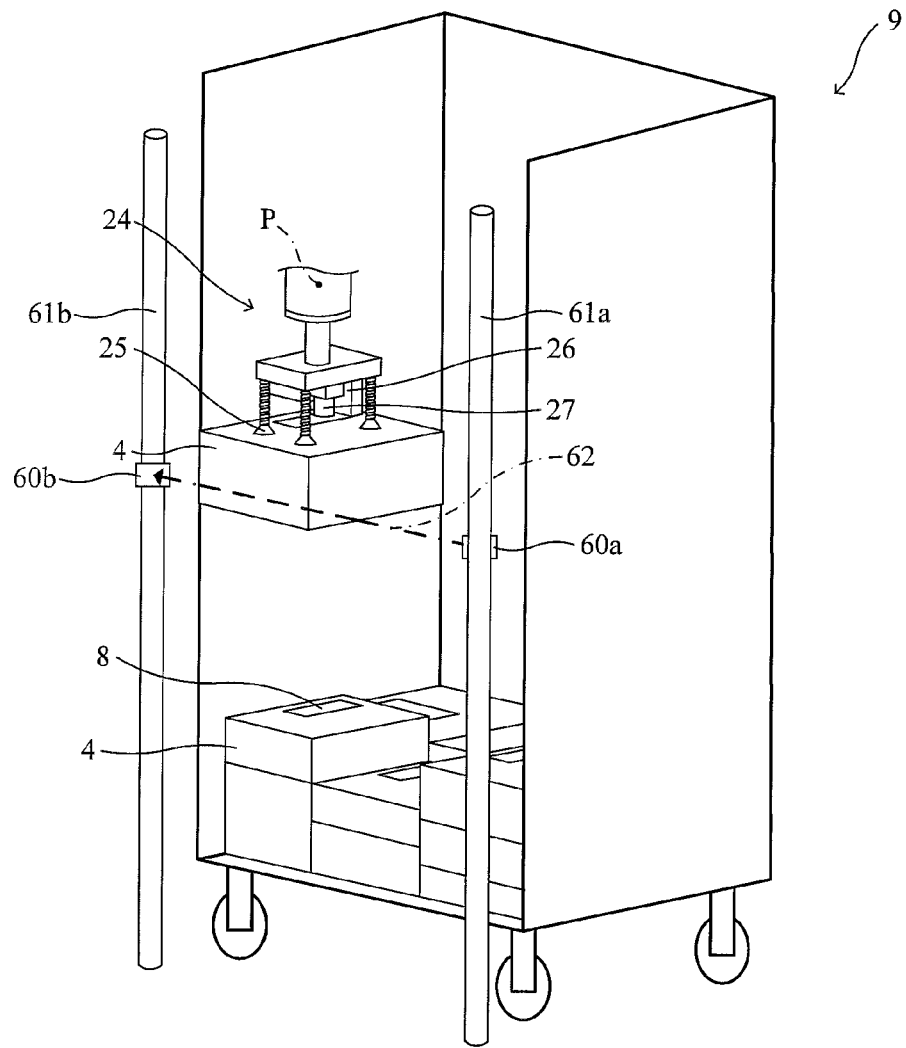
FIG. 40 is an explanatory diagram explaining an example of the operation of the robot.
Figure 40B:
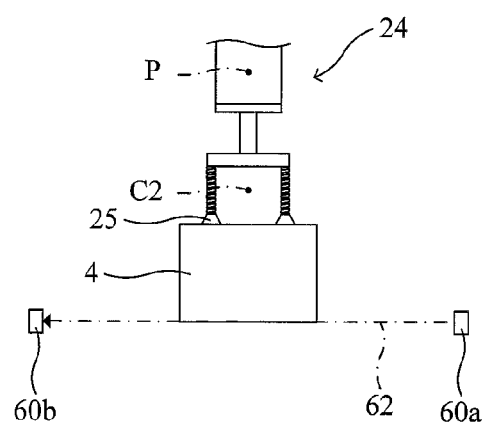

Subsequently, the robot 11 operates the arm 24 and, as shown in FIGS. 39A, 39B, 40A, and 40B, the identified goods 4 held by the suction pad 25 are raised substantially along the vertical direction and made to pass through the area of the optical path 62. FIGS. 39A and 39B show a state wherein the identified goods 4 to be raised approach the area of the optical path 62. In this state, the light from the light-emitting portion 60a is blocked by the identified box 4, causing the amount of light received by the light-receiving portion 60b to decrease further than that prior to being blocked, decreasing below the first threshold value. FIGS. 40A and 40B show a state wherein the identified goods 4 to be raised have passed through the area of the optical path 62. In this state, the light from the light-emitting portion 60a that was blocked by the identified box 4 is once again introduced to the light-receiving portion 60b, causing the amount of light received by the light-receiving portion 60b, which had decreased below the first threshold value, to increase further than that when blocked, increasing above the second threshold value.

At this time, based on the light reception result of the light-receiving portion 60b of the light from the light-emitting portion 60a when the robot 11 raises the identified goods 4 as described above (including the existence or non-existence of light reception by the light-receiving portion 60b of the light from the light-emitting portion 60a), the position coordinates (hereinafter suitably referred to as "the second identified position coordinates") of the identified control point P when the amount of light reception by the light-receiving portion 60b, which had decreased further than the first threshold value, increases further than the second threshold value are detected. Then, the difference between the value of the z coordinate of the detected second identified position coordinates and the value of the z coordinate of the second standard coordinates recorded in advance is calculated. Here, since the amount of movement required to pass through the area of the optical path 62 decreases as the height direction dimension of the identified goods 4 decreases, the value of the z coordinate of the second identified position coordinates decreases as the height direction dimension of the identified goods 4 decreases. Then, the difference between the value of the z coordinate of the second identified position coordinates and the value of the z coordinate of the second standard coordinates is proportional to the size of the height direction dimension of the identified goods 4 that pass through the area of the optical path 62. Based on this, according to this embodiment, the height direction dimension of the identified goods 4 that passed through the area of the optical path 62 is detected based on the difference between the value of the z coordinate of the second identified position coordinates and the value of the z coordinate of the second standard coordinates calculated above.

For example, given that the z coordinate is set so that the value increases by one every 1 mm, a height direction dimension of the standard article of 100 mm, and a value of the z coordinate of the second standard coordinates of 700, in a case where the value of the z coordinate of the second identified position coordinates is detected as 600, the difference is calculated as 100, and thus the height direction dimension of the identified goods 4 is detected as 200 mm. Further, in a case where the value of the z coordinate of the second identified position coordinates is detected as 500, the difference is calculated as 200, and thus the height direction dimension of the identified goods 4 is detected as 300 mm.

Subsequently, similar to the above, the stacking location of the identified goods 4 in the identified sending-side cargo 10 is determined, and the robot 11 stacks the identified goods 4 that passed through the area of the optical path 62 to the determined stacking location of the identified sending-side cargo 10, resulting in the sorted goods 4.

Such a procedure is repeatedly executed, sorting the plurality of the goods 4 loaded onto the receiving-side cargo 9 into the areas "Area A" to "Area F" corresponding to these delivery destination areas, and transferring the result to the sending-side cargos 10A to 10F, resulting in the sorted goods 4 of each of the areas "Area A" to "Area F."

Figure 41:
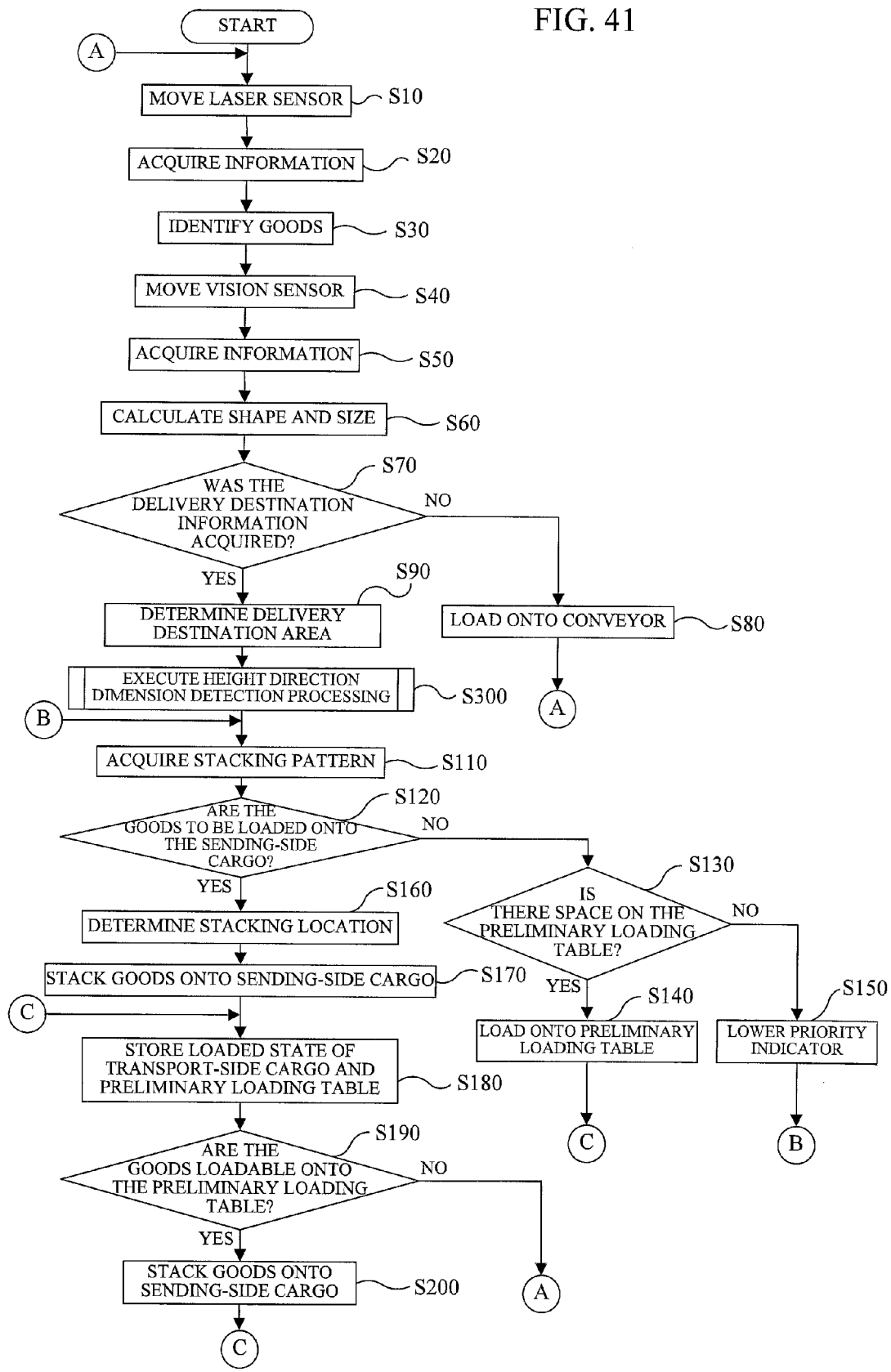
FIG. 41 is a flowchart showing an example of the control details executed by the robot controller.

The following describes an example of the control details of the manufacturing method of the sorted goods 4 executed by the robot controller 14 based on the control of the PLC 16 of the embodiment, using FIG. 41. Descriptions of the components that are the same as those in FIG. 12 of the first embodiment will be omitted or simplified.

In FIG. 41, the process shown in the flow is started, for example, by a predetermined start operation (power ON by the robot controller 14, for example). Steps S10 to S90 are the same as those in the FIG. 12. However, in step S30, the robot controller 14 identifies which of the plurality of goods 4 loaded onto the receiving-side cargo 9 is the goods 4 having a top surface that exists in the highest position, based on the distance information to each of the top surfaces of the goods 4 of the top-most stack acquired via the step S20. Further, the height position of the top surface of the identified goods 4 thus identified (the value of the z coordinate related to the top surface of the identified goods 4) is detected.

Then, after the step S90, the flow proceeds to step S300.

In step S300, the robot controller 14 executes a height direction dimension detection process for detecting the height direction dimension of the identified goods 4. The following describes an example of the detailed contents of the step S300 using FIG. 42.

Figure 42:
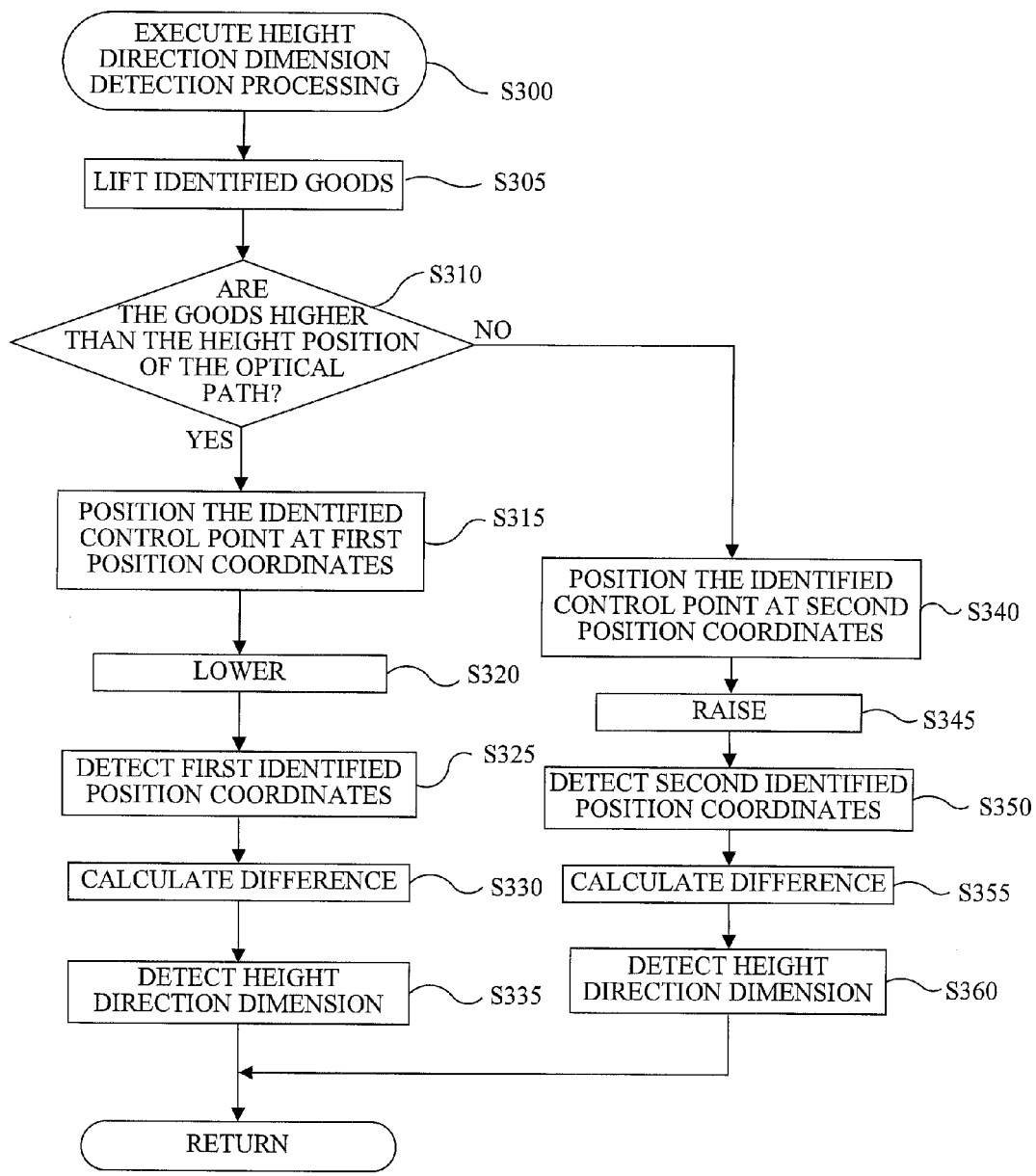
FIG. 42 is a flowchart showing an example of the detailed contents of step S300.

As shown in FIG. 42, the robot controller 14, in step S305, outputs a control signal to the robot 11, causing the robot 11 to operate the arm 24 so that the suction pad 25 moves to the lifting position determined based on the shape and size of the top surface of the identified goods 4 calculated in the step S60, and the identified goods 4 are lifted by the suction pad 25.

Subsequently, in step S310, the robot controller 14 determines whether or not the height position of the top surface of the identified goods 4 detected in the step S30 is higher than the height position of the optical path 62. In a case where the height position of the top surface of the identified goods 4 detected in the step S30 is higher than the height position of the optical path 62, the decision is made that the condition of step S310 is satisfied, and the flow proceeds to step S315.

In step S315, the robot controller 14 outputs a control signal to the robot 11, causing the arm 24 to be operated so that the identified control point P is positioned at the position coordinates C1.

Then, the flow proceeds to step S320 where the robot controller 14 outputs a control signal to the robot 11, operating the arm 24 so that the identified goods 4 lifted by the suction pad 25 lower substantially along the vertical direction and pass through the area of the optical path 62.

Subsequently, in step S325, the robot controller 14 acquires the light reception result of the light-receiving portion 60b of the light from the light-emitting portion 60a of the photoelectric sensor 60 when the identified goods 4 are lowered in the step S320. Then, the first identified position coordinates are detected based on the acquired light reception result of the light-receiving portion 60b.

Then, the flow proceeds to step S330 where the robot controller 14 calculates the difference between the value of the z coordinate of the first identified position coordinates detected in the step S325, and the value of the z coordinate of the first standard coordinates recorded in advance.

Subsequently, in step S335, the robot controller 14 detects the height direction dimension of the identified goods 4 that was lowered to ensure a pass through the area of the optical path 62 in the step S320, based on the difference between the value of the z coordinate of the first identified position coordinates and the value of the z coordinate of the first standard coordinates calculated in the step S330. Subsequently, the process shown in this flow ends.

On the other hand, in a case where the height position of the top surface of the identified goods 4 detected in the step S30 is lower than the height position of the optical path 62 in the step S310, the decision is made that the condition of step S310 is not satisfied, and the flow proceeds to step S340. Note that, in a case where the height position of the top surface of the identified goods 4 detected in the step S30 matches the height position of the optical path 62, the decision that the condition of step S310 is satisfied may be made, causing the flow to proceed to step S315, or the decision that the condition of step S310 is not satisfied may be made, causing the flow to proceed to step S340.

In step S340, the robot controller 14 outputs a control signal to the robot 11, causing the arm 24 to operate so that the identified control point P is positioned at the position coordinates C2.

Then, the flow proceeds to step S345 where the robot controller 14 outputs a control signal to the robot 11, operating the arm 24 so that the identified goods 4 lifted by the suction pad 25 are raised substantially along the vertical direction and passes through the area of the optical path 62.

Subsequently, in step S350, the robot controller 14 acquires the light reception result of the light-receiving portion 60b of the light from the light-emitting portion 60a of the photoelectric sensor 60 when the identified goods 4 are raised in the step S345. Then, the second identified position coordinates are detected based on the acquired light reception result of the light-receiving portion 60b.

Then, the flow proceeds to step S355 where the robot controller 14 calculates the difference between the value of the z coordinate of the second identified position coordinates detected in the step S350, and the value of the z coordinate of the second standard coordinates recorded in advance.

Subsequently, in step S360, the robot controller 14 detects the height direction dimension of the identified goods 4 that were raised to ensure a pass through the area of the optical path 62 in the step S345, based on the difference between the value of the z coordinate of the second identified position coordinates and the value of the z coordinate of the second standard coordinates calculated in the step S355. With this arrangement, the process shown in this flow ends.

Once step S300 shown in FIG. 42 ends, the flow proceeds to the same step S110 as in the FIG. 12, as shown in FIG. 41. In step S120 following step S110, the robot controller 14 determines whether or not the identified goods 4 are to be loaded onto the identified sending-side cargo 10 at that moment, based on the shape and size of the top surface of the identified goods 4 calculated in the step S60, the height direction dimension of the identified goods 4 detected in the step S335 or step S360, the loaded state of the goods 4 on the identified sending-side cargo 10 stored in step S180 described later, and the stacking pattern acquired in the step S110. In a case where the loading efficiency and loaded state stability of the identified sending-side cargo 10 will deteriorate if the identified goods 4 are loaded onto the identified sending-side cargo 10 at that moment, the robot controller 14 deems that the identified goods 4 will not be loaded onto the identified sending-side cargo 10 and that the condition of step S120 is not satisfied, and the flow proceeds to step S130.

In step S130, the robot controller 14 determines whether or not space for loading the identified goods 4 exists on the preliminary loading table 12, based on the shape and size of the top surface of the identified goods 4 calculated in the step S60, the height direction dimension of the identified goods 4 detected in the step S335 or S360, and the loaded state of the goods 4 on the preliminary loading table 12 stored in step S180 described later. If space for loading the identified goods 4 exists on the preliminary loading table 12, the robot controller 14 determines that the condition of step S130 is satisfied, and the flow proceeds to step S140.

In step S140, the robot controller 14 outputs a control signal to the robot 11, operating the arm 24 so that the identified goods 4 held by the suction pad 25 are loaded onto the preliminary loading table 12. Subsequently, the flow proceeds to step S180 described later.

On the other hand, in the step S130, if space for loading the identified goods 4 does not exist on the preliminary loading table 12, the robot controller 14 determines that the condition of S130 is not satisfied, and the flow proceeds to step S150. In step S150, similar to that in the FIG. 12, the robot controller 14 sets the priority indicator of the stacking pattern to be selected in relation to the identified sending-side cargo 10 in the step S110 so that it is one lower than that of the present moment. Subsequently, the flow returns to the step S110 and the same procedure is repeated.

On the other hand, in the step S120, in a case where the loading efficiency and loaded state stability of the identified sending-side cargo 10 will not deteriorate if the identified goods 4 are loaded onto the identified sending-side cargo 10 at that moment, similar to the FIG. 12, the robot controller 14 deems that the identified goods 4 will be loaded onto the identified sending-side cargo 10 and that the condition of step S120 is satisfied, and the flow proceeds to step S160.

In step S160, the robot controller 14 determines the stacking location of the identified goods 4 in the identified sending-side cargo 10, based on the shape and size of the top surface of the identified goods 4 calculated in the step S60, the height direction dimension of the identified goods 4 detected in the step S335 or step S360, the loaded state of the goods 4 on the identified sending-side cargo 10 stored in step S180 described later, and the stacking pattern acquired in the step S110.

Subsequently, in step S170, the robot controller 14 outputs a control signal to the robot 11, operating the arm 24 so that the identified goods 4 held by the suction pad 25 are stacked onto the stacking location of the identified sending-side cargo 10 determined in the step S160.

The subsequent steps S180 to S200 are the same as those in the FIG. 12, and descriptions thereof will be omitted.

Note that the process shown in this flow ends when a predetermined end operation (power OFF of the robot controller 14, for example) is performed. The process shown in this flow is executed, thereby sorting the plurality of the goods 4 loaded onto the receiving-side cargo 9 into the areas "Area A" to "Area F" corresponding to these delivery destination areas, and transferring the same to the sending-side cargos 10A to 10F, resulting in the sorted goods 4 of each of the areas "Area A" to "Area F."

In the process shown in the flow of FIG. 41 and FIG. 42 described above, the procedures of step S320 and step S345 link to the passing step.

As described above, in the robot system 1 of this embodiment, the robot 11 lifts the goods 4 loaded onto the receiving-side cargo 9 via the suction pad 25 and sorts the goods 4 by transporting and stacking the goods 4 to the sending-side cargo 10 corresponding to the delivery destination area based on the control of the robot controller 14, resulting in the sorted goods 4 of the delivery destination area. At this time, the robot 11 passes the goods 4 lifted by the suction pad 25 through the area for detecting the height direction dimension of the goods 4 (in particular, according to this embodiment, the area of the optical path 62 of the light between the light-emitting portion 60a and the light-receiving portion 60b of the photoelectric sensor 60). With this arrangement, the height direction dimension of the goods 4 that passed through the area of the optical path 62 can be detected based on the light reception result of the light-receiving portion 60b of the light from the light-emitting portion 60a. As a result, by simply sensing the goods 4 from the top surface thereof via the vision sensor 27 and acquiring the outer shape information of the top surface of that goods 4, it is possible to detect the three-dimensional shape of the goods 4 based on the shape and size of the top surface of the goods 4, which is based on the acquired outer shape information, as well as the detected height direction dimension of the goods 4.

Accordingly, in a case where the goods 4 are sorted, the configuration can be simplified in comparison to a case where the goods 4 are sensed by a suitable sensor provided to a plurality of locations around the receiving-side cargo 9 to detect the three-dimensional shape of the goods 4. Further, it is possible shorten the processing time as well as reduce the cost of the equipment compared to a case where the goods 4 are sensed by a three-dimensional sensor provided around the receiving-side cargo 9 to detect the three-dimensional shape of the goods 4. Furthermore, according to this embodiment, in a case where the goods 4 are sorted, the height direction dimension of the goods 4 can be detected when the robot 11 transports the goods 4, making it possible to perform the operation at a different stage than the transport operation of the goods 4, such as prior to the transportation of the goods 4, for example, detect the height direction dimension of the goods 4, by the robot 11, thereby shortening the tact time of the sorting of the goods 4 compared to a case where the transport operation of the goods 4 is performed afterwards. As described above, according to this embodiment, the sorting of the goods 4 can be performed based on a quick and simple configuration.

Further, in particular, according to this embodiment, the light-emitting portion 60a and the light-receiving portion 60b of the photoelectric sensor 60 are installed to the support poles 61a and 61b provided near the receiving-side cargo arrangement area 22. With this arrangement, the number of provided photoelectric sensors 60 is small compared to a case where the photoelectric sensor 60 is provided to each of the plurality of receiving-side cargos 9, making it possible to suppress equipment costs. Further, while in a case where the photoelectric sensor 60 is provided to the receiving-side cargo 9, the relative distance between the robot 11 and the area of the optical path 62 varies according to the shift in the receiving-side cargo 9, resulting in a possible decrease in detection accuracy, the relative distance according to this embodiment is constant even if there is a shift in the receiving-side cargo 9, thereby achieving an increase in detection accuracy.

Further, in particular, according to this embodiment, the light-emitting portion 60a and the light-receiving portion 60b of the photoelectric sensor 60 are arranged so that the optical path 62 of the light that travels between the two is at a height position located at the substantial center of the height position of the goods 4 loaded at the highest position of the receiving-side cargo 9 and the height position of the goods 4 loaded at the lowest position of the receiving-side cargo 9. With this arrangement, compared to a case where the light-emitting portion 60a and the light-receiving portion 60b of the photoelectric sensor 60 are arranged so that the optical path 62 of the light that travels between the two is at a height position of the upper or lower side of the receiving-side cargo 9, the amount of distance that the plurality of goods 4 loaded onto the receiving-side cargo 9 needs to be moved to the area of the optical path 62 is decreased, in general, thereby shortening the time required for moving the goods 4. As a result, the tact time of the sorting of the goods 4 can be shortened.

Further, in particular, according to this embodiment, in a case where the goods 4 loaded at a position higher than the height position of the optical path 62 in the receiving-side cargo 9 is lifted, the robot 11 is operated based on the control of the robot controller 14 so that the identified control point P is positioned at the position coordinates C1 and, subsequently, the goods 4 held by the suction pad 25 are lowered and moved on the movement path so as to pass through the area of the optical path 62. On the other hand, in a case where the goods 4 loaded at a position lower than the height position of the optical path 62 in the receiving-side cargo 9 are lifted, the robot 11 is operated based on the control of the robot controller 14 so that the identified control point P is positioned at the position coordinates C2 and, subsequently, the goods 4 held by the suction pad 25 are raised and moved on the movement path so as to pass through the area of the optical path 62. Thus, the movement path of the goods 4 differs in accordance with the height position of the goods 4 that is loaded onto the receiving-side cargo 9 and subject to height direction dimension detection, thereby shortening the time required for moving the goods 4. As a result, the tact time of the sorting of the goods 4 can be shortened.

Further, in particular, according to this embodiment, in a case where the height position of the top surface of the identified goods 4 detected as described above is higher than the height position of the optical path 62, the robot controller 14 detects the height direction dimension of the goods 4 that passed through the area of the optical path 62 based on the first identified position coordinates, which are the position coordinates of the identified control point P of the robot 11 when the amount of light received by the light-receiving portion 60b from the light-emitting portion 60a is smaller than the first threshold value. In a case where the height position of the top surface of the identified goods 4 detected as described above is lower than the height position of the optical path 62, the robot controller 14 detects the height direction dimension of the goods 4 that passed through the area of the optical path 62 based on the second identified position coordinates, which are the position coordinates of the identified control point P of the robot 11 when the amount of light received by the light-receiving portion 60b from the light-emitting portion 60a, which was smaller than the first threshold value, is larger than the second threshold value. That is, according to this embodiment, the height direction dimension (measured value) calculated based on the position coordinates of the identified control point P is set as the height direction dimension of the goods 4. As a result, by simply sensing the goods 4 from the top surface thereof via the vision sensor 27 and acquiring the outer shape information of the top surface of the goods 4, it is possible to detect the three-dimensional shape of the goods 4 based on the shape and size of the top surface of the goods 4, which is based on the acquired outer shape information, and the detected height direction dimension of the goods 4.

Further, in particular, according to this embodiment, the distance information to the top surface of the goods 4 loaded onto the receiving-side cargo 9 is acquired via the laser sensor 26, and the outer shape information of the goods 4 is acquired via the vision sensor 27. With this arrangement, it is possible to detect the distance to the top surface of the goods 4 as well as set the target lifting position of the goods 4 based on the shape and size of the goods 4. As a result, when the robot 11 lifts the goods 4 via the suction pad 25, it is possible to avoid creating defects, such as the crushing of the box 4a of the goods 4 due to lack of knowledge of the distance to the top surface of the goods 4, failure to lift the box 4a due to lack of knowledge of the shape and size of the goods 4, and the dropping of the box 4a during lifting. Further, with the three-dimensional sensor, the distance information to the top surface of the goods 4 loaded onto the receiving-side cargo 9 can be acquired, making it possible to shorten the processing time compared to a case where the outer shape information of the goods 4 is acquired.

Further, in particular, according to this embodiment, the laser sensor 26 and the vision sensor 27 are provided to the robot 11. With this arrangement, the number of provided laser sensors 26 and vision sensors 27 is small compared to a case where the laser sensor 26 and the vision sensor 27 are provided to each of the plurality of receiving-side cargos 9, making it possible to suppress equipment costs.

Further, in particular, according to this embodiment, since the support member 64 flexibly bends, the suction pad 25 is movably supported in the surface direction of the plate portion 63a and the direction orthogonal to that surface direction. With this arrangement, due to the slight error in the distance information and outer shape information thus acquired, the support member 64 that is connected to the suction pad 25 flexibly bends even in a case where the suction pad 25 contacts the top surface of the goods 4 with excessive force when lifting the goods 4, or in a case where the goods 4 suctioned by the suction pad 25 contacts the shelf 19, the side walls 29 and 30, the rear wall 31, or the like with excessive force when loaded onto the sending-side cargo 10, thereby preventing the box 4a of the goods 4 from collapsing due to applied pressure. Further, the suction pad 25 is movable in the surface direction, making it possible to temporarily load the goods 4 onto the shelf 19 and make slight adjustments to the loading position of the goods 4 by moving the suction pad 25 in the surface direction in that state.

Note that the embodiments are not limited to the above, and various modifications may be made without deviating from the spirit and scope of the disclosure. The following describes such modifications one by one.

(2-1) When the Dimensions of the Box are Standardized to a Plurality of Types

In this modification, the dimensions (including the height direction dimension) of the box 4a of the goods 4 received from the receiving-side truck 3 are standardized to a plurality of types (five types, for example), and the height direction dimension of the box 4a of the goods 4 (hereinafter, suitably and simply referred to as "height direction dimension of the goods 4") is one of the plurality of predetermined dimensions ("100 mm," "150 mm," "200 mm," "250 mm," and "300 mm," for example). Then, the goods 4 having a height direction dimension of any one of the plurality of predetermined dimensions is loaded in plurality onto the receiving-side cargo 9.

Then, according to this modification, the robot controller 14 determines which of the plurality of predetermined dimensions is the height direction dimension of the identified goods 4 that passed through the area of the optical path 62 as described above, based on the light reception result of the light-receiving portion 60b of the light from the light-emitting portion 60a when the robot 11 moves the identified goods 4 so that they pass through the area of the optical path 62.

That is, in a case where the height position of the top surface of the identified goods 4 thus detected is higher than the height position of the optical path 62, the robot controller 14 detects a dimension (hereinafter suitably referred to as "the first dimension") based on the difference between the value of the z coordinate of the first identified position coordinates and the value of the z coordinate of the first standard coordinates as calculated as described above. Then, the dimension of the plurality of dimensions predetermined as the height direction dimensions of the goods 4 that is closest to the first detected dimension is determined to be the height direction dimension of the identified goods 4 that passed through the area of the optical path 62.

For example, given the plurality of predetermined dimensions "100 mm," "150 mm," "200 mm," "250 mm," and "300 mm" as the height direction dimensions of the goods 4, the height direction dimension of the identified goods 4 is detected as 150 mm when the first dimension is detected as 170 mm. Further, in a case where the first dimension is detected as 220 mm, the height direction dimension of the identified goods 4 is detected as 200 mm.

On the other hand, in a case where the height position of the top surface of the identified goods 4 thus detected is lower than the height position of the optical path 62, the robot controller 14 detects a dimension (hereinafter suitably referred to as "the second dimension") based on the difference between the value of the z coordinate of the second identified position coordinates and the value of the z coordinate of the second standard coordinates as calculated as described above. Then, the dimension of the plurality of dimensions predetermined as the height direction dimensions of the good 4 that is closest to the second detected dimension is determined to be the height direction dimension of the identified goods 4 that passed through the area of the optical path 62.

For example, given the plurality of predetermined dimensions "100 mm," "150 mm," "200 mm," "250 mm," and "300 mm" as the height direction dimensions of the goods 4, the height direction dimension of the identified goods 4 is detected as 150 mm when the second dimension is detected as 170 mm. Further, in a case where the second dimension is detected as 220 mm, the height direction dimension of the identified goods 4 is detected as 200 mm.

In this modification described above, the robot controller 14 determines which of the plurality of predetermined dimensions is the height direction dimension of the goods 4 that passed through the area of the optical path 62 based on the first identified position coordinates when the height position of the top surface of the identified goods 4 thus detected is higher than the height position of the optical path 62. Further, the robot controller 14 determines which of the plurality of predetermined dimensions is the height direction dimension of the goods 4 that passed through the area of the optical path 62 based on the second identified position coordinates when the height position of the top surface of the identified goods 4 thus detected is lower than the height position of the optical path 62. That is, according to this modification, the dimension (measured value) calculated based on the position coordinates of the identified control point P is not set as the height direction dimension of the goods 4, but rather, the dimension of the plurality of predetermined dimensions that is closest to the calculated dimension is selected and set as the height direction dimension of the goods 4. As a result, by simply sensing the goods 4 from the top surface thereof via the vision sensor 27 and acquiring the outer shape information of the top surface of the goods 4, it is possible to detect the three-dimensional shape of the goods 4 based on the shape and size of the top surface of the goods 4, which is based on the acquired outer shape information, and the determined height direction dimension of the goods 4. Further, even if there is a slight error included in the calculated dimension (measured value), the appropriate dimension can still be selected if that error is within a permissible range, thereby making it possible to increase the speed at which the goods 4 pass through the area of the optical path 62. As a result, the tact time of the sorting of the goods 4 can be shortened.

(2-2) When the Height Direction Dimension of the Goods is Detected without Using a Standard Article While in the above a standard article for which the height direction dimension is known in advance is used to record the first and second standard coordinates, and the height direction dimension of the identified goods 4 that passed through the area of the optical path 62 is detected based on the difference between the value of the z coordinate of the first or second identified position coordinates and the value of the z coordinate of the first or second standard coordinates as calculated as described above, the present disclosure is not limited thereto, allowing detection of the height direction dimension of the identified goods 4 that passed through the area of the optical path 62 by other means.

For example, since the robot controller 14 can acquire the height position information of the suction pad 25 as described above, in a case where the robot controller 14 positions the identified control point P at the position coordinates C1 as described above and lowers the identified goods 4, the difference between the height position (value of the z coordinate) of the suction pad 25 (specifically, the suction surface of the suction pad 25) when in the state shown in the FIGS. 34A and 34B and the height position (value of the z coordinate) of the optical path 62 is detected as the height direction dimension of the identified goods 4. On the other hand, in a case where the robot controller 14 positions the identified control point P at the position coordinates C2 as described above and raises the identified goods 4, the difference between the height position (value of the z coordinate) of the suction pad 25 (specifically, the suction surface of the suction pad 25) when in the state shown in the FIGS. 40A and 40B (the state in which the entire identified goods 4 passed through the area of the optical path 62) and the height position (value of the z coordinate) of the optical path 62 is detected as the height direction dimension of the identified goods 4.

In this modification as well, the same advantages as those of the previously described embodiment and modification (2-1) can be achieved. Further, in a case where the identified control point P is positioned at the position coordinates C1 and the identified goods 4 are lowered, the height direction dimension of the identified goods 4 can be detected without passing through the state shown in the FIG. 35A and FIG. 35B, making it possible to shorten the tact time of sorting the goods 4 further than the previously described embodiment in which operations are performed so that the goods 4 pass through the state of the FIGS. 35A and 35B.

(2-3) When a Photoelectric Sensor is Installed on a Pillar, Wall, or the Like

While in the above the light-emitting portion 60*a* and the light-receiving portion 60*b* of the photoelectric sensor 60 are installed to the support poles 61*a* and 61*b* provided near the receiving-side cargo arrangement area 22, the present disclosure is not limited thereto, allowing the two to be provided to a pillar, wall, or the like provided near the receiving-side cargo arrangement area 22. In such a case, the pillar, wall, or the like provided near the receiving-side cargo arrangement area 22 links to the first support portion. In this modification as well, the same advantages as those of the previously described embodiment and each modification can be achieved.

(2-4) When a Photoelectric Sensor is Installed on the Receiving-Side Cargo

While in the above the light-emitting portion 60*a* and the light-receiving portion 60*b* of the photoelectric sensor 60 are installed to the support poles 61*a* and 61*b* provided near the receiving-side cargo arrangement area 22, the present disclosure is not limited thereto, allowing installation to the receiving-side cargo 9. According to this modification, even in a case where the receiving-side cargo 9 is moved and used at a separate location, there is no need to install a new photoelectric sensor 60, making it possible to reduce installation labor.

(2-5) When the Laser Sensor and Vision Sensor are Provided to a Location Other than the Robot While in the above the laser sensor 26 and the vision sensor 27 are provided to the arm 24 of the robot 11, the present disclosure is not limited thereto, allowing provision to the receiving-side cargo 9. Or, the two may be provided to a suitable support member provided near the receiving-side cargo arrangement area 22, or to a pillar, wall, or the like provided near the receiving-side cargo arrangement area 22. In this case, the suitable support member provided near the receiving-side cargo arrangement area 22 and the pillar, wall, or the like provided near the receiving-side cargo arrangement area 22 links to the second support portion. According to this modification, the laser sensor 26 and the vision sensor 27 can be positioned at a location other than on the robot 11 side, making it possible to avoid occurrence of a defect in which the laser sensor 26 and the vision sensor 27 become a hindrance to the robot 11 transporting the goods 4, resulting in failure of smooth operation. Further, when the robot 11 transports the goods 4, the laser sensor 26 and the vision sensor 27 can acquire the distance information and outer shape information in parallel, thereby shortening the tact time of the sorting of the goods 4.

(2-6) When a Three-Dimensional Sensor is Provided in Place of the Laser Sensor and Vision Sensor While in the above the laser sensor 26 acquires the distance information to the top surface of the goods 4 loaded onto the receiving-side cargo 9 and the vision sensor 27 acquires the outer shape information of the goods 4, the present disclosure is not limited thereto, allowing provision of a three-dimensional sensor capable of acquiring the distance information and outer shape information in place of the laser sensor 26 and the vision sensor 27. In such a case, the three-dimensional sensor links to the sensor apparatus. According to this modification, the configuration is simplified compared to a case where the distance information and the outer shape information are acquired by different sensors, such as a case where the distance information is acquired by the laser sensor 26 and the outer shape information is acquired by the vision sensor 27.

(2-7) When the Goods are Supplied by a Conveyor

While in the above the goods 4 are supplied by the receiving-side cargo 9, the present disclosure is not limited thereto, allowing the goods 4 to be supplied by a suitable conveyor. In such a case, the suitable conveyor links to the supply apparatus. In this modification as well, the same advantages as those of the previously described embodiment and each modification can be achieved.

(2-8) When Goods Other than that Having a Top Surface that Exist at the Highest Position are Also to be Lifted While in the above only the goods 4 of the plurality of goods 4 loaded onto the receiving-side cargo 9 that has a top surface that exists in the highest position is subject to lifting (subject to height direction dimension detection), the present disclosure is not limited thereto. That is, the good 4 of the plurality of goods 4 loaded onto the receiving-side cargo 9 that has a distance between its top surface and the top surface of the good 4 that exists in the highest position that is shorter than the smallest dimension (100 mm, for example) determined in advance as a height direction dimension of the goods 4 may be included as a lifting target. According to this modification, it is possible to increase the selection options of the goods 4 subject to lifting, making it possible to increase the loading efficiency onto the sending-side cargo 10.

(3) Other

Note that, while in the above the transportation of the receiving-side cargo 9 and the sending-side cargo 10 is performed by the receiving-side cargo transport cart 17 and the sending-side cargo transport cart 18, the present disclosure is not limited thereto, allowing transport of the receiving-side cargo 9 and the sending-side cargo 10, etc., manually by the worker.

Further, while in the above the suction pad 25 is provided to the arm 24 of the robot 11 and the goods 4 are suctioned and lifted by this suction pad 25, the present disclosure is not limited thereto, allowing provision of a gripping member to the arm 24 and the gripping and lifting of the goods 4 by this gripping member. In such a case, the gripping member links to the tool.

Further, while in the above the barcode 8 with recorded delivery destination information is provided to the top surface of each of the goods 4 and the delivery destination information is acquired from the barcode 8 via the vision sensor 27 provided at the end of the arm 24, the present disclosure is not limited thereto. That is, a barcode reader (link to the sorting destination acquisition portion) may be provided to the arm 24, and the delivery destination information may be acquired from the barcode 8 via this barcode reader. Or, an IC tag with recorded delivery destination information may be provided to the top surface of each of the goods 4, an IC tag reader may be provided to the arm 24, and the delivery destination information may be acquired from the IC tag via this IC tag reader.

Further, while in the above the goods 4 are loaded onto the receiving-side cargo 9 and the sending-side cargo 10, the present disclosure is not limited thereto, allowing loading of the goods 4 onto a pallet or the like. In this case, the pallet, etc., provided in place of the receiving-side cargo 9 links to the fifth loading portion and supply apparatus, and the pallet, etc., provided in place of the sending-side cargo 10 links to the sixth loading portion.

Further, while in the above the plurality of goods 4 with predetermined delivery destinations is sorted for each delivery destination area (for example, cities, towns, and villages) in accordance with these delivery destinations, the present disclosure is not limited thereto, allowing the goods 4 to be sorted for each delivery destination (for example, in units of one item) in accordance with the delivery destinations. Or, the plurality of goods may be sorted by type. Or, sorting destinations other than a delivery destination may be defined in relation to the plurality of goods 4, and the sorting may be performed in accordance with these sorting destinations. Or, the plurality of goods 4 may be sorted in accordance with the shape and size of the top surface, the height direction dimension, the three-dimensional shape, etc., detected as described above, without determining the sorting destination.

Further, while the above has described an illustrative scenario in which the robot system 1 is applied to the truck terminal 2 of a delivery service provider and sorts the goods 4, the present disclosure is not limited thereto, allowing application of the robot system to another distribution facility (such as a fulfillment center of a mail order sales provider, for example) or other facility for sorting or executing any other loading/unloading task with the goods 4.

Further, the flows shown in the FIG. 12, FIG. 41, and FIG. 42 are not limited to the procedures shown in the embodiments, allowing procedures to be added, deleted, and changed in terms of order without departing from the spirit and scope of the disclosure.

Further, other than that already stated above, techniques based on the above embodiments and each of the modifications may be suitably used in combination well.

Although other examples are not individually described herein, various changes can be made to the above embodiments and modifications without departing from the spirit and scope of the present disclosure.

What is claimed is:

1. A robot system, comprising:
    a first loading portion onto which a plurality of articles of sorting targets is loaded;
    a plurality of second loading portions provided for each sorting destination; and
    a robot configured to sort the plurality of articles loaded onto the first loading portion in accordance with the sorting destination, and to transfer the plurality of articles to the plurality of second loading portions, wherein:
    the robot comprises:
        a robot arm,
        a tool capable of lifting the article, provided to the robot arm;
        a first sensor configured to acquire distance information to each top side of the plurality of articles loaded onto the first loading portion, provided to the robot arm;
        an article identifying portion configured to identify the article of the plurality of articles loaded onto the first loading portion which comprises the top side that exists at a highest position, based on acquisition results of the first sensor;
        a second sensor configured to attempt to acquire outer shape information of the identified article identified by the article identifying portion, and to acquire sorting destination information of the identified article provided to the identified article, the second sensor being provided to the robot arm;
        a first calculating portion configured to calculate a shape and size of the identified article based on the outer shape information of the identified article acquired by the second sensor;
        a sorting destination determining portion configured to determine an identified sorting destination corresponding to the identified article based on the sorting destination information of the identified article acquired by the second sensor; and
        a first operation control portion configured to control an operation of the robot arm and the tool so that the identified article is lifted by the tool and stacked onto the identified second loading portion of the plurality of second loading portions which corresponds to the identified sorting destination, in accordance with the shape and the size of the identified article calculated by the first calculating portion.

2. The robot system according to claim 1, wherein:
    the robot further comprises:
        a pattern storage portion configured to store stacking patterns of the article onto the second loading portion; and
        a location determining portion configured to determine a stacking location of the identified article in the identified second loading portion, based on the shape and the size of the identified article calculated by the first calculating portion, a loaded state of the article in the identified second loading portion, and the stacking patterns stored in the pattern storage portion; and
    the first operation control portion controls the operation of the robot arm and the tool so that the identified article lifted by the tool is stacked onto the stacking location determined by the location determining portion.

3. The robot system according to claim 2, further comprising a third loading portion for temporarily loading the article, wherein:
    the robot further comprises a loading determining portion configured to determine whether or not the identified article is to be loaded onto the identified second loading portion at the present moment, based on the shape and the size of the identified article calculated by the first calculating portion, the loaded state of the article on the identified second loading portion, and the stacking patterns stored in the pattern storage portion;
    the location determining portion determines the stacking location in a case where the loading determining portion determines that the identified article is to be loaded onto the identified second loading portion; and
    the first operation control portion controls the operation of the robot arm and the tool so that the identified article lifted by the tool is stacked onto the stacking location determined by the location determining portion in a case where the loading determining portion determines that the identified article is to be loaded onto the identified second loading portion, and the identified article lifted by the tool is loaded onto the third loading portion in a case where the loading determining portion determines that the identified article is not to be loaded onto the identified second loading portion.

4. The robot system according to claim 2, wherein:
    the pattern storage portion of the robot stores a plurality of types of the stacking patterns, assigned priority indicators in advance;

the robot further comprises a pattern selecting portion configured to select the stacking patterns of the plurality of types in descending priority indicator order; and the location determining portion determines the stacking location based on the shape and the size of the identified article calculated by the first calculating portion, the loaded state of the article on the identified second loading portion, and the stacking pattern selected from the stacking patterns of the plurality of types by the pattern selecting portion.

5. The robot system according to claim 2, wherein:

the second sensor of the robot attempts to acquire height direction dimension information of the identified article in addition to the sorting destination information of the identified article provided to the identified article;

the robot further comprises a height determining portion configured to determine a height direction dimension of the identified article based on the height direction dimension information of the identified article acquired by the second sensor; and the location, determining portion determines the stacking, location based on the shape and the size of the identified article calculated by the first calculating portion, the height direction dimension of the identified article determined by the height determining portion, the loaded state of the article on the identified second loading portion, and the stacking patterns stored in the pattern storage portion.

6. The robot system according to claim 2, wherein:

the first operation control portion of the robot comprises:

a first control portion configured to control the operation of the robot arm and the tool so that the identified article is moved along a predetermined movement path while lifted by the tool in accordance with the shape and the size of the identified article calculated by the first calculating portion; and a second control portion configured to control the operation of the robot arm and the tool so that the identified article thus moved along the predetermined movement path based on the control of the first control portion is stacked onto the stacking location determined by the location determining portion;

the first loading portion farther comprises in an upper portion a third sensor comprising a light-emitting portion configured to emit light so that an optical axis is substantially horizontal and intersects the predetermined movement path, and a light-receiving portion configured to receive light emitted from the light-emitting portion;

the robot further comprises a height estimating portion configured to estimate the height direction dimension of the identified article based on a posture of the robot arm and a light reception result of the light-receiving portion of the third sensor when the identified article is moved along the predetermined movement path based on the control of the first control portion; and the location determining, portion determines the stacking location based on the shape and the size of the identified article calculated by the first calculating portion, the height direction dimension of the identified article estimated by the height estimating portion, the loaded state of the article on the identified second loading portion, and the stacking patterns stored in the pattern storage portion.

7. The robot system according to claim 2, wherein:

the first loading portion and the plurality of second loading portions are arranged in a radial direction on a substantial circumference of a circle formed around a base end portion of the robot arm of the robot.

8. The robot system according to claim 2, wherein:

the second loading portion of the plurality of second loading portions which corresponds to a predetermined first sorting destination is arranged closer to the first loading portion than the second loading portions corresponding to other second sorting destinations.

9. The robot system according to claim 2, wherein:

the second loading portion of the plurality of second loading portions which corresponds to a predetermined first sorting destination is arranged in a greater arrangement quantity than the second loading portions corresponding to the other second sorting destinations.

10. The robot system according to claim 2, further comprising:

a first arrangement area for arranging the first loading portion;

a plurality of second arrangement areas for arranging the plurality of second loading portions;

a first transport cart configured to at least transport the first loading portion to the first arrangement area or the first loading portion from the first arrangement area; and a second transport cart configured to at least transport the second loading potion to the second arrangement area or the second loading portion from the second arrangement area.

11. The robot system according to claim 2, further comprising a fourth loading portion for loading an article for which the sorting destination information cannot be acquired via the second sensor, wherein:

the robot further comprises an acquisition determining portion configured to determine whether or not the sorting destination information of the identified article was acquired via the second sensor; and the first operation control portion controls an operation of the robot arm and the tool so that the identified article lifted by the tool is loaded onto the fourth loading portion in a case where it has been determined by the acquisition determining portion that the sorting destination information of the identified article cannot be acquired via the second sensor.

12. The robot system according to claim 2, wherein:

the first loading portion and the plurality of second loading portions further comprises a first loading surface portion for loading the article;

at least one of the first loading portion and the plurality of second loading portions further comprises a flip-up type second loading surface portion for loading the article, provided above the first loading surface portion; and the robot further comprises a jig for raising and lowering the second loading surface portion, provided to the robot arm.

13. A robot comprising:

a robot including a robot arm and a tool capable of lifting the article, provided to the robot arm;

a controller which operates the robot to execute a process for sorting a plurality of articles to be sorted that is loaded onto the first loading portion in accordance with a sorting destination, and transferring the plurality of articles to a plurality of second loading portions provided for each sorting destination;

a first sensor configured to acquire distance information to each top side of the plurality of articles loaded onto the first loading portion, the first sensor being provided to the robot arm;

an article identifying portion configured to identify the article of the plurality of articles loaded onto the first loading portion which includes the top side that exists at a highest position, based on acquisition results of the first sensor, the article identifying portion being provided in the controller;

a second sensor configured to attempt to acquire outer shape information of the identified article identified by the article identifying portion and to acquire sorting destination information of the identified article provided to the identified article, the second sensor being provided to the robot arm;

a first calculating portion configured to calculate a shape and size of the identified article based on outer shape information of the identified article acquired by the second sensor, the first calculating portion being provided in the controller;

a sorting destination determining portion configured to determine an identified sorting destination corresponding to the identified article based on the sorting destination information of the identified article acquired by the second sensor, the sorting destination determining portion being provided in the controller; and a first operation control portion configured to control an operation of the robot arm and the tool so that the identified article is lifted by the tool and stacked onto the identified second loading portion of the plurality of second loading portions which corresponds to the identified sorting destination, in accordance with the shape and the size of the identified article calculated by the first calculating portion, the first operation control portion being provided in the controller.

14. A manufacturing method of sorting articles by a system configured to manufacture the sorted article of each of a plurality of sorting destinations, wherein:

a robot sorts the plurality of articles that are loaded onto a first loading portion in accordance with a sorting destination, and transfers the plurality of articles to a plurality of second loading portions provided for each of the sorting destinations, the manufacturing method comprising:

a first acquiring step which acquires distance information to each top side of the plurality of articles loaded onto the first loading portion;

an article identifying step which identifies an article of the plurality of articles loaded, onto the first loading portion which includes the top side that exists at a highest position, based on acquisition results of the first acquiring step;

a second acquiring, step which acquires outer shape information of the identified article identified in the article identifying step, and attempts to acquire sorting destination information of the identified article provided to the identified article;

a first calculating step which calculates a shape and size of the identified article based on the outer shape information of the identified article acquired by the second acquiring step;

a first sorting destination determining step which determines an identified sorting destination corresponding to the identified article based on the sorting destination information of the identified article acquired in the second acquiring step; and a stacking step which lifts and stacks by the robot the identified article onto an identified second loading portion of the plurality of second loading portions which corresponds to the identified sorting destination, in accordance with the shape and the size of the identified article calculated by the first calculating step.

15. A robot system, comprising:

a first supply-side loading portion configured to supply a plurality of articles to be sorted related to defined sorting destinations;

a first robot configured to transport the plurality of articles that are loaded onto the first supply-side loading portion;

one or more first delivery-side loading portions arranged around the first robot;

a second supply-side loading portion configured to supply a plurality of the articles to be sorted;

a second robot configured to transport the plurality of articles that are loaded onto the second supply-side loading portion;

one or more second delivery-side loading portions arranged around the second robot;

a first controller apparatus configured to control a plurality of robots which includes the first robot and the second robot; and a sorting destination acquisition portion configured to acquire the respective sorting destination information of the plurality of articles to be sorted; wherein:

the first controller apparatus comprises:
a correspondence information storage portion configured to store correspondence information that associates each of a plurality of the sorting destinations with any one of the one or more first delivery-side loading portions and the one or more second delivery-side loading portions; and a second operation control portion configured to control an operation of the first robot and second robot so that the first robot and second robot transfer the plurality of articles to be sorted to each of the corresponding first delivery-side loading portions and second delivery-side loading portion in coordination in accordance with the sorting destination information acquired by the sorting destination acquisition portion based on the correspondence information stored in the correspondence information storage portion.

16. The robot system according to claim 15, wherein:

each of the first robot and second robot comprises:
a robot arm; and
a tool provided to the robot arm and is capable of lifting the articles to be sorted;

the first controller apparatus comprises:
a second calculating portion configured to calculate a shape and size of an identified article to be sorted of the plurality of articles that are loaded onto the first supply-side loading portion or second supply-side loading portion and is identified in accordance with a top side position; and a sorting destination determining portion configured to determine an identified sorting destination that corresponds to the identified article to be sorted based on the sorting destination information of the identified article to be sorted acquired by the sorting destination acquisition portion; and the second operation control portion controls an operation of the first robot or second robot so that the identified article to be sorted is lifted by the tool and stacked onto the first delivery-side loading portion or second delivery-side loading portion identified in accordance with the identified sorting destination, in accordance with the shape and the size of the identified article to be sorted calculated by the second calculating portion.

17. The robot system according to claim 15, further comprising an operation apparatus capable of inputting operation information via a manual operation of an operator, wherein:
the first controller apparatus further comprises a second correspondence information generating portion configured to generate the correspondence information based on the operation information; and
the correspondence information storage portion stores the correspondence information determined by the second correspondence information generating portion.

18. The robot system according to claim 15, wherein:
the first controller apparatus further comprises:
a parameter storage portion configured to store sorting parameter information related to the article to be sorted; and
a first correspondence information generating portion configured to determine the sorting destination to be associated with each of the one or more first delivery-side loading portions as well as the sorting destination to be associated with each of the one or more second delivery side loading portions based on the sorting parameter information stored in the parameter storage portion, and generate the correspondence information; and
the correspondence information storage portion stores the correspondence information determined by the first correspondence information generating portion.

19. The robot system according to claim 18, wherein:
the parameter storage portion stores at least one of quantity information of the article to be sorted, quantity information of the article to be sorted per sorting destination, and quantity ratio information of the article to be sorted per sorting destination as the sorting parameter information.

20. The robot system according, to claim 18, wherein:
the first correspondence information generating portion or the second correspondence information generating portion of the first controller apparatus determines associations that respectively associate each of a predetermined or more first sorting destinations with one of:
a part of first delivery-side loading portions of the one or more first delivery-side loading portions;
a second sorting destination, wherein the second sorting destination is established as all sorting destinations other than one or more the first sorting destinations, with each of a remaining first delivery-side loading portions other than the part of first delivery-side loading portions; and
each of one or more third sorting, destinations included in the second sorting destinations with one of the one or more second delivery-side loading portions;
the first correspondence information generating portion or the second correspondence information generating portion generates the correspondence information that associates each of the one or more first sorting destinations with one of:
the part of first delivery-side loading portions;
the second sorting destination with each of the remaining first delivery-side loading portions; and
each of the one or more third sorting destinations with one of the one or more second delivery-side loading portions;
the correspondence information storage portion stores the correspondence information generated by the first correspondence information generating portion or the second correspondence information generating portion; and
the second operation control portion:
1) controls an operation of the first robot so that, based on the correspondence information stored in the correspondence information storage portion, the plurality of articles to be sorted, the plurality of articles being loaded onto the first supply-side loading portion, are transferred to each of:
the first delivery-side loading portions associated with the first sorting destination; or
the second sorting destination corresponding to the sorting destination information acquired by the sorting destination acquisition portion, thereby establishing sorted articles of each of the one or more first sorting destinations and the article to the second sorting destination; and
2) controls an operation of the second robot so that, when each of the first delivery-side loading portions are loaded with the article to the second sorting, destination and when the each of the first delivery-side loading portions are associated with the second sorting destination as the second supply-side loading portion, said second robot transfers the article to be sorted to the second sorting destination, the article being loaded onto the second supply-side loading portion, to each of the second delivery-side loading portions associated with the third sorting destination corresponding to the sorting destination information acquired by the sorting destination acquisition portion, thereby establishing the sorted articles to each of the one or more third sorting destinations.

21. The robot system according, to claim 18, wherein:
the first correspondence information generating portion or second correspondence information generating portion of the first controller apparatus determines:
which of the one or more first delivery-side loading portions is to be associated with a predetermined plurality of fourth sorting destinations based on a predetermined classification standard; and
which of the one or more second delivery-side loading portions is to be associated with each of a plurality of fifth sorting destinations that are classified in further detail than each of the plurality of fourth sorting destinations, and
the first correspondence information generating, portion or second correspondence information generating portion generates the correspondence information that associates:
each of the plurality of fourth sorting destinations with one of the one or more first delivery-side loading portions; and
each of the plurality of fifth sorting destinations with one of the one or more second delivery-side loading portions;
the correspondence information storage portion stores the correspondence information generated by the first correspondence information generating portion or the second correspondence information generating portion; and
the second operation control portion:
1) controls an operation of the first robot so that the plurality of articles to be sorted, the plurality of articles being loaded onto the first supply-side loading portion, are transferred to each of the first delivery-side loading portions associated with the fourth sorting destination corresponding to the sorting destination information acquired by the sorting destination acquisition portion, based on the correspondence information stored in the correspondence information storage portion, thereby establishing the plurality of articles to each of the fourth sorting destinations; and
2) controls an operation of the second robot so that, when each of the one or more first delivery-side loading portions are loaded with the article to the fourth sorting destination as the second supply-side loading portion, the article to be sorted to the fourth sorting destination the article being loaded onto the second supply side loading portion, is transferred to each of the second delivery-side loading portions associated with the fifth sorting destination corresponding to the sorting destination information acquired by the sorting destination acquisition portion, thereby establishing the plurality of sorted articles of each to the fifth sorting destinations.

22. The robot system according to claim 18, wherein:
a first correspondence information generating portion or second correspondence information generating portion of the first controller apparatus generates the correspondence information that associates each of the plurality of sorting destinations with one of the one or more first delivery-side loading portions, and with one of the one or more second delivery-side loading portions;
the correspondence information storage portion stores the correspondence information determined by the first correspondence information generating portion or the second correspondence information generating portion; and
the second operation control portion controls an operation of the first robot and second robot so that the first robot and second robot transfer the plurality of articles to be sorted in parallel to each of the first delivery-side loading portions and second delivery-side loading portion associated with the sorting destinations corresponding to the sorting destination information acquired by the sorting destination acquisition portion, based on the correspondence information stored in the correspondence information storage portion, resulting in the plurality of sorted article to each of the sorting destinations.

23. A manufacturing method of sorting articles by a system configured to manufacture sorted articles to each of a plurality of the sorting destinations, wherein:
a first robot transports a plurality of articles to be sorted that are loaded onto a first supply-side loading portion with defined sorting destinations to one or more first delivery-side loading portions arranged around the first robot; and
a second robot transports a plurality of the articles to be sorted that a loaded onto a second supply-side loading portion to one or more second delivery-side loading portions arranged around the second robot, the manufacturing method comprising:
a sorting destination acquiring step which acquires respective sorting destination information of the plurality of articles to be sorted;
a correspondence information storing step which stores correspondence information that associates each of the plurality of sorting destinations with one of the one or more first delivery-side loading portions and the one or more second delivery-side loading portions; and
a transferring step which transfers the plurality of articles to be sorted to each of the corresponding first delivery-side loading portion and second deliver-side loading portion by the first robot and second robot in coordination, in accordance with the sorting destination information acquired by the sorting destination acquiring, based on the correspondence information stored in the correspondence information storing step.

24. The manufacturing method of sorting articles according to claim 23, further comprising:
a second calculating step which calculates a shape and size of an identified article to be sorted of the plurality of articles that are loaded onto the first supply-side loading portion or second supply-side loading portion which is identified in accordance with a position of a top side; and
a second sorting destination determining step which determines an identified sorting destination corresponding to the identified article to be sorted based on the sorting destination information of the identified article to be sorted acquired in the sorting destination acquiring step, wherein:
in the transferring step, the identified article to be sorted is lifted by the tool and stacked onto the identified first delivery-side loading portion or second delivery-side loading portion corresponding to the identified sorting destination, in accordance with the shape and the size of the identified article to be sorted that were calculated in the second calculating step.

25. A robot system comprising:
a robot configured to comprise a tool capable of lifting an article and configured to lift and transport the article by the tool;
a second controller apparatus configured to control an operation of the robot so that at least a part of the article lifted by the tool passes through an area for detecting a height direction dimension of the article; and
a photoelectric sensor comprising a light-emitting portion configured to emit light and a light-receiving portion configured to receive the light emitted from the light-emitting portion, an optical path area of the light being the area for detecting a height direction dimension of the article, wherein:
the second controller apparatus controls the operation of the robot so that at least a part of the article lifted by the tool basses through the optical path area, and detects the height direction dimension of the article which passed through the optical path area based on the existence or non-existence of reception of the light by the light-receiving portion.

26. The robot system according to claim 25, wherein:
the light-emitting portion and the light-receiving portion of the photoelectric sensor are provided to a supply apparatus configured to supply the article.

27. The robot system according to claim 25, wherein:
the light-emitting portion and the light-receiving portion of the photoelectric sensor re provided to a first support portion provided near arrangement location for arranging a supply apparatus configured to supply the article.

28. The robot system according to claim 27, wherein:
the supply apparatus is a fifth loading portion capable of stacking and loading a plurality of the articles; and
the light-emitting portion and the light-receiving portion of the photoelectric sensor are provided so that a height position of the optical path area is positioned at the substantial center of a height position of the article loaded at the highest position of the fifth loading portion and a height position of the article loaded at the lowest position of the fifth loading portion.

29. The robot system according to claim 27, wherein:
the supply apparatus is a fifth loading portion capable of stacking and loading a plurality of the articles; and
the second controller apparatus controls the operation of the robot so that, in a case where the article loaded at a position higher than a predetermined height position of the fifth loading portion is to be lifted, the operation is performed so that an identified control point is positioned at first position coordinates at a position higher than the optical path area, the article held by the tool is subsequently lowered, and at least a part thereof passes through the optical path and in a case where the article loaded at a position lower than the predetermined height position of the fifth loading portion is to be lifted, the operation is performed so that the identified control point is positioned at second position coordinates at a position lower than the optical path area, the article held by the tool is subsequently raised, and at least a part thereof passes through the optical path area.

30. The robot system according, to claim 29, wherein the second controller apparatus either detects the height direction dimension of the article that passed through the optical path area based on position coordinates of the identified control point when the light-receiving portion of the photoelectric sensor no longer receives the light, or detects the height direction dimension of the article that passed through the optical path area based on position coordinates of the identified control point when the light-receiving, portion once again receives the light after the light was no longer received.

31. The robot system according to claim 29, wherein: the height direction dimension of the article is any one of a plurality of dimensions determined in advance; and the second controller apparatus either determines which dimension of the plurality of dimensions is the height direction dimension of the article that passed through the optical path area based on position coordinates of the identified control point when the light-receiving portion of the photoelectric sensor no longer receives the light, or determines which dimension of the plurality of dimensions is the height direction dimension of the article that passed through the optical path area based on position coordinates of the identified control point when the light-receiving portion once again receives the light after the light was no longer received.

32. The robot system according to claim 25, further comprising a sensor apparatus configured to acquire distance information to a top side of the article and outer shape information of the article, wherein:
the second controller apparatus controls the operation of the robot so that the article is lifted by the tool based on an acquisition result of the sensor apparatus.

33. The robot system according to claim 32, wherein: the sensor apparatus is provided to the robot.

34. The robot system according to claim 32, wherein: the sensor apparatus is provided to a supply apparatus configured to supply the article, or a second support portion provided near an arrangement location for arranging the supply apparatus.

35. The robot system according to claim 32, wherein: the sensor apparatus includes a first sensor capable of acquiring the distance information, and a second sensor capable of acquiring the outer shape information.

36. The robot system according to claim 33, wherein: the sensor apparatus is a three-dimensional sensor capable of acquiring the distance information and the outer shape information.

37. The robot system according to claim 25, wherein: the tool comprises:
a plate-shaped tool main body; and
a suction pad configured to contact the article, provided to the tool main body via a support member; and
the support member movably supports the suction pad in at least one of a surface direction of the tool main body or a direction orthogonal to the surface direction by flexibly bending.

38. A manufacturing method of sorting articles article configured to manufacture a sorted article to each of a plurality of the sorting destinations by transporting each of a plurality of articles a plurality of sixth loading portions,
wherein said articles are supplied by a robot from a supply apparatus to one of the sixth loading portions of the plurality of sixth loading portions corresponding to the sorting destination of each of the articles, the manufacturing method comprising:
a passing step which lifts the article supplied from the supply apparatus via the robot, and passes at least a part of the lifted article through an optical path area of a photoelectric sensor comprising a light-emitting portion configured to emit light and a light-receiving portion configured to receive the light emitted from the light-emitting portion, and detects a height direction dimension of the article, wherein:
the second controller apparatus controls the operation of the robot so that at least a part of the article lifted by the tool passes through the optical path area, and detects the height direction dimension of the article which passed through the optical path area based on the existence or non-existence of reception of the light by the light-receiving portion.

* * * * *